US011216722B2

(12) United States Patent
Nurvitadhi et al.

(10) Patent No.: US 11,216,722 B2
(45) Date of Patent: Jan. 4, 2022

(54) HARDWARE ACCELERATOR TEMPLATE AND DESIGN FRAMEWORK FOR IMPLEMENTING RECURRENT NEURAL NETWORKS

(71) Applicant: Intel Corporation, Santa Clara, CA (US)

(72) Inventors: Eriko Nurvitadhi, Hillsboro, OR (US); Deborah Marr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1014 days.

(21) Appl. No.: 15/396,520

(22) Filed: Dec. 31, 2016

(65) Prior Publication Data

US 2018/0189638 A1 Jul. 5, 2018

(51) Int. Cl.
*G06N 3/063* (2006.01)
*G06N 3/04* (2006.01)

(52) U.S. Cl.
CPC .......... *G06N 3/063* (2013.01); *G06N 3/0445* (2013.01)

(58) Field of Classification Search
CPC ..................................................... G06N 3/063
USPC ............................................................ 706/30
See application file for complete search history.

(56) References Cited

U.S. PATENT DOCUMENTS

| 5,434,951 | A | * | 7/1995 | Kuwata | ................ | G06N 3/0454 706/28 |
| 6,044,211 | A | * | 3/2000 | Jain | ....................... | G06F 9/4498 716/102 |
| 8,909,581 | B2 | * | 12/2014 | Oka | ....................... | G06Q 30/02 706/46 |
| 2014/0253575 | A1 | * | 9/2014 | Yang | ....................... | H04N 5/76 345/569 |
| 2017/0103298 | A1 | * | 4/2017 | Ling | .................... | G06N 3/0454 |

OTHER PUBLICATIONS

Gravelink, "How to Program Your First FPGA Device", Mar. 24, 2017, Intel Software Developer Zone, retrieved online on Jan. 3, 2020 from <software.intel.com/en-us/articles/how-to-program-your-first-fpga-device> (Year: 2017).*

(Continued)

*Primary Examiner* — James D. Rutten
(74) *Attorney, Agent, or Firm* — Nicholson De Vos Webster & Elliott LLP

(57) ABSTRACT

Hardware accelerator templates and design frameworks for implementing recurrent neural networks (RNNs) and variants thereof are described. A design framework module obtains a flow graph for an RNN algorithm. The flow graph identifies operations to be performed to implement the RNN algorithm and further identifies data dependencies between ones of the operations. The operations include matrix operations and vector operations. The design framework module maps the operations of the flow graph to an accelerator hardware template, yielding an accelerator instance comprising register transfer language code that describes how one or more matrix processing units and one or more vector processing units are to be arranged to perform the RNN algorithm. At least one of the one or more MPUs, as part of implementing the RNN algorithm, is to directly provide or directly receive a value from one of the one or more VPUs.

19 Claims, 43 Drawing Sheets

(56) References Cited

OTHER PUBLICATIONS

Changhao Jiang and M. Snir, "Automatic tuning matrix multiplication performance on graphics hardware," 14th International Conference on Parallel Architectures and Compilation Techniques (PACT'05), 2005, pp. 185-194, doi: 10.1109/PACT.2005.10. (Year: 2005).*

H. Sharma et al., "From high-level deep neural models to FPGAs," 2016 49th Annual IEEE/ACM International Symposium on Microarchitecture (MICRO), 2016, pp. 1-12, doi: 10.1109/MIORO.2016.7783720. (Year: 2016).*

European Search Report for Application No. 17206555.9-1221, dated May 28, 2018, 10 pages.

Han, Song et al., "ESE: Efficient Speech Recognition Engine with Sparse LSTM on FPGA," Dec. 1, 2016, Retrieved from Internet: URL:https://arxiv.org/pdf/1612.00694v1.pdf [retrieved May 6, 2018], 6 pages.

Cheung, Kit et al., "NeuroFlow: A General Purpose Spiking Neural Network Simulation Platform using Customizable Processors," Frontiers in Neuroscience, vol. 9, Jan. 14, 2016, 15 pages.

Guo, Kaiyuan et al., "From model to FPGA: Software-hardware co-design for efficient neural network acceleration," 2016 IEEE Hot Chips 28 Symposium (HCS), IEEE, Aug. 21, 2016, 27 pages.

Li, Sicheng et al., "FPGA Acceleration of Recurrent Neural Network Based Language Model," 2015 IEEE 23rd Annual International Symposium on Field-Programmable Custom Computing Machines, IEEE, May 2, 2015, 8 pages.

Campbell, Keith et al., "New advances of high-level synthesis for efficient and reliable hardware design," Integration, The VLSI Journal, North-Holland Publishing Company, Amsterdam, NL, vol. 58, Nov. 24, 2016, 26 pages.

Chang, et al., "Recurrent Neural Networks Hardware Implementation on FPGA," arXiv: 1511.05552 [cs.NE], Cornell University Library, Mar. 4, 2016, 7 pages.

De Mulder, et al. "A Survey on the Application of Recurrent Neural Networks to Statistical Language Modeling," Computer Speech and Language, Jul. 5, 2014, 67 pages.

Li, et al., "FPGA Acceleration of Recurrent Neural Network based Language Model," Field-Programmable Custom Computing Machines (FCCM), 2015 IEEE 23rd Annual International Symposium on, May 2015, 8 pages.

Olah, "Understanding LSTM Networks", colah's blog, retreived Dec. 29, 2016 from http://colah.github.io/posts/2015-08-Understanding-LSTMs/, posted Aug. 27, 2015, 9 pages.

Mikolov, "Recurrent neural network based language model," Interspeech, ICSA, 2010, 4 pages.

Office Action, EP App. No. 17206555.9, dated Apr. 9, 2021, 8 pages.

* cited by examiner

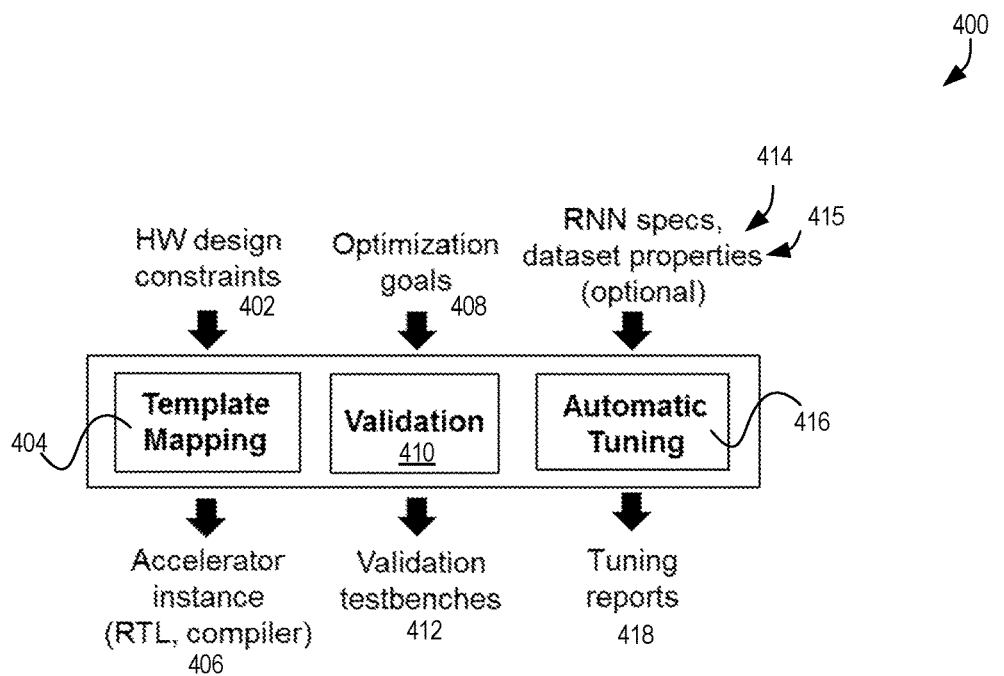
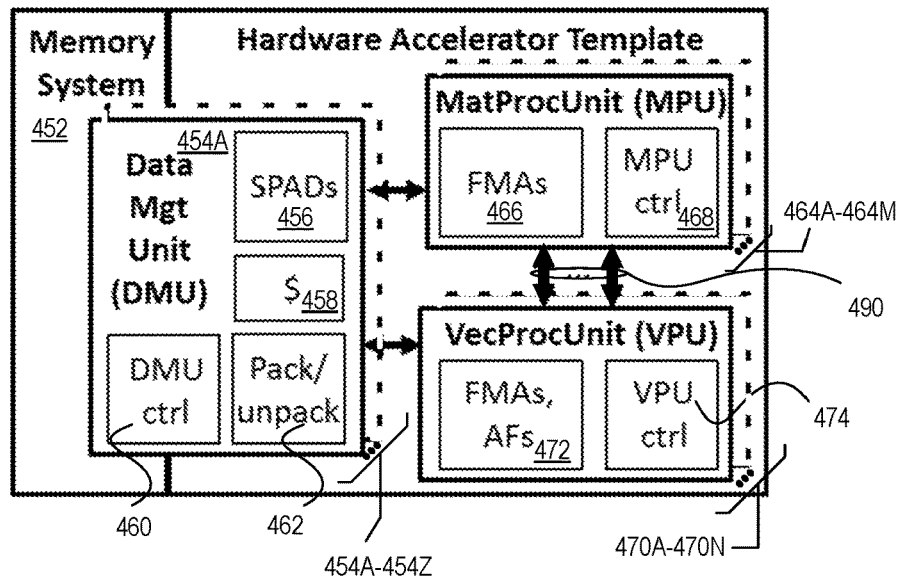
FIG. 4

TEMPLATE PARAMETERS 500

| CATEGORY | DETAILS |
|---|---|
| SPADs | Size, ports, number of banks, shared/private banks |
| Cache | Size, caching policies, associativity |
| Scaling | Number of MPUs, VPUs, FMAs, AFs, reduce units |
| DMU | Number of memory interfaces, width, burst size, read/write buffer sizes. Memory technology, bandwidth |
| MPU, VPU | Numbers and types of adders, multipliers, AFs. Reduction scheme, lane widths, pipe stages. |
| Data storage format | double, float, 16-float, fixed point, custom, compressed format |
| Pack/unpack | Packing/unpacking schemes (row/col major), compression scheme |

AUTO-TUNING FACTORS 550

| TUNING CONSIDERATIONS | EXAMPLE OF AFFECTED TEMPLATE PARAMETERS |
|---|---|
| RNN unit types (e.g., standard, GRU, LSTM) | MPU, VPU, SPADs, DMU. Tune to balance computation, on-chip storage, and data transfers. |
| RNN architecture parameters (e.g., hidden layer sizes, number of layer) | MPU, VPU, SPADs. MPU, VPU, SPADs, DMU. Tune to balance computation, on-chip storage, and data transfers. |
| Dataset properties | Cache, pack/unpack, SPADs. Tune to take advantage data locality, compressibility, data types used. |
| Optimizations goals (e.g., latency, throughput) | MPU, VPU, DMU. Tune to optimize given goals (e.g., minimal latency) |
| Design constraints (e.g., how many multipliers, RAMs) | MPU, VPU, SPADs, DMU. Tune to meet given constraints. |

FIG. 5

| Operation Type | Input operand1 1110 | Input operand2 1111 | Output 1112 | Matrix Data Format 1113 | Operation Identifier 1114 |
|---|---|---|---|---|---|
| Multiply 1100 | Sparse matrix | Sparse vector | Dense vector | Compressed sparse row (CSR) | mul_spMspV_row |
| | | | | Compressed sparse column (CSC) | mul_spMspV_col |
| | | Dense vector | Dense vector | Compressed sparse row (CSR) | mul_spMdV_row |
| | | | | Compressed sparse column (CSC) | mul_spMdV_col |
| Multiply 1101 | Dense matrix | Sparse vector | Dense vector | Row-oriented | mul_dMspV_row |
| | | | | Column-oriented | mul_dMspV_col |
| | | Dense vector | Dense vector | Row-oriented | mul_dMdV_row |
| | | | | Column-oriented | mul_dMdV_col |
| Scale & Update 1102 | Sparse matrix | Dense vector | Dense vector | Row-oriented | sau_spMdV |
| | Sparse vector | | Scalar | N/A | sau_spVdV |
| Dot product 1103 | Sparse vector | Sparse vector | | | dot_spVspV |
| | Dense vector | Sparse vector | | | dot_dVspV |
| | Sparse vector | Dense vector | | | dot_spVdV |
| | Dense vector | Dense vector | | | dot_dVdV |

FIG. 11

```
spMdV_csr(A, x, y) {
    for each row r of A {
        y[r.idx] = dot_product(r, x)
    }
}
```

*FIG. 13a*

```
spMspV_csc(A, x, y) {
    for each element x_e in vector x {
        col = get_column(x_e.idx) of A
        for each element col_e in col
            y[col_e.idx] += x_e.val * col_e.val
    }
}
```

*FIG. 13b*

```
scale_update(A, x, y) {
    for each row r of A {
        for each element r_e in r
            y[r_e.idx] += r_e.val * x[r.idx]
    }
}
```

*FIG. 13c*

```
1  RunVertexProgram(matrix <edata> A, vector<vdata> y)
2    for i=1 to Max_Iteration
3      x=new vector<mdata>
4      for j in y if j is active { x.insert(SEND_MSG(j)) }
5      t = GSPMV(A, x, y)
6      reset all members of y to non-active
7      for j in t where t is updated
8        new_val = APPLY(y_j, t_j);
9        If new_val = y_j {y_j=new_val; set y_j active}
10     If number of active y == 0 break
```

FIG. 16d

```
1  GSPMV( matrix <edata> A, vector<mdata> x, vector<vdata> y)
2    t = new vector <tdata>
3    for j in A^T.column if j found in x
4      for k in A^T.column_j
5        tmp = PROCESS_MSG(x_j, A^T.column_j[k], y_k)
6        t_k = REDUCE(t_k, tmp); set t_k to updated
7    return t
```

FIG. 16e

FIG. 16a $$G = \begin{matrix} & A & B & C & D \\ A & 0 & 1 & 1 & 0 \\ B & 1 & 0 & 1 & 1 \\ C & 1 & 1 & 0 & 0 \\ D & 0 & 1 & 0 & 0 \end{matrix}$$

FIG. 16b

```
struct vdata  {/*user defined vertex data*/}
struct mdata {/*user defined msg data*/ }
struct edata {/*user defined edge data*/}
struct tdata  {/*user defined tmp data*/ } tdata PROCESS_MSG(mdata m, edata e, vdata v) {
  // User defined
}
tdata REDUCE(tdata t, tdata r) {
  // User defined
}
vdata APPLY(vdata v, tdata t) {
  // User defined
}
mdata SEND_MSG(vdata v) {
  // User defined
}
```

FIG. 16c

| CATEGORY | DETAILS |
|---|---|
| RAMs, buffers | Size, ports, number of banks, shared/private banks |
| Cache | Size, associativity, include/exclude |
| Scaling | Number of tiles, number of PEs/tile |
| Memory interface | Number of interfaces, width, burst size |
| Compute blocks (PROCESS_MSG, REDUCE, SEND_MSG, APPLY) | Content generation strategy (e.g., pipelined, multi-cycle), interface pruning |
| PE scheduling | Scheduling scheme (e.g., row/block interleaved, dynamic) |
| Data storage format | Array of structures, structure of arrays, doubly compressed, unique value compressed |
| Pack/unpack logic | Generation strategy, compression on/off |
| Active vertex handling | Bitvector, N-level compressed |

FIG. 20a

| TUNING CONSIDERATIONS | EXAMPLE OF AFFECTED TEMPLATE PARAMETERS |
|---|---|
| Locality of data (x vector) from graph data properties | Cache, interface width |
| Graph data sizes | Sizes of on-chip storage, pack/unpack |
| Graph compute functions | Compute blocks, active vertex handling |
| Graph data structure (non-zeros distribution in adjacency matrix) | Scaling tiles and PEs, memory interfaces, PE scheduling, data storage format |
| Graph data access attributes (read-only, write-only, read/write) | On-chip structures (ports, banks), active vertex handling |
| Graph data types | On-chip structures (ports, banks), pack/unpack |
| Graph data patterns (e.g., commonly recurring values) | Data storage format, pack/unpack logic |

*FIG. 20b*

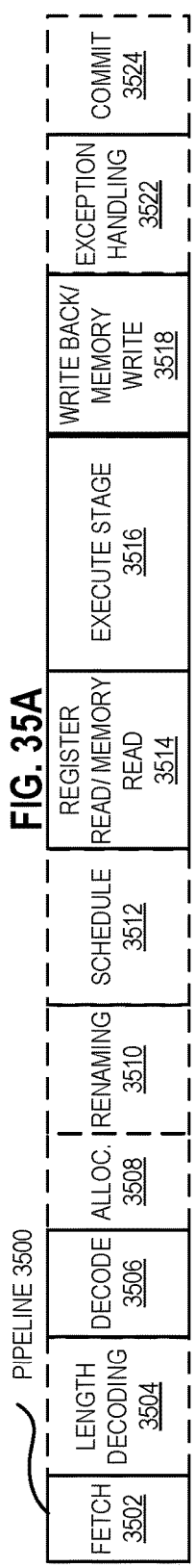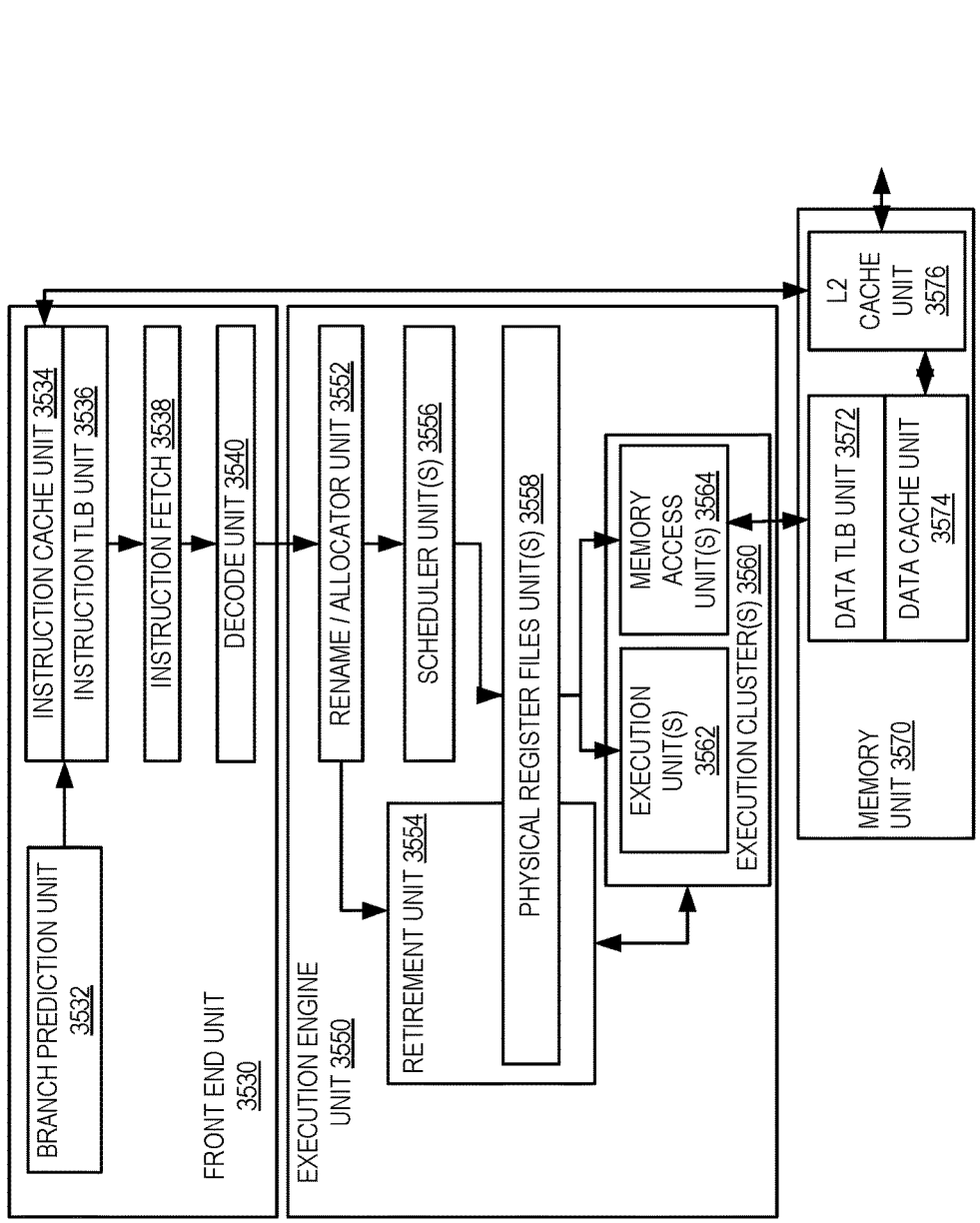
FIG. 35A
FIG. 35B

HARDWARE ACCELERATOR TEMPLATE AND DESIGN FRAMEWORK FOR IMPLEMENTING RECURRENT NEURAL NETWORKS

TECHNICAL FIELD

The disclosure relates generally to electronics, and, more specifically, embodiments relating to hardware accelerator templates and design frameworks for implementing recurrent neural networks and variants thereof.

BACKGROUND

Neural networks, which is an umbrella term including many diverse models and approaches, are a type of artificial intelligence that attempts to imitate the way a human brain works. Neural networks, at their core, work by creating connections between nodes, the computer equivalent of neurons. The organization and weights of the connections determine the output. One key feature of a neural network is that it has an ability to learn. Thus, neural networks are not just complex systems but are adaptive systems that can change their internal structure based on the information that flows through it—typically using weights.

Recurrent Neural Networks (RNNs) are one type of neural network that include recurrent connections (i.e., loops) within the network. FIG. 1 is a block diagram illustrating a RNN 100 and an unrolled recurrent neural network 150. The RNN 100 includes an input value ($I_t$) 102, a node 104 (sometimes referred to as a neuron, etc.) that is executed a number of times via the recurrent connection 105, and an output value ($O_t$) 106. RNNs, within the node 104, typically perform a variety operations; commonly, these are matrix operations and/or vector operations (e.g., a dense matrix*vector, or vector-wise add, multiply, hyperbolic tangent, sigmoid, etc.).

Due to such recurrent connections 105, RNNs are especially useful in analyzing sequences of data. While a typical feedforward (or non-recurrent) neural network produces its output solely based on its current input, an RNN 100 produces its output by considering not only its current input 102, but also based on the history of its previous inputs and/or outputs.

RNNs are currently utilized to provide state-of-the-art results in many applications, e.g., in language modeling. For example, the "unrolled" (or expanded) RNN 150 shows how multiple iterations (or copies of a node 104) can use multiple input values 152A-152D can be used to generate an output value 154. In this case, the input values 152A-152D are a sequence of words, and the RNN 150 can output a predicted next word in the sequence, a probability for a next word in the sequence, etc. Such predictions are particularly useful in various applications such as sentence completion, speech recognition, sentiment analysis, machine translation, etc. In the example illustrated by the unrolled RNN 150, the input values 152A-152D are a 3-word sequence for a sentence "a week has seven", which is provided to the RNN 150, which analyzes its inputs on a word-by-word basis, and ultimately predicts that the next word for the sentence is "days". Thus, one of the appeals of RNNs is that they can make use of "context" via previous information, which can be applied it to a present task, such as using previous words in a sentence to assist in determining what a next word might be.

Thus, the goal of neural networks is to solve problems similar to how a human brain would. To attempt to achieve this functionality, most modern neural network implementations typically utilize a few thousand to a few million neural units and millions of connections or more. Accordingly, the training and use of such networks is extremely computationally expensive, requiring substantial requirements in terms of processing, memory, bandwidth, etc.

Thus, as the benefits of neural networks become apparent and the desire to use them increases, systems and techniques for efficiently implementing neural networks are strongly desired.

BRIEF DESCRIPTION OF THE DRAWINGS

The invention may best be understood by referring to the following description and accompanying drawings that are used to illustrate some embodiments. In the drawings:

FIG. 4 is a block diagram illustrating an exemplary design framework and top-level architecture of a hardware accelerator template according to some embodiments.

FIG. 5 is a block diagram illustrating a table of customizable parameters of a hardware accelerator template and a table of auto-tuning factors according to some embodiments.

FIG. 11 illustrates an exemplary set of operations performed by the processing elements according to some embodiments.

FIGS. 13a, 13b, and 13c illustrate pseudo code of each compute pattern, in which:

FIG. 13a illustrates a row-oriented sparse matrix dense vector multiply (spMdV_csr) according to some embodiments.

FIG. 13b illustrates a column-oriented sparse matrix sparse vector multiply (spMspC_csc) according to some embodiments.

FIG. 13c illustrates a scale and update operation (scale_update) according to some embodiments.

FIG. 16a shows an example graph.

FIG. 16b shows an example of representing the graph of FIG. 16a as an adjacency matrix.

FIG. 16c illustrates a vertex program according to some embodiments.

FIG. 16d illustrates exemplary program code for executing a vertex program according to some embodiments.

FIG. 16e shows a generalized sparse matrix vector multiply (GSPMV) formulation according to some embodiments.

FIG. 20a illustrates a table summarizing the customizable parameters of one implementation of the template according to some embodiments.

FIG. 20b illustrates tuning considerations of one implementation of the framework that performs automatic tuning to determine the best design parameters to use to customize the hardware architecture template in order to optimize it for the input vertex program and (optionally) graph data according to some embodiments.

FIG. 35A is a block diagram illustrating both an exemplary in-order pipeline and an exemplary register renaming, out-of-order issue/execution pipeline according to embodiments of the invention;

FIG. 35B is a block diagram illustrating both an exemplary embodiment of an in-order architecture core and an exemplary register renaming, out-of-order issue/execution architecture core to be included in a processor according to embodiments of the invention;

FIG. 36A is a block diagram of a single processor core, along with its connection to the on-die interconnect network and with its local subset of the Level 2 (L2) cache, according to embodiments of the invention;

FIG. 36B is an expanded view of part of the processor core in FIG. 36A according to embodiments of the invention;

FIG. 38 shown a block diagram of a system in accordance with one embodiment of the present invention;

FIG. 39 is a block diagram of a first more specific exemplary system in accordance with an embodiment of the present invention;

FIG. 40 is a block diagram of a second more specific exemplary system in accordance with an embodiment of the present invention;

FIG. 41 is a block diagram of a SoC in accordance with an embodiment of the present invention.

DETAILED DESCRIPTION

Figure 1:
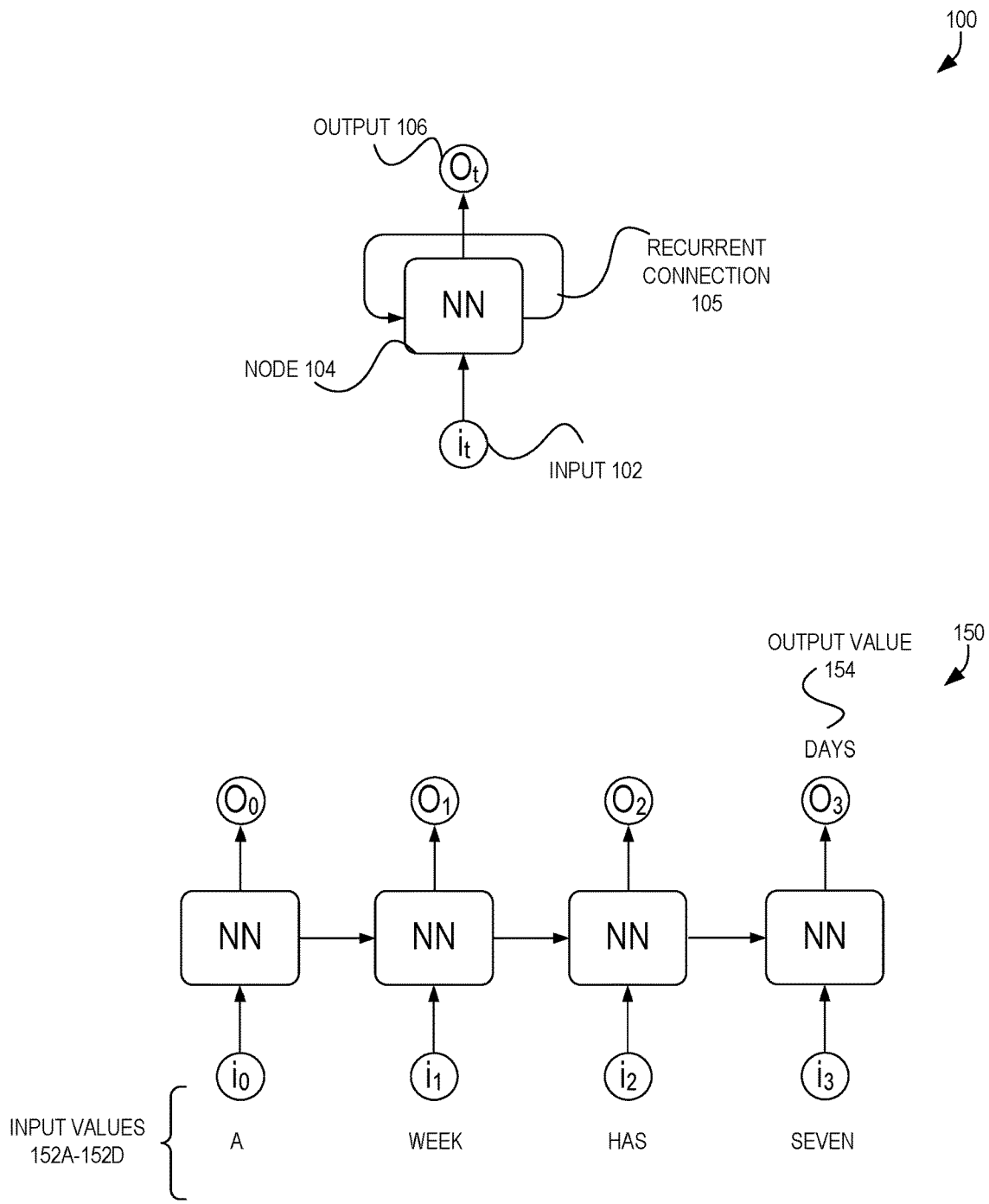
FIG. 1 is a block diagram illustrating a recurrent neural network and an unrolled recurrent neural network.

The following description describes hardware accelerator templates and design frameworks for implementing recurrent neural networks (RNNs) and variants thereof. In this description, numerous specific details such as logic implementations, types and interrelationships of system components, etc., may be set forth in order to provide a more thorough understanding of some embodiments. It will be appreciated, however, by one skilled in the art that the invention may be practiced without such specific details. In other instances, control structures, gate level circuits, and/or full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

Throughout this description, the use of a letter character at the end of a reference numeral (corresponding to an illustrated entity) is not meant to indicate that any particular number of that entity must necessarily exist, but merely that the entity is one of potentially many similar entities. For example, matrix processing units 464A-464M include both "A" and "M" letter suffixes, which means that there could be one matrix processing unit, two matrix processing units, sixteen matrix processing units, etc. Moreover, the use of dashed lines (e.g., matrix processing unit 464M, vector processing unit 470N), as described above, indicates that one or more of the entities could be optional; thus, in some embodiments only one vector processing unit 470A is utilized, whereas in other embodiments multiple vector processing units 470A-470N are utilized. Additionally, the use of different letter characters as reference suffixes for different entities is not meant to indicate that there must be different numbers of these entities. For example, although the vector processing units 470A-470N and the matrix processing units 464A-464M include different letter suffixes—i.e., "N" and "M"—there could be the same number (or different numbers) of these in various embodiments. Similarly, the use of the same letter character as a reference suffix for different entities is not meant to indicate that there must be the same numbers of these entities, although there could be in some embodiments.

As indicated above, RNNs have been applied to help solve a variety of problems. A "standard" version of a RNN is provided in FIG. 2, which is a block diagram illustrating exemplary compositions of a standard RNN 200, a gated recurrent unit (GRU) variant 210, and a long short term memory (LSTM) variant 220.

The standard RNN 200 includes of a fully connected tan h( ) layer with recurrent connections. It accepts as inputs: (1) data at step t, $I_t$, and (2) the output of previous step $O_{t-1}$. The values W and U are dense matrices containing the neural network weights, whereas $I_t$ and $O_{t-1}$ are represented as dense vectors.

Although standards RNNs 200 are useful, one weakness of the standard RNN 200 is its poor ability to learn long-term dependencies. Consider a sentence completion task for the following example input sentences (parts omitted via ellipses): "I grew up in France . . . I speak fluent French." In the last sentence, recent information (i.e., "I speak fluent") suggests that the next word would be a name of a language. However, to correctly predict that the language is "French," a network has to consider information from a much earlier part of the input sentences ("I grew up in France").

However, the standard RNN 200 provides fixed weights between the current input ($I_t$) and the previous history ($O_{t-1}$) in producing the current output ($O_t$), which tends to "forget" information from a much earlier part of the input sequence, making the standard RNN 200 ineffective in learning long-term dependencies.

Accordingly, advanced RNN variants, such as Gated Recurrent Unit (GRU) 210 and Long Short Term Memory (LSTM) 220, have been developed to aim to address this long-term dependency issue.

Unlike the standard RNN 200, a GRU 210 or LSTM 220 have the ability to dynamically adjust the weights on current input and a history to determine how much long-term history to keep and the new information to carry forward.

Figure 2:
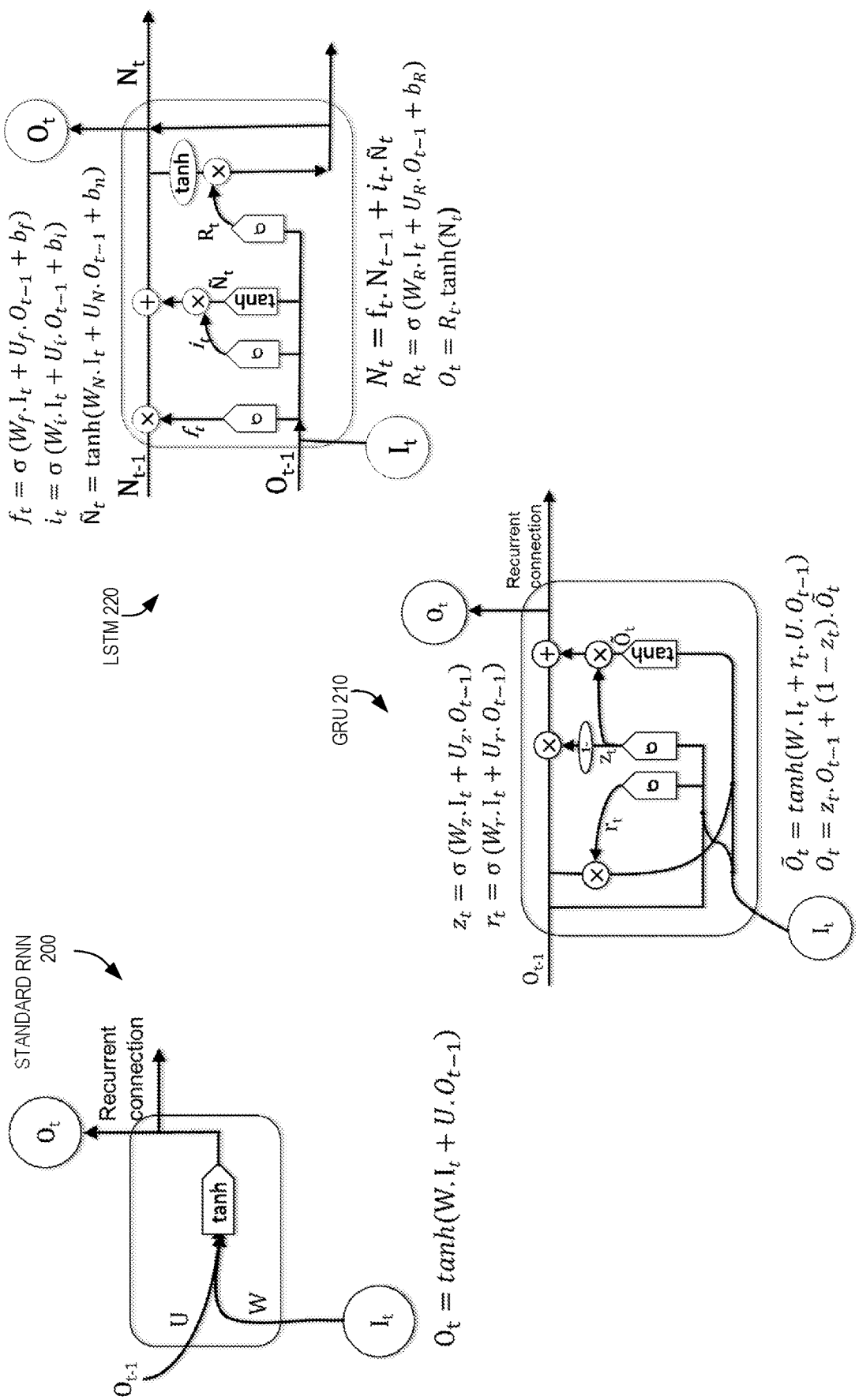
FIG. 2 is a block diagram illustrating exemplary compositions of a standard recurrent neural network, a gated recurrent unit variant, and a long short term memory variant.

Equations are also illustrated in FIG. 2 along with the node part of the standard RNN 200, GRU 210, and LSTM 220. These equations can thus "define" the particular network, and represent how the output ($O_t$) is to be determined based upon the inputs. In this example, the standard RNN 200 has one such equation, whereas GRU 210 has four equations and LSTM 220 has six such equations.

For example, the four equations of GRU 210 are for an update gate, a reset gate, a new memory content, and a final memory content. In addition to each node being dependent upon the output of a previous node, it is also notable that in the case of GRU 210 and LSTM 220, there are data dependencies between some of these equations, and thus, certain equations require the use of the output of other equations within the same node. For example, for LSTM 220, the equation for $N_t$ utilizes both $f_t$ and $i_t$, which are the outputs of other equations. Accordingly, due to these inter-node and intra-node data dependencies, the use of these types of networks can be computationally "expensive" as they are not easily implemented in a parallelizable manner.

Aside from the type of unit (or "node") used in an RNN (e.g., standard, GRU, LSTM), there are also many other possible RNN architecture variations. For example, the number of layers, the number of hidden units per layer, which activation functions (AF) to use (i.e., tan h, sigmoid, etc.) are some of the parameters that describe an RNN variant.

Figure 3:
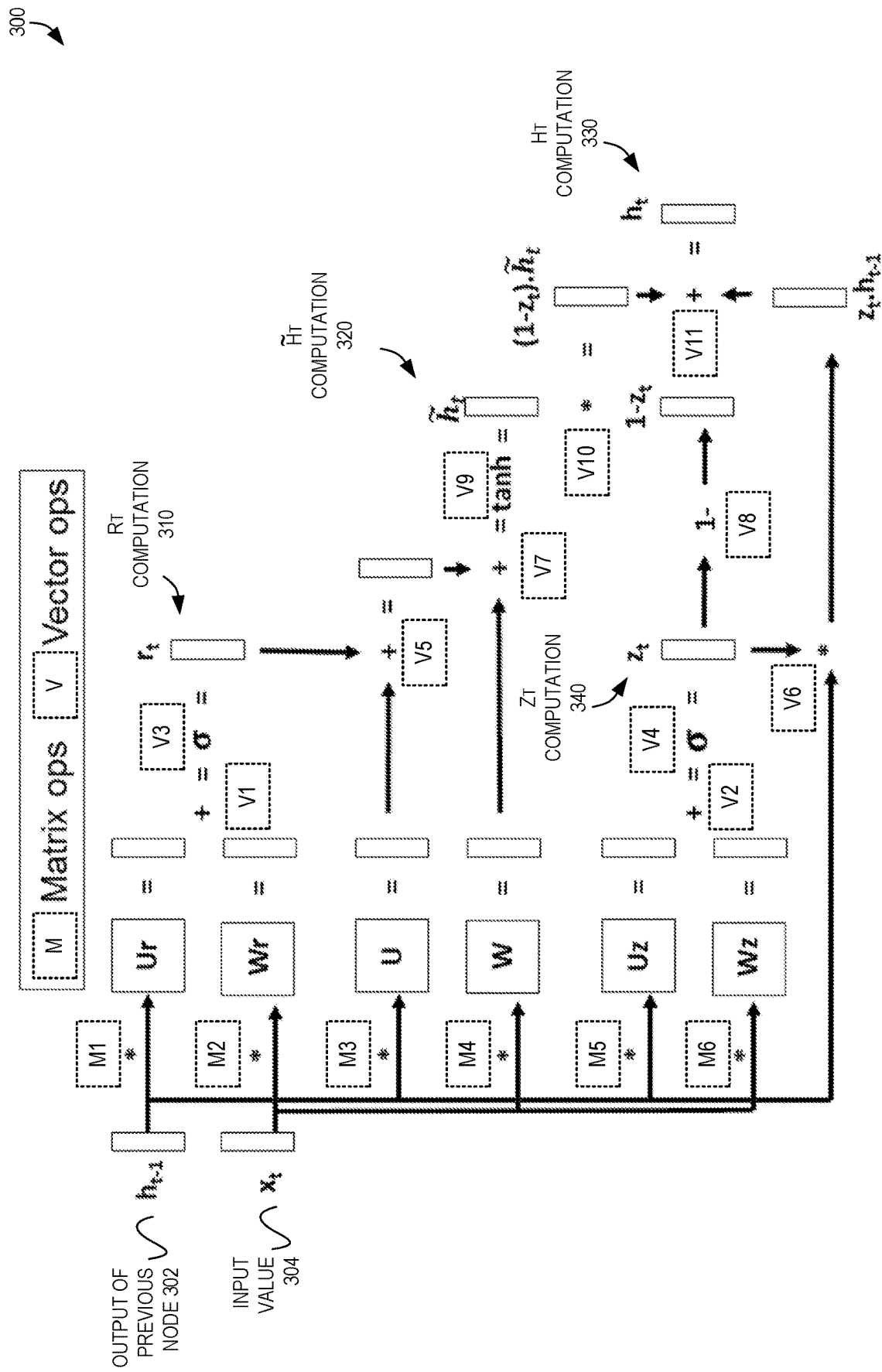
FIG. 3 is a diagram illustrating a composition of matrix and vector operations for implementing a gated recurrent unit variant.

As indicated above, RNNs are typically compositions of matrix and/or vector operations. Thus, although there are many possible variants of RNNs, at its core an RNN is composed of matrix and vector operations with data dependencies among them. As an example, FIG. 3 illustrates the GRU computation as a composition of matrix and vector operations. In this example, the "inputs" include a "regular" input value 304 of $x_t$ (e.g., $I_t$ of previous figures) and an output value 302 from a previous node of $h_{t-1}$ (e.g., $O_t$ of previous figures), and each box with an M (e.g., M1, M2, etc.) represents a matrix operation to be performed, where each box with a V (e.g., V1, V2, V3) represents a vector operation. Accordingly, FIG. 3 shows a visual representation of a "flow graph" of the sets of operations, the involved operands, and the dependencies between data to perform a GRU computation. For example, the $x_t$ and $h_{t-1}$ can be used to determine the value of $r_t$ (via $r_t$ computation 310), which then is used in part to determine the value of $\sim h_t$ (via $\sim h_t$ computation 320), which is used along with the determined value of $z_t$ (via $z_t$ computation 340) to determine the value of $h_t$ (via $h_t$ computation 330).

Although this example is illustrated using visual features, the same information can be determined from the GRU equations in a straightforward manner using a simple algorithm (of a type known to those of ordinary skill in the art) that identifies the types of values used in the GRU equations and the data dependencies therein. Thus, a more mathematical representation of the GRU data flow can be generated using a variety of data structures such as a graph, which is referred to herein as a "flow graph."

Thus, the RNN variants may dictate the sizes and types of the matrix and vector operations, as well as their data dependencies. For example, matrix and vector sizes can be related to the number of hidden units in the RNN, and the activation function (AF) type (tan h, sigmoid, etc.) can relate to the type of vector operations. Thus, many matrix and vector operations in RNNs make them computationally intensive, so being able to execute RNNs as efficient as possible is of critical importance.

Accordingly, to address the need for highly-efficient executions of RNNs, embodiments disclosed herein provide a design framework that can be based on a customizable and programmable RNN hardware accelerator architecture template to enable automated development of RNN hardware accelerator instances that are specialized to meet user-provided sets of design constraints and goals while being flexible through programmability to execute arbitrary RNN variants. Thus, some embodiments enable customizable and programmable hardware accelerator instances for RNNs that can deliver extreme execution efficiency, while being able to flexibility execute arbitrary RNNs. In some embodiments, the hardware accelerator instances can be deployed using a variety of types of hardware, including but not limited to Field Programmable Gate Arrays (FPGAs) as well as Application-Specific Integrated Circuits (ASICs).

Thus, some embodiments can produce an accelerator instance optimized for a target FPGA chip with a particular number of hardware multiply and on-chip RAM resources, and some embodiments can produce an accelerator instance optimized for an ASIC for a particular market segment, programmable to support all RNN applications in this segment. For example, in embodiments where the accelerator instance comprises RTL code, the RTL code can be used as an input for a standard ASIC developmental tool (e.g., a logic synthesis tool) to generate an ASIC design.

Furthermore, in some embodiments each accelerator instance is programmable. Thus, even though the design can be customized for certain design goals, the accelerator itself can be programmed to support execution of arbitrary RNN variants. Optionally, if programmability is not needed, the framework can be configured to generate more efficient fixed-control units within the accelerator at the cost of programmability.

Thus, embodiments enable the creation of RNN accelerators that can flexibly execute a wide range of RNN variants with optimal execution efficiency for the user-provided design constraints and goals.

FIG. 4 is a block diagram illustrating an exemplary design framework 400 and top-level architecture of a hardware accelerator template 450 according to some embodiments.

The design framework 400 is shown as including a template mapping module 404, a validation module 410, and an automatic-tuning 416 module. The design framework 400 can be, for example, a software application that is executed by one or more computing devices. In some embodiments, one or more of these modules are not implemented or used. As one example, in some embodiments the design framework 400 includes the template mapping module 404 but not the validation module 410 or automatic-tuning 416 module; in other embodiments, the design framework 400 includes the template mapping module 404 and the validation module 410, but not the automatic-tuning 416 module.

As illustrated, the design framework 400 can take hardware (HW) design constraints 402 as an input. The HW design constraints 402 can specify what hardware should or should not be included (or utilized) by the resultant accelerator instance 406. For example, the HW design constraints 402 can include constraints such as a number of hardware multiply and adder resources to use, a number of pipeline stages in the multiply and adder units to use, available memory bandwidths, the type and/or amounts of on-chip RAMs, etc.

The design framework 400, in some embodiments, utilizes optimization goal inputs 408, such as latency, throughput, power use, required layout area, etc., as inputs, which can be used when making design instances for the accelerator instance to meet the goals of the particular user.

The design framework 400, in some embodiments, utilizes inputs such as a specification 414 of the particular RNN architecture targets, such as range of hidden unit sizes, type of activation functions (AFs), etc. In some embodiments, these inputs are not used, but in others they are used and allow the generated accelerator instances to be specialized based on their target RNN applications. Additionally or alternatively, the inputs can include dataset properties 415, such as the acceptable data types (e.g., float, double), expected lengths of input sequences, type of compression techniques amenable to the data, etc. This also is used in some embodiments but not in others, but its inclusion can allow the generated accelerator instances to be specialized to their target datasets.

Given these inputs 402/408/414/415, the framework 400 module can perform automatic tuning (via automatic tuning module 416) to explore the design space to determine an optimal set of customization parameters to be used in the design.

For example, we turn to FIG. 5, which is a block diagram illustrating a table 500 of customizable parameters of a hardware accelerator template and a table 550 of auto-tuning factors according to some embodiments. Regarding the table 550 of auto-tuning factors, these parameters 502 can be applied to a customizable hardware template for RNN accelerator architecture, which will be detailed below. As shown, a variety of tuning considerations can be utilized, such as the RNN unit types (e.g., standard RNN, GRU, LTSM), RNN architecture parameters (e.g., number of layers, sizes of hidden layers), dataset properties (e.g., sizes, distribution of values), optimization goals (e.g., latency, throughput), and/or design constraints (e.g., how many multiply units, random access memories (RAMs)). The second column 554 shows what parameters of the hardware accelerator template may be affected by the tuning considerations 552, such as the amount or configuration of various hardware blocks, e.g., matrix processing units (MPUs), vector processing units (VPUs), scratchpads (SPADs), data management units (DMUs), caches, pack/unpack units, etc.

Turning back to the FIG. 4, framework 400 module can include a template mapping module 404 that produces a customized accelerator instance (e.g., such as synthesizable register transfer language (RTL) utilizing a hardware description language (HDL) such as Verilog, VHDL, etc.) of the hardware accelerator that best meets the input constraints 402 and optimization goals 408. Alongside the RTL, in some embodiments the framework 400 module also generates a compiler to program the accelerator, e.g., via providing micro-code executed by control units, as described further herein.

Aside from auto-tuning 416 and template mapping 404, the framework 400 module in some embodiments also performs validations (via validation module 410), which includes comparing the generated accelerator instance (e.g., RTL) against reference functional and cycle-level performance models derived from the provided inputs constraints 402/goals 408. This validation checks for functional correctness, as well as whether the design meets the expected performance.

As described, the template mapping module 404 can map the design constraints 402, subject to the optimization goals 408 and/or RNN specs 414 and/or dataset properties 415 if they exist, to a hardware accelerator template.

One example of a hardware accelerator template 450 is shown at the bottom of FIG. 4 that can be used to efficiently implement RNNs and variants thereof. The hardware accelerator template 450 includes one or more matrix processing units 464A-464M (MPUs), which includes one or more floating-point multiply-accumulate units 466 (FMAs, also sometimes called floating-point multiply-add units) and an MPU control unit 468. The hardware accelerator template 450 also includes one or more vector processing units 470A-470N (VPUs), which includes one or more FMAs 472 and/or one or more activation function blocks (for performing needed activation functions efficiently in hardware) and a VPU control unit 474. As shown, the MPUs 464A-464M and VPUs 470A-470N may be directly connected (as shown by arrows 490) to allow the MPUs 464A-464M and VPUs 470A-470N to pass computed data between the two, thus reducing delay due to data dependencies that would be introduced in other systems.

In some embodiments, the hardware accelerator template 450 also includes one or more data management units (DMUs) 454A-454Z to handle data movements in and out of the accelerator, each of which can include one or more scratchpads (SPADs) 456 and caches ($) 458.

The scratchpads can be used to keep the matrix and vector data on-chip for the MPUs and VPUs to process. The scratchpads can be multi-banked/multi-ported accordingly to deliver the necessary bandwidth to feed the need for the MPUs and VPUs. The cache can optionally be used to take advantage of data locality. For example, in applications that accept word sequences as inputs, certain words can occur more often than others. Thus, it is beneficial to cache the vector representations of these frequent words to avoid accessing them from outside of the accelerator each time they are encountered.

The DMUs also includes a pack/unpack unit 462 for handling various data formats, e.g., 32-bit double, 16-bit float, N-bit custom, and/or for processing compressed data, such as compressed representations of matrices.

In some embodiments, the MPU, VPU, and/or DMU includes control units (MPU control unit 468, VPU control unit 474, DMU control unit 460) that are based on programmable micro-codes. These units can orchestrate the operations among the MPUs, VPUs, and DMU to facilitate certain composition of matrix and vector operation executions. Thus, these control units can control the flow of data and processing of data within the accelerator to perform the desired RNN.

Accordingly, the hardware accelerator template 450 can be viewed as a description of components that can be used in a physical hardware accelerator, in which particular component numbers, types, and/or arrangements can be determined by the template mapping module 404 (e.g., based upon the hardware design constraints 402, optimization goals 408, RNN specs, and/or dataset properties) to result in a custom, optimized hardware accelerator design that is specific to a particular application.

Turning back to FIG. 5, the template parameters table 500 shows customization parameters of the template that can be utilized, in which various blocks are shown in column 502.

The architecture contains a set of matrix and vector processing units (MPUs, VPUs) that are customizable to handle a variety of design constraints/goals (e.g., to target certain matrix/vector sizes, adder/multiplier designs, amount of on-chip RAMs). Column 504 illustrates exemplary parameters of the blocks that can be modified; of course, this set is merely exemplary and other parameters (and blocks) can be utilized in various embodiments (and selected by those of ordinary skill in the art) without departing from the scope of the invention.

Figure 6:
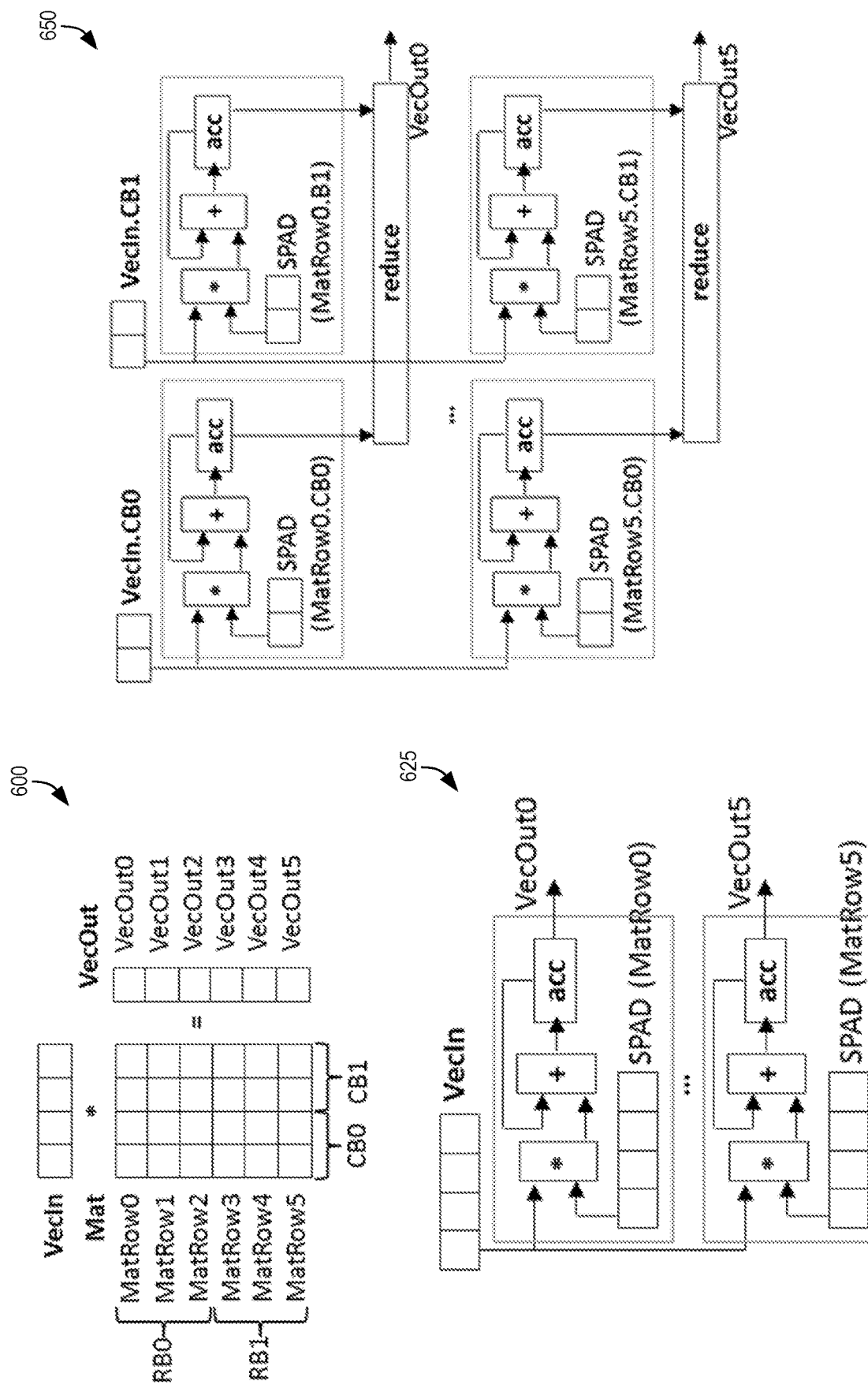
FIG. 6 is a block diagram illustrating matrix processing unit customizations, including a matrix multiplication, a matrix processing unit using six floating-point-multiple add units, and a matrix processing unit using twelve floating-point-multiple add units according to some embodiments.

FIG. 6 shows an example of how a 6×4 matrix multiplication (shown as 600) can be mapped to two possible customized MPUs that use six floating-point multiply-and-add (FMA) units (as 625) and twelve FMA units (as 650).

The 6×4 matrix multiplication (shown as 600) illustrates how an input vector (VecIn) can be multiplied against a matrix having 6 rows and 4 columns, to result in an output vector (VecOut). As shown, the 6 rows can be split into two grouping: rows 0-2, and rows 3-5.

The first customizable MPU 625 can implement this multiplication 600 using 6 FMAs, each of which operates upon a full row of the matrix to generate one value of the result vector (VecOut).

In contrast, the second customizable MPU 650 can implement the multiplication 600 using 12 FMAs, where groupings of two FMAs will together generate one value of the output vector by each working on two values from a row, instead of working on four values from a row, to together generate one value of the result vector (VecOut). Thus, this design can execute the 6×4 matrix multiplication faster (than the 6 FMA design 625), but at the expense of requiring more hardware resources, layout size, power, etc. Accordingly, based upon the inputs 402/408/414/415, the first design 625 could be selected when a constraint 402 or goal 408 causes a desire for fewer hardware blocks to be utilized, whereas the second design 650 could be selected when a constraint 402 or goal 408 causes a desire for optimal performance to be implemented.

Figure 7:
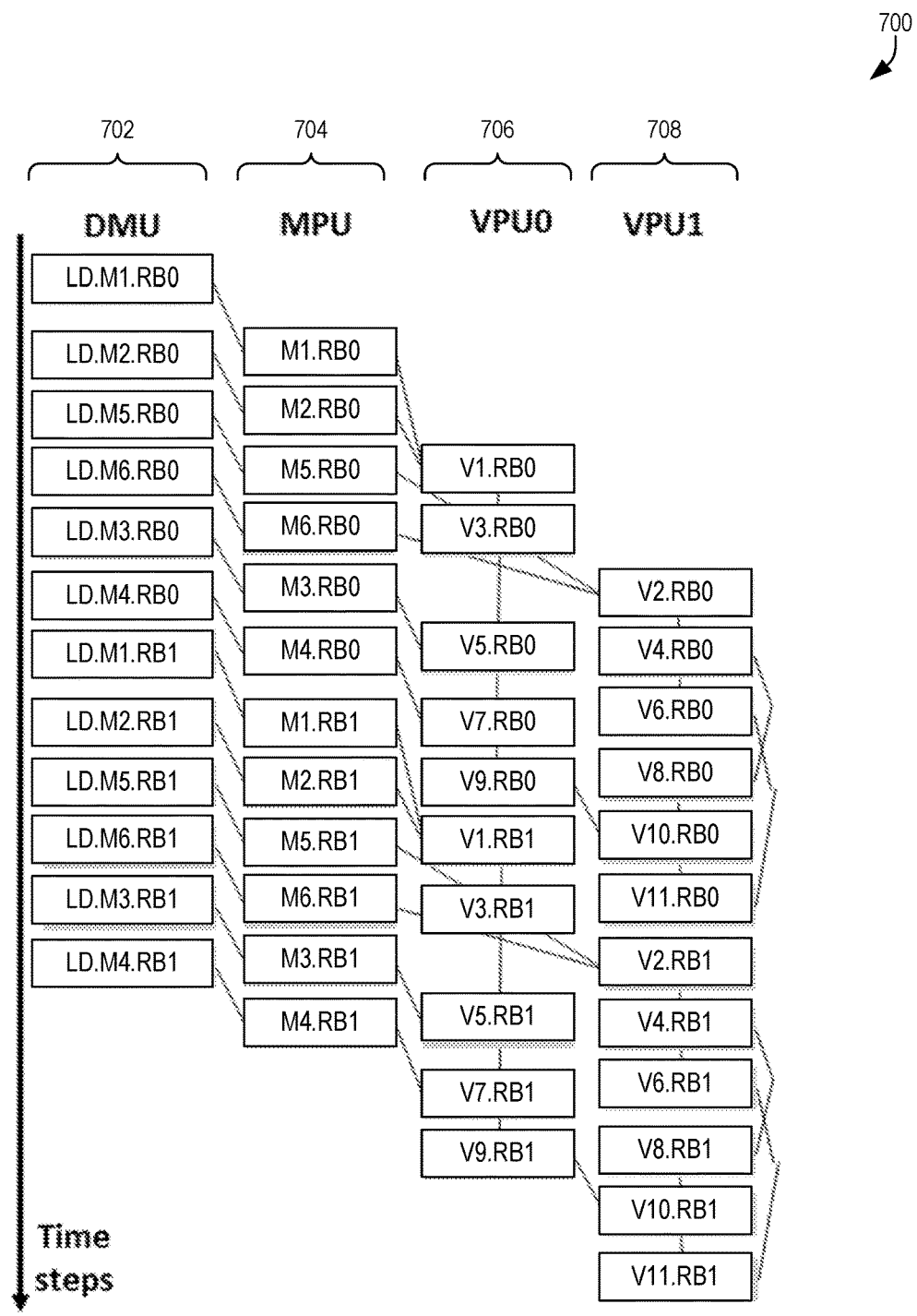
FIG. 7 is a block diagram illustrating exemplary programming for a pipelined gated recurrent unit computation according to some embodiments.

As described above, the control units (MPU control unit 468, VPU control unit 474, DMU control unit 460) can be based on programmable micro-codes to orchestrate the operations among the MPUs, VPUs, and DMU to facilitate certain composition of matrix and vector operation executions for the RNN. FIG. 7 is a block diagram illustrating an example of how an accelerator instance with 2 VPUs, 1 MPU, and 1 DMU could be programmed to execute the GRU 210 computation illustrated in FIG. 2.

Each box in the figure is a micro-code command executed by the corresponding DMU 702, MPU 704, or VPUs 706/708 that is shown above it. For example, the first box for the DMU 702 is a "load" command of row 0 from matrix 1.

The lines connecting the boxes show data dependencies. Each micro-code command is executed when its dependencies have been resolved. The micro-codes are produced by a compiler for the accelerator (as described above with regard to FIG. 4), which can take as inputs the RNN architecture specifications 414, optimization goals 408, and/or dataset properties 415.

Accordingly, embodiments provide a design framework for automated—as opposed to manual—development (e.g., tuning, optimization, validation) of hardware accelerators to efficiently implement RNNs.

Figure 8:
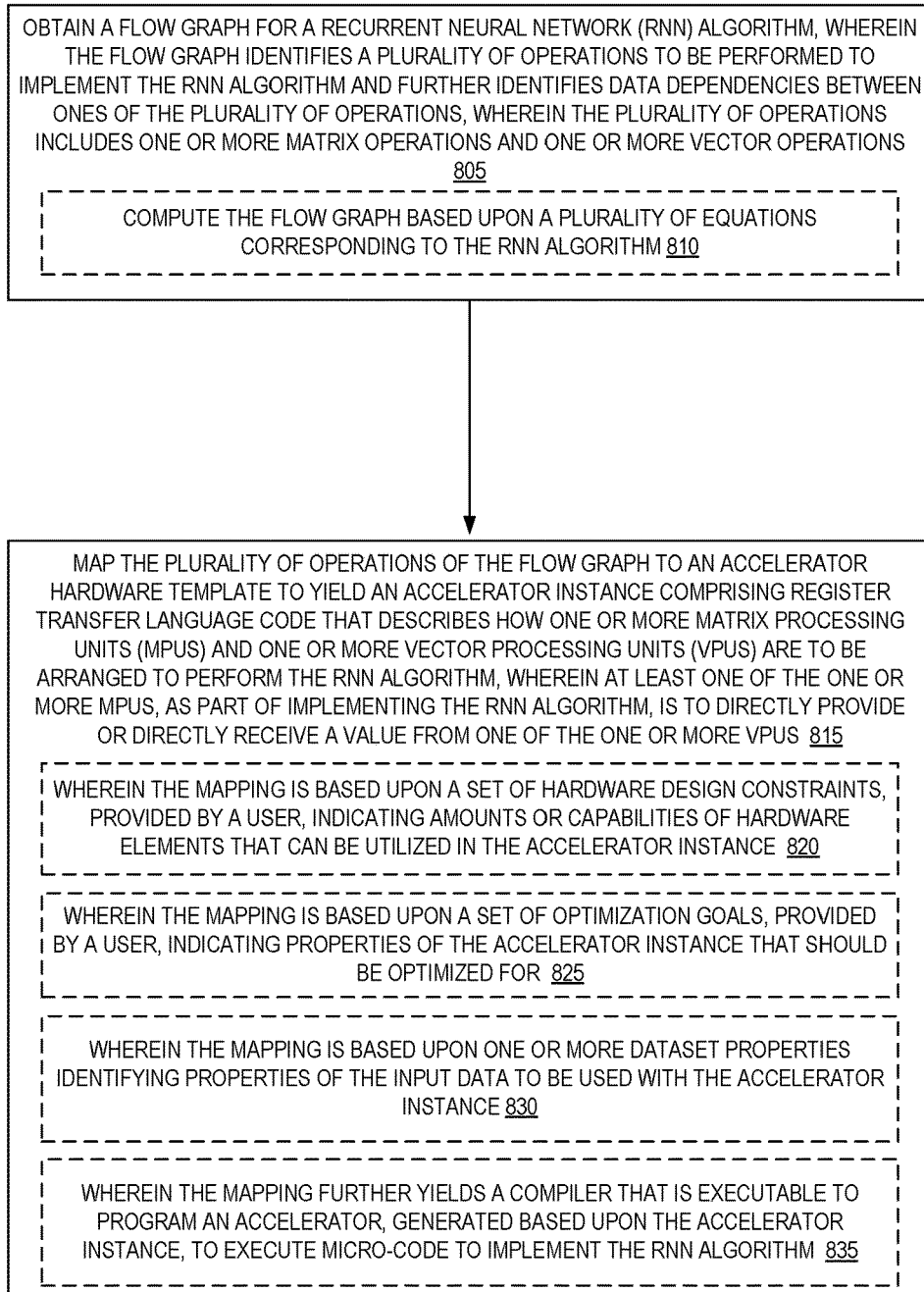
FIG. 8 is a flow diagram illustrating a flow of operations for generating an accelerator instance to implement a recurrent neural network according to some embodiments.

FIG. 8 is a flow diagram illustrating a flow 800 of operations for generating an accelerator instance to implement a recurrent neural network according to some embodiments.

The operations in this and other flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams. In some embodiments, this flow 600 is performed by the design framework module 400 of FIG. 4.

Flow 800 includes, at block 805, obtaining a flow graph for a recurrent neural network (RNN) algorithm. The flow graph identifies a plurality of operations to be performed to implement the RNN algorithm and further identifies data dependencies between ones of the plurality of operations. The plurality of operations includes one or more matrix operations and one or more vector operations.

Optionally, in some embodiments block 805 includes block 810, which includes computing the flow graph based upon a plurality of equations corresponding to the RNN algorithm.

Flow 800 also includes, at block 815, mapping the plurality of operations of the flow graph to an accelerator hardware template to yield the accelerator instance comprising register transfer language code that describes how one or more matrix processing units (MPUs) and one or more vector processing units (VPUs) are to be arranged to perform the RNN algorithm. At least one of the one or more MPUs, as part of implementing the RNN algorithm, is to directly provide or directly receive a value from one of the one or more VPUs.

Optionally, in some embodiments, block 815 includes block 820, where the mapping is based upon hardware design constraints indicating amounts or capabilities of hardware elements that can be utilized in the accelerator instance.

Optionally, in some embodiments, block 815 includes block 825, where the mapping is based upon optimization goals indicating properties of the accelerator instance that should be optimized for.

Optionally, in some embodiments, block 815 includes block 830, where the mapping is based upon one or more dataset properties identifying properties of the input data to be used with the accelerator instance.

Optionally, in some embodiments, block 815 includes block 835, where the mapping further yields a compiler that is executable to program an accelerator, generated based upon the accelerator instance, to execute micro-code to implement the RNN algorithm.

Examples

According to some embodiments, a method in a design framework module implemented by an electronic device for generating an accelerator instance optimized to implement a recurrent neural network (RNN) algorithm includes: obtaining, by the design framework module, a flow graph for the RNN algorithm, the flow graph identifying a plurality of operations to be performed to implement the RNN algorithm and further identifying data dependencies between ones of the plurality of operations, wherein the plurality of operations include one or more matrix operations and one or more vector operations; and mapping, by the design framework module, the plurality of operations of the flow graph to an accelerator hardware template to yield the accelerator instance comprising register transfer language (RTL) code that describes how one or more matrix processing units (MPUs) and one or more vector processing units (VPUs) are to be arranged to perform the RNN algorithm, wherein at least one of the one or more MPUs, as part of implementing the RNN algorithm, is to directly provide or directly receive a value from one of the one or more VPUs.

In some embodiments, the obtaining comprises: computing, by the design framework module, the flow graph based upon a plurality of equations corresponding to the RNN algorithm. In some embodiments, the mapping is based upon hardware design constraints indicating amounts or capabilities of hardware elements that can be utilized in the accelerator instance. In some embodiments, the mapping is based upon optimization goals indicating properties of the accelerator instance that should be optimized for. In some embodiments, the mapping is based upon one or more dataset properties identifying properties of the input data to be used with the accelerator instance. In some embodiments, the mapping further yields a compiler that is executable to program an accelerator, generated based upon the accelerator instance, to execute micro-code to implement the RNN algorithm. In some embodiments, the compiler is to program the accelerator by causing a control unit of the accelerator to execute at least some of the micro-code. In some embodiments, the method further includes validating a performance of and functionalities of the generated accelerator instance against one or more performance and functional models derived from hardware design constraints and optimization goals. In some embodiments, the method further comprises at least one of: programming a Field Programmable Gate Array (FPGA), using the accelerator instance, to cause the FPGA to become operable to implement the RNN algorithm; and providing the RTL code to be used as an input to a logic synthesis tool to yield a circuit design for an Application-Specific Integrated Circuit. In some embodiments, the RNN algorithm is either: a gated recurrent unit (GRU) RNN variant; or a long short term memory (LSTM) RNN variant.

According to some embodiments, a non-transitory machine readable storage medium having instructions which, when executed by one or more processors of a device, cause the device to implement a design framework module to generate an accelerator instance optimized to implement a recurrent neural network (RNN) algorithm by performing operations comprising: obtaining a flow graph for the RNN algorithm, the flow graph identifying a plurality of operations to be performed to implement the RNN algorithm and further identifying data dependencies between ones of the plurality of operations, wherein the plurality of operations include one or more matrix operations and one or more vector operations; and mapping the plurality of operations of the flow graph to an accelerator hardware template to yield the accelerator instance comprising register transfer language (RTL) code that describes how one or more matrix processing units (MPUs) and one or more vector processing units (VPUs) are to be arranged to perform the RNN algorithm, wherein at least one of the one or more MPUs, as part of implementing the RNN algorithm is to directly provide or directly receive a value from one of the one or more VPUs.

In some embodiments, the obtaining comprises: computing the flow graph based upon a plurality of equations corresponding to the RNN algorithm. In some embodiments, the mapping is based upon hardware design constraints indicating amounts or capabilities of hardware elements that can be utilized in the accelerator instance. In some embodiments, the mapping is based upon optimization goals indicating properties of the accelerator instance that should be optimized for. In some embodiments, the mapping is based upon one or more dataset properties identifying properties of the input data to be used with the accelerator instance. In some embodiments, the mapping further yields a compiler that is executable to program an accelerator, generated based upon the accelerator instance, to execute micro-code to implement the RNN algorithm. In some embodiments, the compiler is to program the accelerator by causing a control unit of the accelerator to execute at least some of the micro-code. In some embodiments, the operations further comprise: validating a performance of and functionalities of the generated accelerator instance against one or more performance and functional models derived from hardware design constraints and optimization goals. In some embodiments, the operations further comprise at least one of: programming a Field Programmable Gate Array (FPGA), using the accelerator instance, to cause the FPGA to become operable to implement the RNN algorithm; and providing the RTL code to be used as an input to a logic synthesis tool to yield a circuit design for an Application-Specific Integrated Circuit. In some embodiments, the RNN algorithm is either: a gated recurrent unit (GRU) RNN variant; or a long short term memory (LSTM) RNN variant.

According to some embodiments, a device comprises: one or more processors; and one or more non-transitory machine readable storage media having instructions which, when executed by the one or more processors, cause the device to implement a design framework module that is to generate an accelerator instance optimized to implement a recurrent neural network (RNN) algorithm by performing operations comprising: obtaining a flow graph for the RNN algorithm, the flow graph identifying a plurality of operations to be performed to implement the RNN algorithm and further identifying data dependencies between ones of the plurality of operations, wherein the plurality of operations include one or more matrix operations and one or more vector operations; and mapping the plurality of operations of the flow graph to an accelerator hardware template to yield the accelerator instance comprising register transfer language (RTL) code that describes how one or more matrix processing units (MPUs) and one or more vector processing units (VPUs) are to be arranged to perform the RNN algorithm, wherein at least one of the one or more MPUs, as part of implementing the RNN algorithm is to directly provide or directly receive a value from one of the one or more VPUs.

According to some embodiments, a system comprises: a device comprising one or more processors and one or more non-transitory machine readable storage media having instructions which, when executed by the one or more processors, cause the device to implement a design framework module that is to generate an accelerator instance optimized to implement a recurrent neural network (RNN) algorithm by performing operations comprising: obtaining a flow graph for the RNN algorithm, the flow graph identifying a plurality of operations to be performed to implement the RNN algorithm and further identifying data dependencies between ones of the plurality of operations, wherein the plurality of operations include one or more matrix operations and one or more vector operations; and mapping the plurality of operations of the flow graph to an accelerator hardware template to yield the accelerator instance comprising register transfer language (RTL) code that describes how one or more matrix processing units (MPUs) and one or more vector processing units (VPUs) are to be arranged to perform the RNN algorithm, wherein at least one of the one or more MPUs, as part of implementing the RNN algorithm is to directly provide or directly receive a value from one of the one or more VPUs.

According to some embodiments, a device comprises: a first means for obtaining a flow graph for a recurrent neural network (RNN) algorithm, the flow graph identifying a plurality of operations to be performed to implement the RNN algorithm and further identifying data dependencies between ones of the plurality of operations, wherein the plurality of operations include one or more matrix operations and one or more vector operations; and a second means for mapping the plurality of operations of the flow graph to an accelerator hardware template to yield the accelerator instance comprising register transfer language (RTL) code that describes how one or more matrix processing units (MPUs) and one or more vector processing units (VPUs) are to be arranged to perform the RNN algorithm, wherein at least one of the one or more MPUs, as part of implementing the RNN algorithm is to directly provide or directly receive a value from one of the one or more VPUs.

Embodiments disclosed herein utilize electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as one or more processors coupled to one or more machine-readable storage media to store code for execution on the processor(s) and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Exemplary Accelerator Architectures
Overview

In some implementations, an accelerator is coupled to processor cores or other processing elements to accelerate certain types of operations such as graphics operations, machine-learning operations, pattern analysis operations, and (as described in detail below) sparse matrix multiplication operations, to name a few. The accelerator may be communicatively coupled to the processor/cores over a bus or other interconnect (e.g., a point-to-point interconnect) or may be integrated on the same chip as the processor and communicatively coupled to the cores over an internal processor bus/interconnect. Regardless of the manner in which the accelerator is connected, the processor cores may allocate certain processing tasks to the accelerator (e.g., in the form of sequences of instructions or tops) which includes dedicated circuitry/logic for efficiently processing these tasks.

Figure 9:
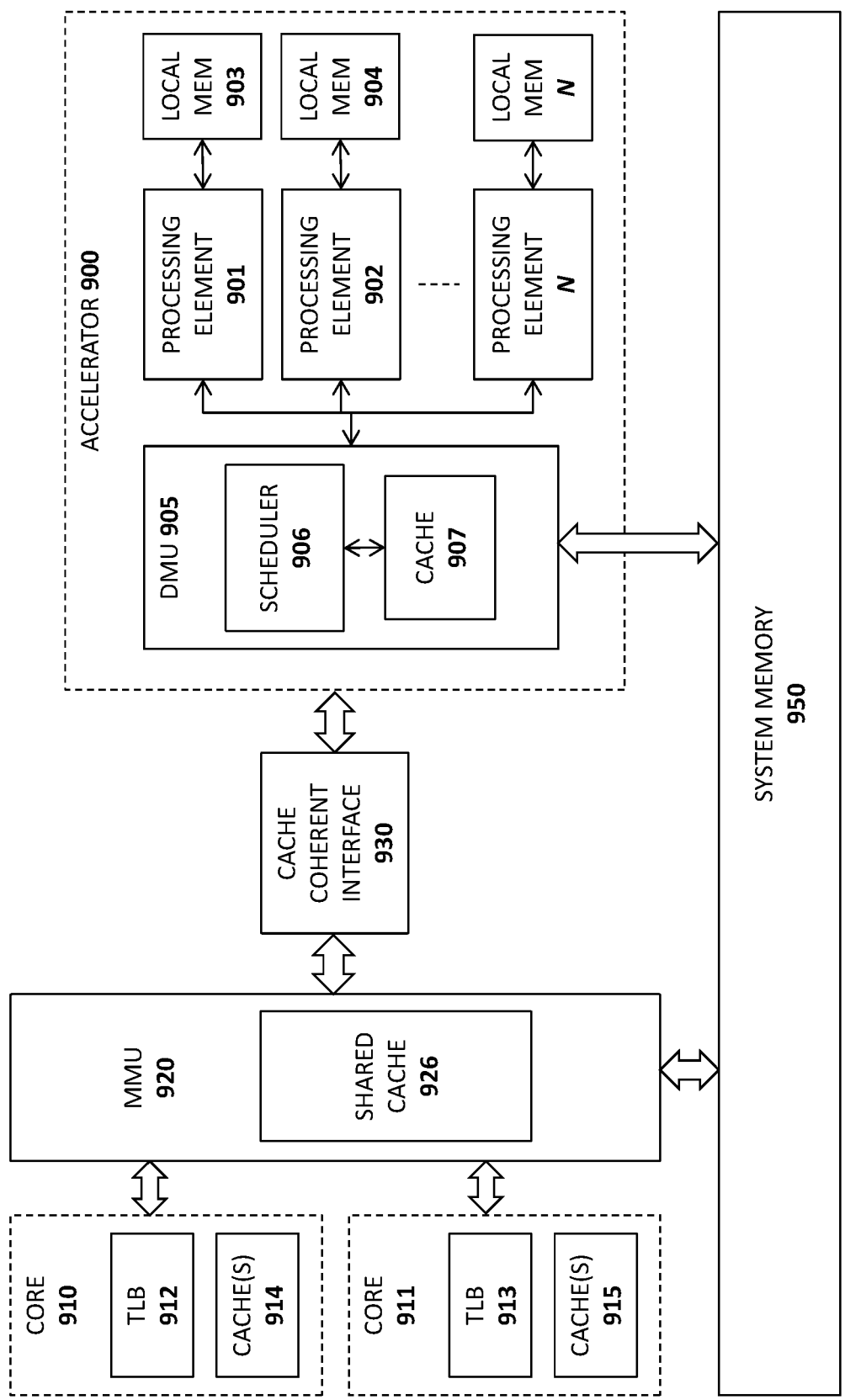
FIG. 9 illustrates an exemplary implementation in which an accelerator is communicatively coupled to a plurality of cores through a cache coherent interface according to some embodiments.

FIG. 9 illustrates an exemplary implementation in which an accelerator 900 is communicatively coupled to a plurality of cores 910-911 through a cache coherent interface 930. Each of the cores 910-911 includes a translation lookaside buffer 912-913 for storing virtual to physical address translations and one or more caches 914-915 (e.g., L1 cache, L2 cache, etc.) for caching data and instructions. A memory management unit 920 manages access by the cores 910-911 to system memory 950 which may be a dynamic random access memory DRAM. A shared cache 926 such as an L3 cache may be shared among the processor cores 910-911 and with the accelerator 900 via the cache coherent interface 930. In one implementation, the cores ATA1010T-1011, MMU 920 and cache coherent interface 930 are integrated on a single processor chip.

The illustrated accelerator 900 includes a data management unit 905 with a cache 907 and scheduler AT006 for scheduling operations to a plurality of processing elements 901-902, N. In the illustrated implementation, each processing element has its own local memory 903-904, N. As described in detail below, each local memory 903-904, N may be implemented as a stacked DRAM.

In one implementation, the cache coherent interface 930 provides cache-coherent connectivity between the cores 910-911 and the accelerator 900, in effect treating the accelerator as a peer of the cores 910-911. For example, the cache coherent interface 930 may implement a cache coherency protocol to ensure that data accessed/modified by the accelerator 900 and stored in the accelerator cache 907 and/or local memories 903-904, N is coherent with the data stored in the core caches 910-911, the shared cache 926 and the system memory 950. For example, the cache coherent interface 930 may participate in the snooping mechanisms used by the cores 910-911 and MMU 920 to detect the state of cache lines within the shared cache 926 and local caches 914-915 and may act as a proxy, providing snoop updates in response to accesses and attempted modifications to cache lines by the processing elements 901-902, N. In addition, when a cache line is modified by the processing elements 901-902, N, the cache coherent interface 930 may update the status of the cache lines if they are stored within the shared cache 926 or local caches 914-915.

In one implementation, the data management unit 1005 includes memory management circuitry providing the accelerator 900 access to system memory 950 and the shared cache 926. In addition, the data management unit 905 may provide updates to the cache coherent interface 930 and receiving updates from the cache coherent interface 930 as needed (e.g., to determine state changes to cache lines). In the illustrated implementation, the data management unit 905 includes a scheduler 905 for scheduling instructions/operations to be executed by the processing elements 901-902, N. To perform its scheduling operations, the scheduler 906 may evaluate dependences between instructions/operations to ensure that instructions/operations are executed in a coherent order (e.g., to ensure that a first instruction executes before a second instruction which is dependent on results from the first instruction). Instructions/operations which are not inter-dependent may be executed in parallel on the processing elements 901-902, N.

Accelerator Architecture for Matrix and Vector Operations

Figure 10:
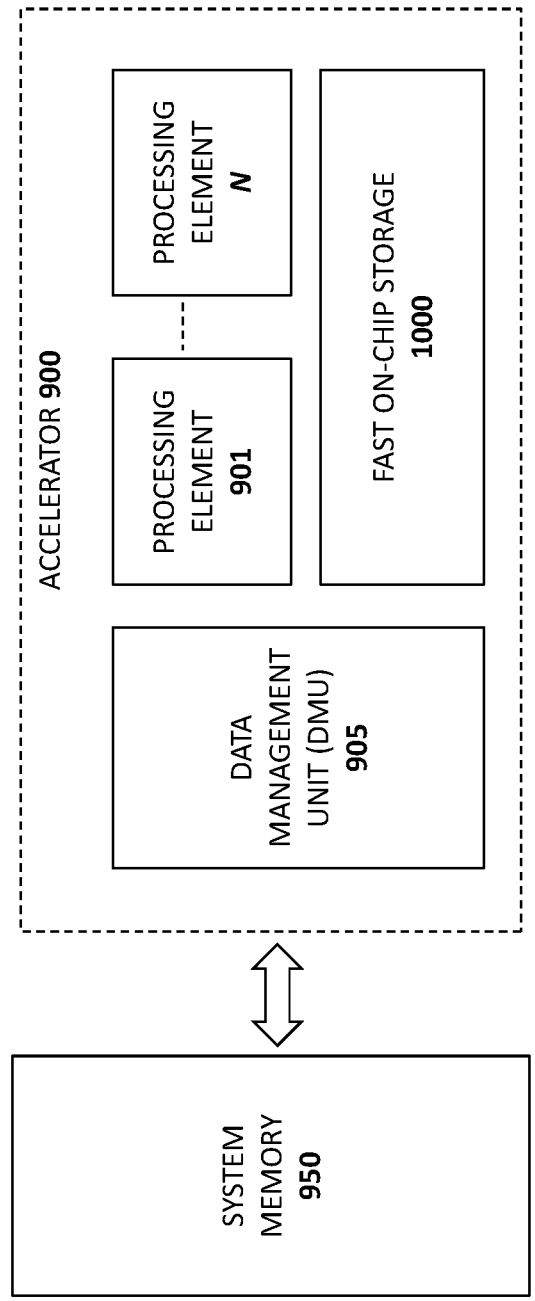
FIG. 10 illustrates another view of an accelerator according to some embodiments.

FIG. 10 illustrates another view of accelerator 900 and other components previously described including a data management unit 905, a plurality of processing elements 901-N, and fast on-chip storage 1000 (e.g., implemented using stacked local DRAM in one implementation). In one implementation, the accelerator 900 is a hardware accelerator architecture and the processing elements 901-N include circuitry for performing matrix*vector and vector*vector operations, including operations for sparse/dense matrices. In particular, the processing elements 901-N may include hardware support for column and row-oriented matrix processing and may include microarchitectural support for a "scale and update" operation such as that used in machine learning (ML) algorithms.

The described implementations perform matrix/vector operations which are optimized by keeping frequently used, randomly accessed, potentially sparse (e.g., gather/scatter) vector data in the fast on-chip storage 1000 and maintaining large, infrequently used matrix data in off-chip memory (e.g., system memory 950), accessed in a streaming fashion whenever possible, and exposing intra/inter matrix block parallelism to scale up.

Implementations of the processing elements 901-N process different combinations of sparse matrixes, dense matrices, sparse vectors, and dense vectors. As used herein, a "sparse" matrix or vector is a matrix or vector in which most of the elements are zero. By contrast, a "dense" matrix or vector is a matrix or vector in which most of the elements are non-zero. The "sparsity" of a matrix/vector may be defined based on the number of zero-valued elements divided by the total number of elements (e.g., m×n for an m×n matrix). In one implementation, a matrix/vector is considered "sparse" if its sparsity if above a specified threshold.

An exemplary set of operations performed by the processing elements 901-N is illustrated in the table in FIG. 11. In particular the operation types include a first multiply 1100 using a sparse matrix, a second multiply 1101 using a dense matrix, a scale and update operation 1102m and a dot product operation 1103. Columns are provided for a first input operand 1110 and a second input operand 1111 (each of which may include sparse or dense matrix/vector); an output format 1113 (e.g., dense vector or scalar); a matrix data format (e.g., compressed sparse row, compressed sparse column, row-oriented, etc.); and an operation identifier 1114.

Figures 12A, 12B, 12C:
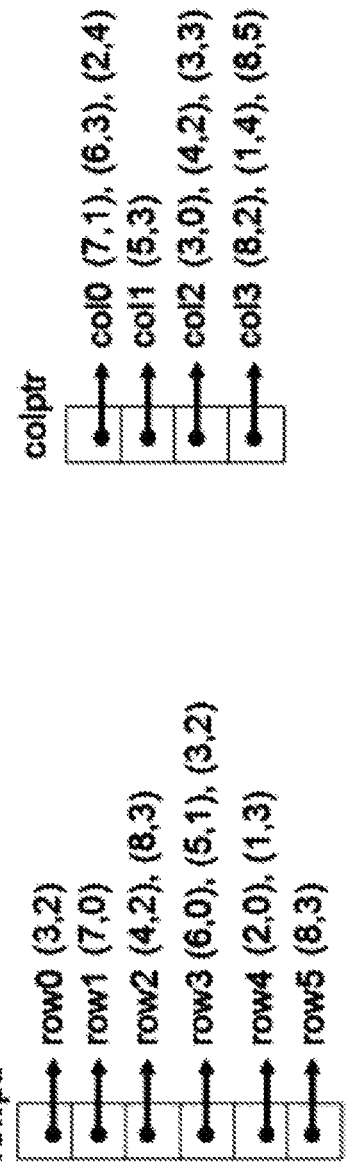
FIG. 12a depicts an example of a multiplication between a sparse matrix A against a vector x to produce a vector y according to some embodiments.
FIG. 12b illustrates the CSR representation of matrix A in which each value is stored as a (value, row index) pair according to some embodiments.
FIG. 12c illustrates a CSC representation of matrix A which uses a (value, column index) pair according to some embodiments.

The runtime-dominating compute patterns found in some current workloads include variations of matrix multiplication against a vector in row-oriented and column-oriented fashion. They work on well-known matrix formats: compressed sparse row (CSR) and compressed sparse column (CSC). FIG. 12a depicts an example of a multiplication between a sparse matrix A against a vector x to produce a vector y. FIG. 12b illustrates the CSR representation of matrix A in which each value is stored as a (value, row index) pair. For example, the (3,2) for row0 indicates that a value of 3 is stored in element position 2 for row 0. FIG. 12c illustrates a CSC representation of matrix A which uses a (value, column index) pair.

FIGS. 13a, 13b, and 13c illustrate pseudo code of each compute pattern, which is described below in detail. In particular, FIG. 13a illustrates a row-oriented sparse matrix dense vector multiply (spMdV_csr); FIG. 13b illustrates a column-oriented sparse matrix sparse vector multiply (spMspC_csc); and FIG. 13c illustrates a scale and update operation (scale_update).

A. Row-Oriented Sparse Matrix Dense Vector Multiplication (spMdV_csr)

This is a well-known compute pattern that is important in many application domains such as high-performance computing. Here, for each row of matrix A, a dot product of that row against vector x is performed, and the result is stored in the y vector element pointed to by the row index. This computation is used in a machine-learning (ML) algorithm that performs analysis across a set of samples (i.e., rows of the matrix). It may be used in techniques such as "mini-batch." There are also cases where ML algorithms perform only a dot product of a sparse vector against a dense vector (i.e., an iteration of the spMdV_csr loop), such as in the stochastic variants of learning algorithms.

A known factor that can affect performance on this computation is the need to randomly access sparse x vector elements in the dot product computation. For a conventional server system, when the x vector is large, this would result in irregular accesses (gather) to memory or last level cache.

To address this, one implementation of a processing element divides matrix A into column blocks and the x vector into multiple subsets (each corresponding to an A matrix column block). The block size can be chosen so that the x vector subset can fit on chip. Hence, random accesses to it can be localized on-chip.

B. Column-Oriented Sparse Matrix Sparse Vector Multiplication (spMspV_csc)

This pattern that multiplies a sparse matrix against a sparse vector is not as well-known as spMdV_csr. However, it is important in some ML algorithms. It is used when an algorithm works on a set of features, which are represented as matrix columns in the dataset (hence, the need for column-oriented matrix accesses).

In this compute pattern, each column of the matrix A is read and multiplied against the corresponding non-zero element of vector x. The result is used to update partial dot products that are kept at the y vector. After all the columns associated with non-zero x vector elements have been processed, the y vector will contain the final dot products.

While accesses to matrix A is regular (i.e., stream in columns of A), the accesses to the y vector to update the partial dot products is irregular. The y element to access depends on the row index of the A vector element being processed. To address this, the matrix A can be divided into row blocks. Consequently, the vector y can be divided into subsets corresponding to these blocks. This way, when processing a matrix row block, it only needs to irregularly access (gather/scatter) its y vector subset. By choosing the block size properly, the y vector subset can be kept on-chip.

C. Scale and Update (scale_update)

This pattern is typically used by ML algorithms to apply scaling factors to each sample in the matrix and reduced them into a set of weights, each corresponding to a feature (i.e., a column in A). Here, the x vector contains the scaling factors. For each row of matrix A (in CSR format), the scaling factors for that row are read from the x vector, and then applied to each element of A in that row. The result is used to update the element of y vector. After all rows have been processed, the y vector contains the reduced weights.

Similar to prior compute patterns, the irregular accesses to the y vector could affect performance when y is large. Dividing matrix A into column blocks and y vector into multiple subsets corresponding to these blocks can help localize the irregular accesses within each y subset.

One implementation includes a hardware accelerator 1000 that can efficiently perform the compute patterns discussed above. The accelerator 1000 is a hardware IP block that can be integrated with general purpose processors, similar to those found in existing accelerator-based solutions (e.g., IBM® PowerEN, Oracle® M7). In one implementation, the accelerator 900 independently accesses memory 950 through an interconnect shared with the processors to perform the compute patterns. It supports any arbitrarily large matrix datasets that reside in off-chip memory.

Figure 14:
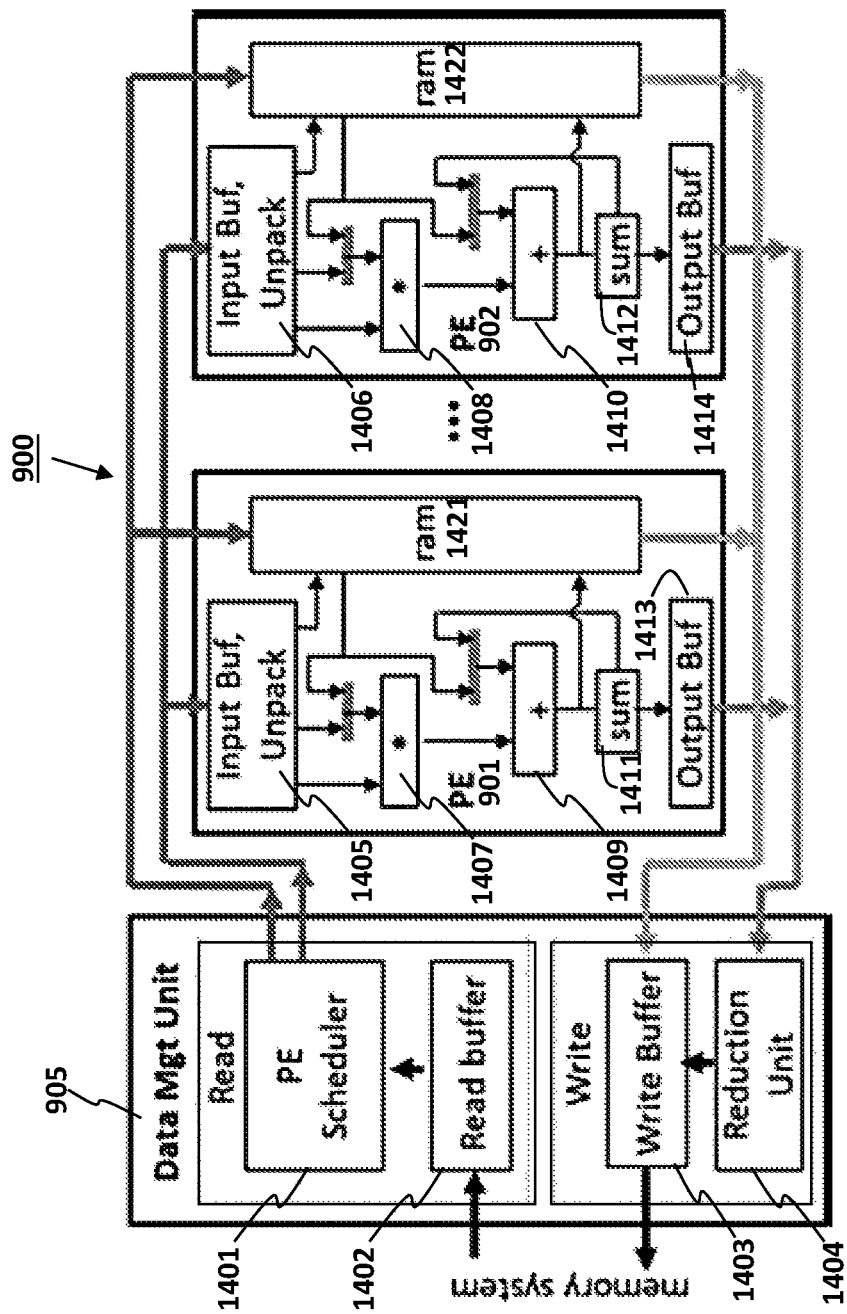
FIG. 14 illustrates the processing flow for one implementation of the data management unit and the processing elements according to some embodiments.

FIG. 14 illustrates the processing flow for one implementation of the data management unit 905 and the processing elements 901-902. In this implementation, the data management unit 905 includes a processing element scheduler 1401, a read buffer 1402, a write buffer 1403 and a reduction unit 1404. Each PE 901-902 includes an input buffer 1405-1406, a multiplier 1407-1408, an adder 1409-1410, a local RAM 1421-1422, a sum register 1411-1412, and an output buffer 1413-1414.

The accelerator supports the matrix blocking schemes discussed above (i.e., row and column blocking) to support any arbitrarily large matrix data. The accelerator is designed to process a block of matrix data. Each block is further divided into sub-blocks which are processed in parallel by the Pes 901-902.

In operation, the data management unit 905 reads the matrix rows or columns from the memory subsystem into its read buffer 1402, which is then dynamically distributed by the PE scheduler 1401 across PEs 901-902 for processing. It also writes results to memory from its write buffer 1403.

Each PE 901-902 is responsible for processing a matrix sub-block. A PE contains an on-chip RAM 1421-1422 to store the vector that needs to be accessed randomly (i.e., a subset of x or y vector, as described above). It also contains a floating point multiply-accumulate (FMA) unit including multiplier 1407-1408 and adder 1409-1410 and unpack logic within input buffers 1405-1406 to extract matrix elements from input data, and a sum register 1411-1412 to keep the accumulated FMA results.

One implementation of the accelerator achieves extreme efficiencies because (1) it places irregularly accessed (gather/scatter) data in on-chip PE RAMs 1421-1422, (2) it utilizes a hardware PE scheduler 1401 to ensure PEs are well utilized, and (3) unlike with general purpose processors, the accelerator consists of only the hardware resources that are essential for sparse matrix operations. Overall, the accelerator efficiently converts the available memory bandwidth provided to it into performance.

Scaling of performance can be done by employing more PEs in an accelerator block to process multiple matrix subblocks in parallel, and/or employing more accelerator blocks (each has a set of PEs) to process multiple matrix blocks in parallel. A combination of these options is considered below. The number of PEs and/or accelerator blocks should be tuned to match the memory bandwidth.

One implementation of the accelerator 900 can be programmed through a software library (similar to Intel® Math Kernel Library). Such library prepares the matrix data in memory, sets control registers in the accelerator 900 with information about the computation (e.g., computation type, memory pointer to matrix data), and starts the accelerator. Then, the accelerator independently accesses matrix data in memory, performs the computation, and writes the results back to memory for the software to consume.

Figure 15B:
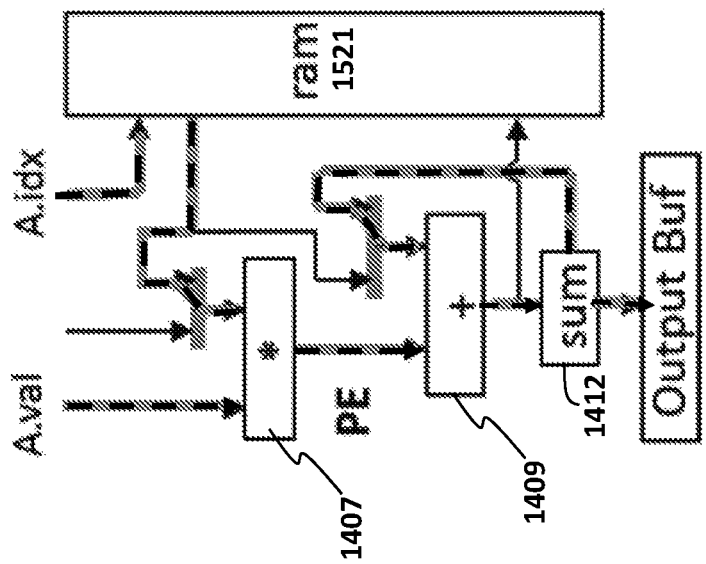
FIG. 15b illustrates paths for a spMdV_csr operation according to some embodiments.
Figure 15A:
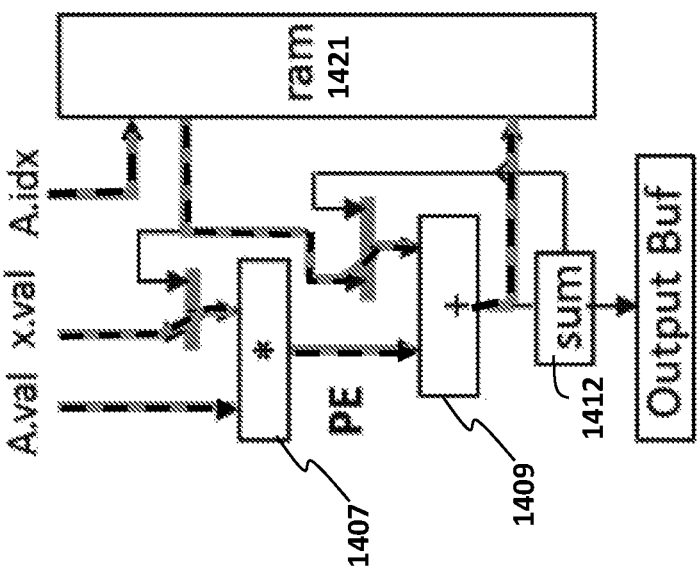
FIG. 15a highlights paths for spMspV_csc and scale_update operations according to some embodiments.

The accelerator handles the different compute patterns by setting its PEs to the proper datapath configuration, as depicted in FIGS. 15a-15b. In particular, FIG. 15a highlights paths (using dotted lines) for spMspV_csc and scale_update operations and FIG. 15b illustrates paths for a spMdV_csr operation. The accelerator operation to perform each compute pattern is detailed below.

For spMspV_csc, the initial y vector subset is loaded in to PE's RAM 1421 by the DMU 905. It then reads x vector elements from memory. For each x element, the DMU 905 streams the elements of the corresponding matrix column from memory and supplies them to the PE 901. Each matrix element contains a value (A.val) and an index (A.idx) which points to the y element to read from PE's RAM 1421. The DMU 1005 also provides the x vector element (x.val) that is multiplied against A.val by the multiply-accumulate (FMA) unit. The result is used to update the y element in the PE's RAM pointed to by A.idx. Note that even though not used by our workloads, the accelerator also supports column-wise multiplication against a dense x vector (spMdV_csc) by processing all matrix columns instead of only a subset (since x is dense).

The scale_update operation is similar to the spMspV_csc, except that the DMU 905 reads the rows of an A matrix represented in a CSR format instead of a CSC format. For the spMdV_csr, the x vector subset is loaded in to the PE's RAM 1421. DMU 905 streams in matrix row elements (i.e., {A.val,A.idx} pairs) from memory. A.idx is used to read the appropriate x vector element from RAM 1421, which is multiplied against A.val by the FMA. Results are accumulated into the sum register 1412. The sum register is written to the output buffer each time a PE sees a marker indicating an end of a row, which is supplied by the DMU 905. In this way, each PE produces a sum for the row sub-block it is responsible for. To produce the final sum for the row, the sub-block sums produced by all the PEs are added together by the Reduction Unit 1404 in the DMU (see FIG. 14). The final sums are written to the output buffer 1413-1414, which the DMU 1005 then writes to memory.

Graph Data Processing

In one implementation, the accelerator architectures described herein are configured to process graph data. Graph analytics relies on graph algorithms to extract knowledge about the relationship among data represented as graphs. The proliferation of graph data (from sources such as social media) has led to strong demand for and wide use of graph analytics. As such, being able to do graph analytics as efficient as possible is of critical importance.

To address this need, one implementation automatically maps a user-defined graph algorithm to a hardware accelerator architecture "template" that is customized to the given input graph algorithm. The accelerator may comprise the architectures described above and may be implemented as a FPGA/ASIC, which can execute with extreme efficiency. In summary, one implementation includes:

(1) a hardware accelerator architecture template that is based on a generalized sparse matrix vector multiply (GSPMV) accelerator. It supports arbitrary graph algorithm because it has been shown that graph algorithm can be formulated as matrix operations.

(2) an automatic approach to map and tune a widely-used "vertex centric" graph programming abstraction to the architecture template.

There are existing sparse matrix multiply hardware accelerators, but they do not support customizability to allow mapping of graph algorithms.

One implementation of the design framework operates as follows.

(1) A user specifies a graph algorithm as "vertex programs" following vertex-centric graph programming abstraction. This abstraction is chosen as an example here due to its popularity. A vertex program does not expose hardware details, so users without hardware expertise (e.g., data scientists) can create it.

(2) Along with the graph algorithm in (1), one implementation of the framework accepts the following inputs:

a. The parameters of the target hardware accelerator to be generated (e.g., max amount of on-chip RAMs). These parameters may be provided by a user, or obtained from an existing library of known parameters when targeting an existing system (e.g., a particular FPGA board).

b. Design optimization objectives (e.g., max performance, min area).

c. The properties of the target graph data (e.g., type of graph) or the graph data itself. This is optional, and is used to aid in automatic tuning.

(3) Given above inputs, one implementation of the framework performs auto-tuning to determine the set of customizations to apply to the hardware template to optimize for the input graph algorithm, map these parameters onto the architecture template to produce an accelerator instance in synthesizable RTL, and conduct functional and performance validation of the generated RTL against the functional and performance software models derived from the input graph algorithm specification.

In one implementation, the accelerator architecture described above is extended to support execution of vertex programs by (1) making it a customizable hardware template and (2) supporting the functionalities needed by vertex program. Based on this template, a design framework is described to map a user-supplied vertex program to the hardware template to produce a synthesizable RTL (e.g., Verilog) implementation instance optimized for the vertex program. The framework also performs automatic validation and tuning to ensure the produced RTL is correct and optimized. There are multiple use cases for this framework. For example, the produced synthesizable RTL can be deployed in an FPGA platform (e.g., Xeon-FPGA) to efficiently execute the given vertex program. Or, it can be refined further to produce an ASIC implementation.

It has been shown that graphs can be represented as adjacency matrices, and graph processing can be formulated as sparse matrix operations. FIGS. 16a-16b shows an example of representing a graph as an adjacency matrix. Each non-zero in the matrix represents an edge among two nodes in the graph. For example, a 1 in row 0 column 2 represents an edge from node A to C.

One of the most popular models for describing computations on graph data is the vertex programming model. One implementation supports the vertex programming model variant from Graphmat software framework, which formulates vertex programs as generalized sparse matrix vector multiply (GSPMV). As shown in FIG. 16c, a vertex program consists of the types of data associated with edges/vertices in the graph (edata/vdata), messages sent across vertices in the graph (mdata), and temporary data (tdata) (illustrated in the top portion of program code); and stateless user-defined compute functions using pre-defined APIs that read and update the graph data (as illustrated in the bottom portion of program code).

FIG. 16d illustrates exemplary program code for executing a vertex program. Edge data is represented as an adjacency matrix A (as in FIG. 16b), vertex data as vector y, and messages as sparse vector x. FIG. 16e shows the GSPMV formulation, where the multiply( ) and add( ) operations in SPMV is generalized by user-defined PROCESS_MSG( ) and REDUCE( ).

One observation here is that the GSPMV variant needed to execute vertex program performs a column-oriented multiplication of sparse matrix A (i.e., adjacency matrix) against a sparse vector x (i.e., messages) to produce an output vector y (i.e., vertex data). This operation is referred to as col_spMspV (previously described with respect to the above accelerator).

Design Framework.

Figure 17:
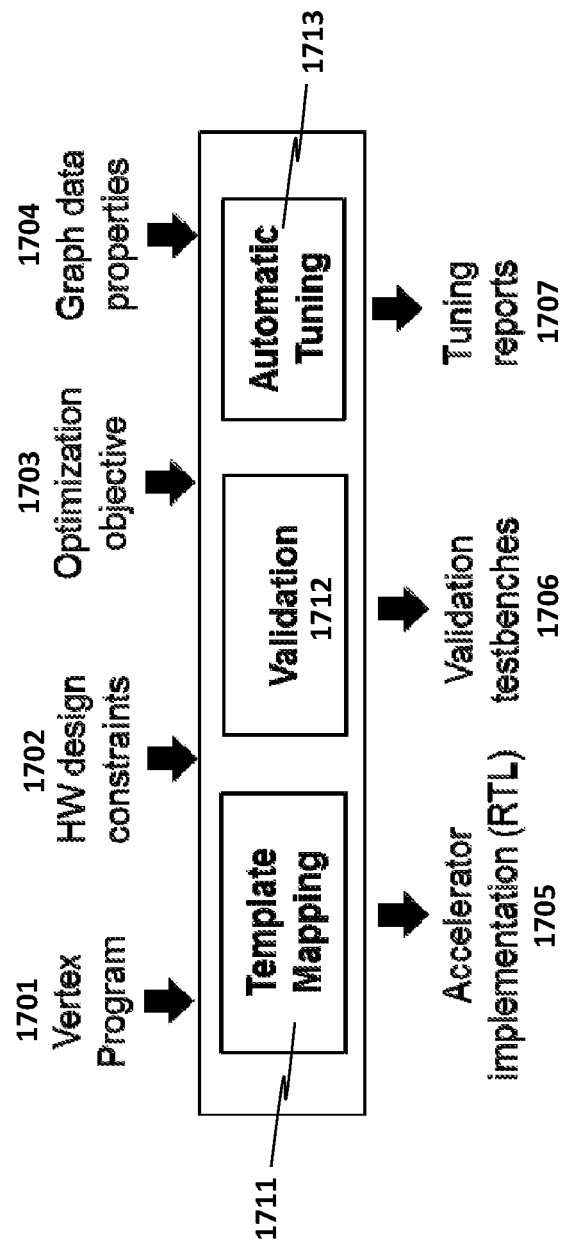
FIG. 17 illustrates one implementation of a design framework for GSPMV according to some embodiments.

One implementation of the framework is shown in FIG. 17 which includes a template mapping component 1711, a validation component 1712 and an automatic tuning component 1713. Its inputs are a user-specified vertex program 1701, design optimization goals 1703 (e.g., max performance, min area), and target hardware design constraints 1702 (e.g., maximum amount of on-chip RAMs, memory interface width). As an optional input to aid automatic-tuning, the framework also accepts graph data properties 1704 (e.g., type=natural graph) or a sample graph data.

Given these inputs, the template mapping component 1711 of the framework maps the input vertex program to a hardware accelerator architecture template, and produces an RTL implementation 1705 of the accelerator instance optimized for executing the vertex program 1701. The automatic tuning component 1713 performs automatic tuning 1713 to optimize the generated RTL for the given design objectives, while meeting the hardware design constraints. Furthermore, the validation component 1712 automatically validates the generated RTL against functional and performance models derived from the inputs. Validation test benches 1706 and tuning reports 1707 are produced along with the RTL.

Figure 18:
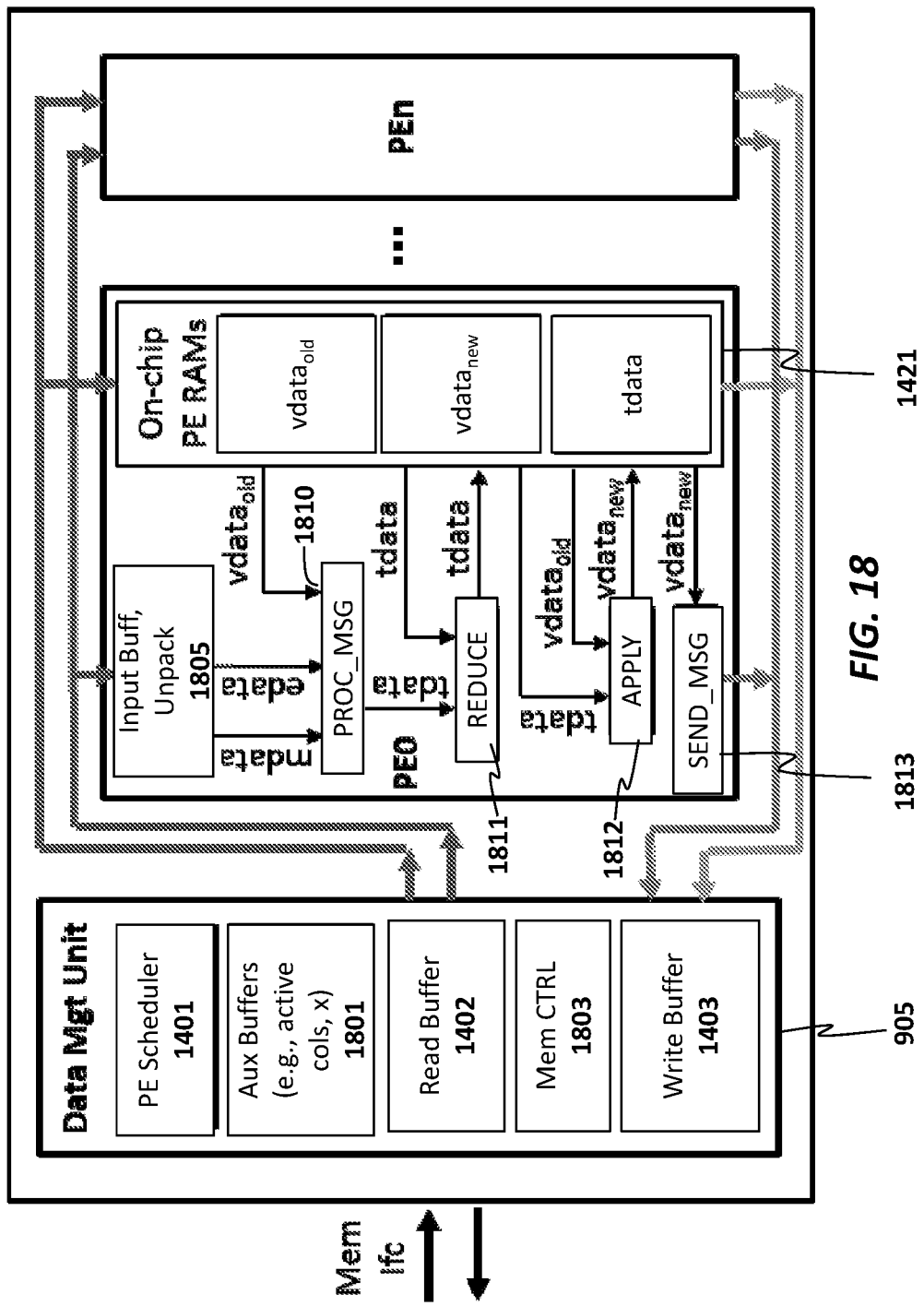
FIG. 18 shows one implementation of an architecture template for GSPMV according to some embodiments.

Generalized Sparse Matrix Vector Multiply (GSPMV) Hardware Architecture Template One implementation of an architecture template for GSPMV is shown in FIG. 18, which is based on the accelerator architecture described above (see, e.g., FIG. 14 and associated text). Many of the components illustrated in FIG. 18 are customizable (as highlighted with grey lines). In one implementation, the architecture to support execution of vertex programs has been extended as follows.

As illustrated in FIG. 18, customizable logic blocks are provided inside each PE to support PROCESS_MSG( ) 1910, REDUCE( ) 1811, APPLY 1812, and SEND_MSG( ) 1813 needed by the vertex program. In addition, one implementation provides customizable on-chip storage structures and pack/unpack logic 1805 to support user-defined graph data (i.e., vdata, edata, mdata, tdata). The data management unit 905 illustrated in FIG. 18 includes a PE scheduler 1401 (for scheduling PEs as described above), aux buffers 1801 for storing active column, x data), a read buffer 1402, a memory controller 1803 for controlling access to system memory, and a write buffer 1404. In addition, in the implementation shown in FIG. 18 old and new vdata and tdata is stored within the local PE memory 1421. Various control state machines may be modified to support executing vertex programs, abiding to the functionalities specified by the algorithms in FIGS. 16d and 16e.

Figure 19:
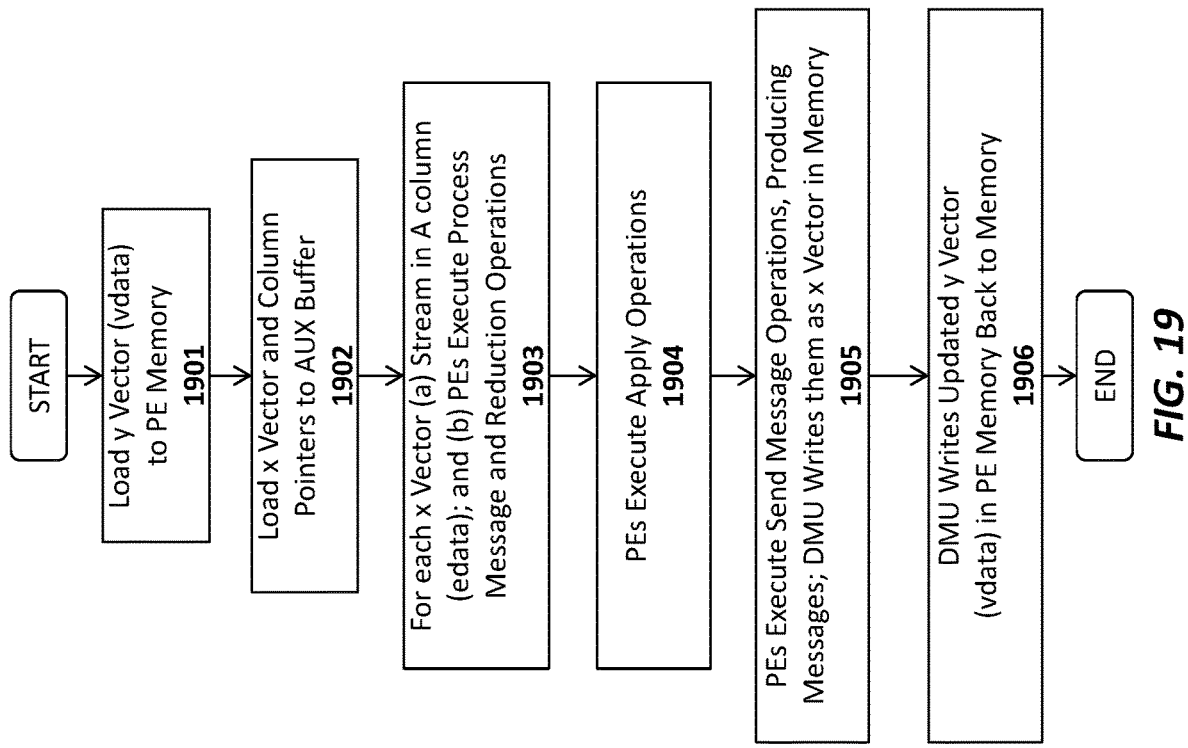
FIG. 19 illustrates a summarization of the operation of each accelerator tile according to some embodiments.

The operation of each accelerator tile is summarized in FIG. 19. At 1901, the y vector (vdata) is loaded to the PE RAM 1421. At 1902, the x vector and column pointers are loaded to the aux buffer 1801. At 1903, for each x vector element, the A column is streamed in (edata) and the PEs execute PROC_MSG( ) 1810 and REDUCE( ) 1811. At 1904, the PEs execute APPLY( ) 1812. At 1905, the PEs execute SEND_MSG( ) 1813, producing messages, and the data management unit 905 writes them as x vectors in memory. At 1906, the data management unit 905 writes the updated y vectors (vdata) stored in the PE RAMs 1421 back to memory. The above techniques conform to the vertex program execution algorithm shown in FIGS. 16d and 16e. To scale up performance, the architecture allows increasing the number of PEs in a tile and/or the number of tiles in the design. This way, the architecture can take advantage of multiple levels of parallelisms in the graph (i.e., across subgraphs (across blocks of adjacency matrix) or within each subgraph). The Table in FIG. 20a summarizes the customizable parameters of one implementation of the template. It is also possible to assign asymmetric parameters across tiles for optimization (e.g., one tile with more PEs than another tile).

Automatic Mapping, Validation, and Tuning

Tuning.

Based on the inputs, one implementation of the framework performs automatic tuning to determine the best design parameters to use to customize the hardware architecture template in order to optimize it for the input vertex program and (optionally) graph data. There are many tuning considerations, which are summarized in the table in FIG. 20b. As illustrated, these include locality of data, graph data sizes, graph compute functions, graph data structure, graph data access attributes, graph data types, and graph data patterns.

Template Mapping.

In this phase, the framework takes the template parameters determined by the tuning phase, and produces an accelerator instance by "filling" in the customizable portions of the template. The user-defined compute functions (e.g., FIG. 16c) may be mapped from the input specification to the appropriate PE compute blocks using existing High-Level Synthesis (HLS) tools. The storage structures (e.g., RAMs, buffers, cache) and memory interfaces are instantiated using their corresponding design parameters. The pack/unpack logic may automatically be generated from the data type specifications (e.g., FIG. 16a). Parts of the control finite state machines (FSMs) are also generated based on the provided design parameters (e.g., PE scheduling schemes).

Validation.

In one implementation, the accelerator architecture instance (synthesizable RTL) produced by the template mapping is then automatically validated. To do this, one implementation of the framework derives a functional model of the vertex program to be used as the "golden" reference. Test benches are generated to compare the execution of this golden reference against simulations of the RTL implementation of the architecture instance. The framework also performs performance validation by comparing RTL simulations against analytical performance model and cycle-accurate software simulator. It reports runtime breakdown and pinpoint the bottlenecks of the design that affect performance.

Accelerator Architecture for Processing Sparse Data

Introduction

Computations on sparse datasets—vectors or matrices most of whose values are zero—are critical to an increasing number of commercially-important applications, but typically achieve only a few percent of peak performance when run on today's CPUs. In the scientific computing arena, sparse-matrix computations have been key kernels of linear solvers for decades. More recently, the explosive growth of machine learning and graph analytics has moved sparse computations into the mainstream. Sparse-matrix computations are central to many machine-learning applications and form the core of many graph algorithms.

Sparse-matrix computations tend to be memory bandwidth-limited rather than compute-limited, making it difficult for CPU changes to improve their performance. They execute few operations per matrix data element and often iterate over an entire matrix before re-using any data, making caches ineffective. In addition, many sparse-matrix algorithms contain significant numbers of data-dependent gathers and scatters, such as the result[row]+=matrix[row][i].value*vector[matrix[row][i].index] operation found in sparse matrix-vector multiplication, which are hard to predict and reduce the effectiveness of prefetchers.

To deliver better sparse-matrix performance than conventional microprocessors, a system must provide significantly higher memory bandwidth than current CPUs and a very energy-efficient computing architecture. Increasing memory bandwidth makes it possible to improve performance, but the high energy/bit cost of DRAM accesses limits the amount of power available to process that bandwidth. Without an energy-efficient compute architecture, a system might find itself in the position of being unable to process the data from a high-bandwidth memory system without exceeding its power budget.

One implementation comprises an accelerator for sparse-matrix computations which uses stacked DRAM to provide the bandwidth that sparse-matrix algorithms require combined with a custom compute architecture to process that bandwidth in an energy-efficient manner.

Sparse-Matrix Overview

Many applications create data sets where the vast majority of the values are zero. Finite-element methods model objects as a mesh of points where the state of each point is a function of the state of the points near it in the mesh. Mathematically, this becomes a system of equations that is represented as a matrix where each row describes the state of one point and the values in the row are zero for all of the points that do not directly affect the state of the point the row describes. Graphs can be represented as an adjacency matrix, where each element {i,j} in the matrix gives the weight of the edge between vertices i and j in the graph. Since most vertexes connect to only a small fraction of the other vertices in the graph, the vast majority of the elements in the adjacency matrix are zeroes. In machine learning, models are typically trained using datasets that consist of many samples, each of which contains a set of features (observations of the state of a system or object) and the desired output of the model for that set of features. It is very common for most of the samples to only contain a small subset of the possible features, for example when the features represent different words that might be present in a document, again creating a dataset where most of the values are zero.

Datasets where most of the values are zero are described as "sparse," and it is very common for sparse datasets to be extremely sparse, having non-zero values in less than 1% of their elements. These datasets are often represented as matrices, using data structures that only specify the values of the non-zero elements in the matrix. While this increases the amount of space required to represent each non-zero element, since it is necessary to specify both the element's location and its value, the overall space (memory) savings can be substantial if the matrix is sparse enough. For example, one of the most straightforward representations of a sparse matrix is the coordinate list (COO) representation, in which each non-zero is specified by a {row index, column index, value} tuple. While this triples the amount of storage required for each non-zero value, if only 1% of the elements in a matrix have non-zero values, the COO representation will take up only 3% of the space that a dense representation (one that represents the value of each element in the matrix) would take.

Figure 21:
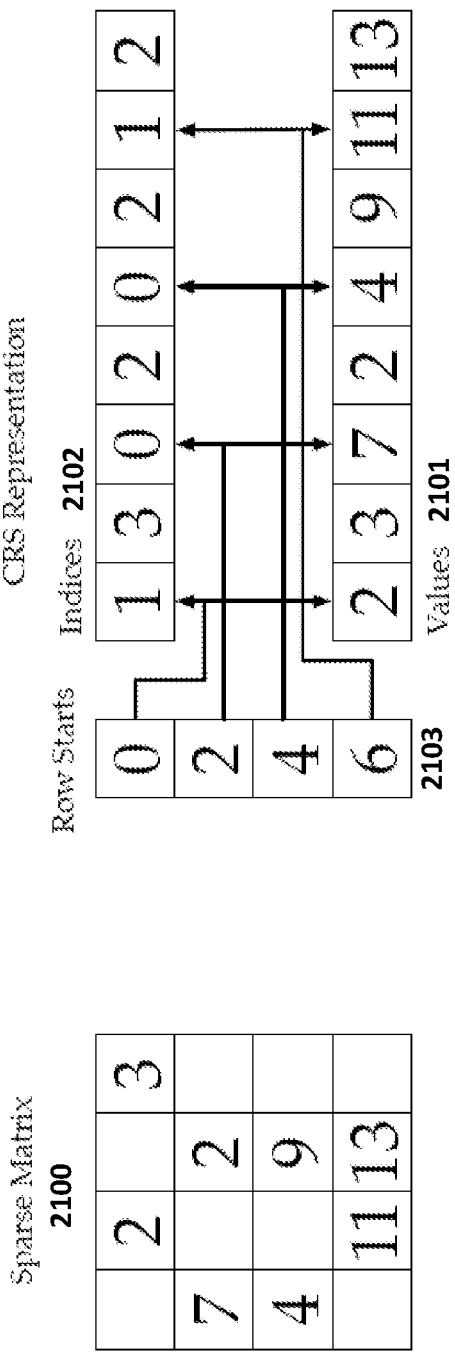
FIG. 21 illustrates the compressed row storage (CRS, sometimes abbreviated CSR) sparse-matrix format according to some embodiments.

FIG. 21 illustrates one of the most common sparse-matrix formats, the compressed row storage (CRS, sometimes abbreviated CSR) format. In CRS format, the matrix 2100 is described by three arrays: a values array 2101, which contains the values of the non-zero elements, an indices array 2102, which specifies the position of each non-zero element within its row of the matrix, and a row starts array 2103, which specifies where each row of the matrix starts in the lists of indices and values. Thus, the first non-zero element of the second row of the example matrix can be found at position 2 in the indices and values arrays, and is described by the tuple {0, 7}, indicating that the element occurs at position 0 within the row and has value 7. Other commonly-used sparse-matrix formats include compressed sparse column (CSC), which is the column-major dual to CRS, and ELLPACK, which represents each row of the matrix as a fixed-width list of non-zero values and their indices, padding with explicit zeroes when a row has fewer non-zero elements than the longest row in the matrix.

Computations on sparse matrices have the same structure as their dense-matrix counterparts, but the nature of sparse data tends to make them much more bandwidth-intensive than their dense-matrix counterparts. For example, both the sparse and dense variants of matrix-matrix multiplication find C=A·B by computing $C_{i,j}=A_i\cdot B_{,j}$ for all i, j. In a dense matrix-matrix computation, this leads to substantial data re-use, because each element of A participates in N multiply-add operations (assuming N×N matrices), as does each element of B. As long as the matrix-matrix multiplication is blocked for cache locality, this re-use causes the computation to have a low bytes/op ratio and to be compute-limited. However, in the sparse variant, each element of A only participates in as many multiply-add operations as there are non-zero values in the corresponding row of B, while each element of B only participates in as many multiply-adds as there are non-zero elements in the corresponding column of A. As the sparseness of the matrices increases, so does the bytes/op ratio, making the performance of many sparse matrix-matrix computations limited by memory bandwidth in spite of the fact that dense matrix-matrix multiplication is one of the canonical compute-bound computations.

Four operations make up the bulk of the sparse-matrix computations seen in today's applications: sparse matrix-dense vector multiplication (SpMV), sparse matrix-sparse vector multiplication, sparse matrix-sparse matrix multiplication, and relaxation/smoother operations, such as the Gauss-Seidel smoother used in Intel's implementation of the High-Performance Conjugate Gradient benchmark. These operations share two characteristics that make a sparse-matrix accelerator practical. First, they are dominated by vector dot-products, which makes it possible to implement simple hardware that can implement all four important computations. For example, a matrix-vector multiplication is performed by taking the dot-product of each row in the matrix with the vector, while a matrix-matrix multiplication takes the dot-product of each row of one matrix with each column of the other. Second, applications generally perform multiple computations on the same matrix, such as the thousands of multi-plications of the same matrix by different vectors that a support vector machine algorithm performs with training a model. This repeated use of the same matrix makes it practical to transfer matrices to/from an accelerator during program execution and/or to re-format the matrix in a way that simplifies the hardware's task, since the cost of data transfers/transformations can be amortized across many operations on each matrix.

Figure 22:
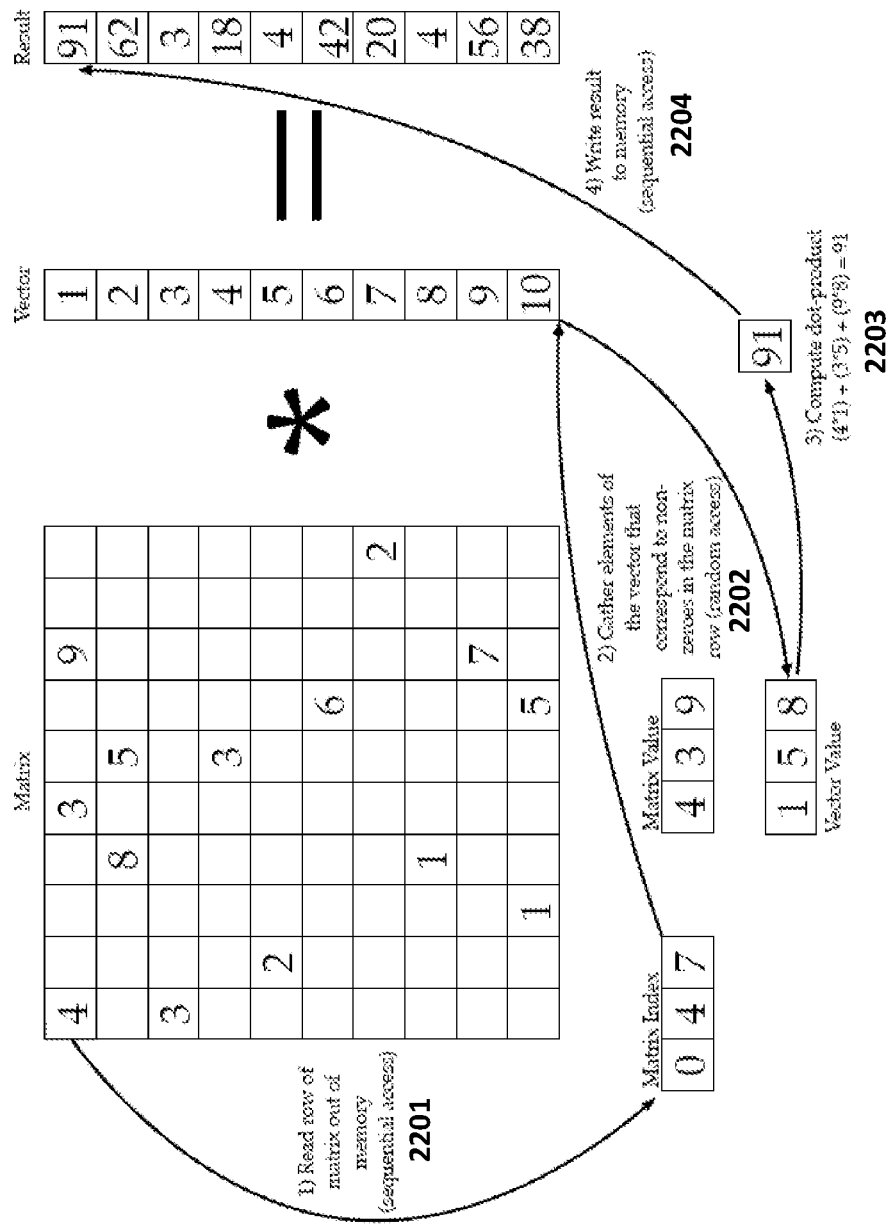
FIG. 22 shows exemplary steps involved in an implementation of sparse matrix-dense vector multiplication using the CRS data format according to some embodiments.

Sparse-matrix computations typically achieve only a few percent of the peak performance of the system they run on. To demonstrate why this occurs, FIG. 22 shows the steps 2201-2204 involved in an implementation of sparse matrix-dense vector multiplication using the CRS data format. First, at 2201, the data structure that represents a row of the matrix is read out of memory, which usually involves a set of sequential reads that are easy to predict and prefetch. Second, at 2202, the indices of the non-zero elements in the matrix row are used to gather the corresponding elements of the vector, which requires a number of data-dependent, hard-to-predict memory accesses (a gather operation). Moreover, these memory accesses often touch only one or two words in each referenced cache line, resulting in significant wasted bandwidth when the vector does not fit in the cache.

Third, at 2203, the processor computes the dot-product of the non-zero elements of the matrix row and the corresponding elements of the vector. Finally, at 2204, the result of the dot-product is written into the result vector, which is also accessed sequentially, and the program proceeds to the next row of the matrix. Note that this is a conceptual/algorithmic view of the computation, and the exact sequence of operations the program executes will depend on the processor's ISA and vector width.

This example illustrates a number of important characteristics of sparse-matrix computations. Assuming 32-bit data types and that neither the matrix nor the vector fit in the cache, computing the first element of the output row requires reading 36 bytes from DRAM, but only five compute instructions (three multiplies and two adds), for a bytes/op ratio of 7.2:1.

Memory bandwidth is not the only challenge to high-performance sparse-matrix computations, however. As FIG. 22 shows, the accesses to the vector in SpMV are data-dependent and hard to predict, exposing the latency of vector accesses to the application. If the vector does not fit in the cache, SpMV performance becomes sensitive to DRAM latency as well as bandwidth unless the processor provides enough parallelism to saturate the DRAM bandwidth even when many threads are stalled waiting for data.

Thus, an architecture for sparse-matrix computations must provide several things to be effective. It must deliver high memory bandwidth to meet the bytes/op needs of sparse computations. It must also support high-bandwidth gathers out of large vectors that may not fit in the cache. Finally, while performing enough arithmetic operations/second to keep up with DRAM bandwidth is not a challenge in and of itself, the architecture must perform those operations and all of the memory accesses they require in an energy-efficient manner in order to remain within system power budgets.

Implementations

Figure 23:
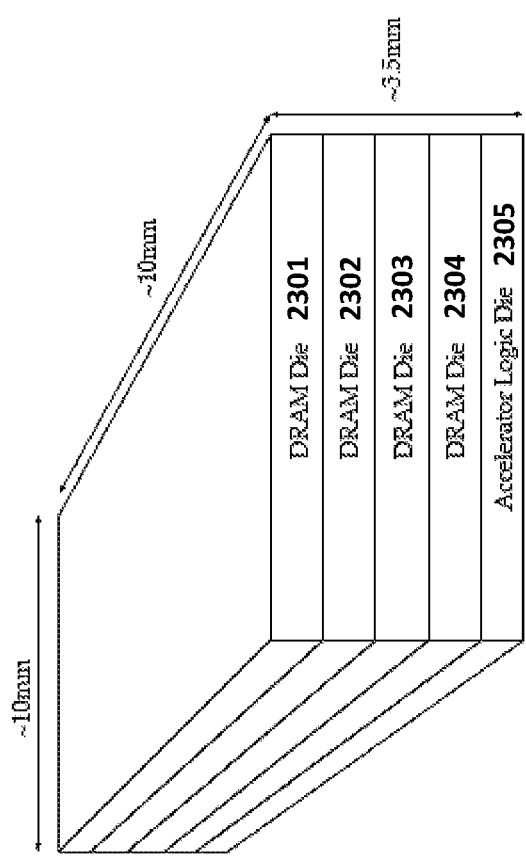
FIG. 23 illustrates one implementation of an accelerator includes an accelerator logic die and one or more stacks of DRAM die according to some embodiments.

One implementation comprises an accelerator designed to provide the three features necessary for high sparse-matrix performance: high memory bandwidth, high-bandwidth gathers out of large vectors, and energy-efficient computation. As illustrated in FIG. 23, one implementation of the accelerator includes an accelerator logic die 2305 and one of more stacks 2301-2304 of DRAM die. Stacked DRAM, which is described in more detail below, provides high memory bandwidth at low energy/bit. For example, stacked DRAMs are expected to deliver 256-512 GB/sec at 2.5 pJ/bit, while LPDDR4 DIMMs are only expected to deliver 68 GB/sec and will have an energy cost of 12 pJ/bit.

The accelerator logic chip 2305 at the bottom of the accelerator stack is customized to the needs of sparse-matrix computations, and is able to consume the bandwidth offered by a DRAM stack 2301-2304 while only expending 2-4 Watts of power, with energy consumption proportional to the bandwidth of the stack. To be conservative, a stack bandwidth of 273 GB/sec is assumed (the expected bandwidth of WIO3 stacks) for the remainder of this application. Designs based on higher-bandwidth stacks would incorporate more parallelism in order to consume the memory bandwidth.

Figure 24:
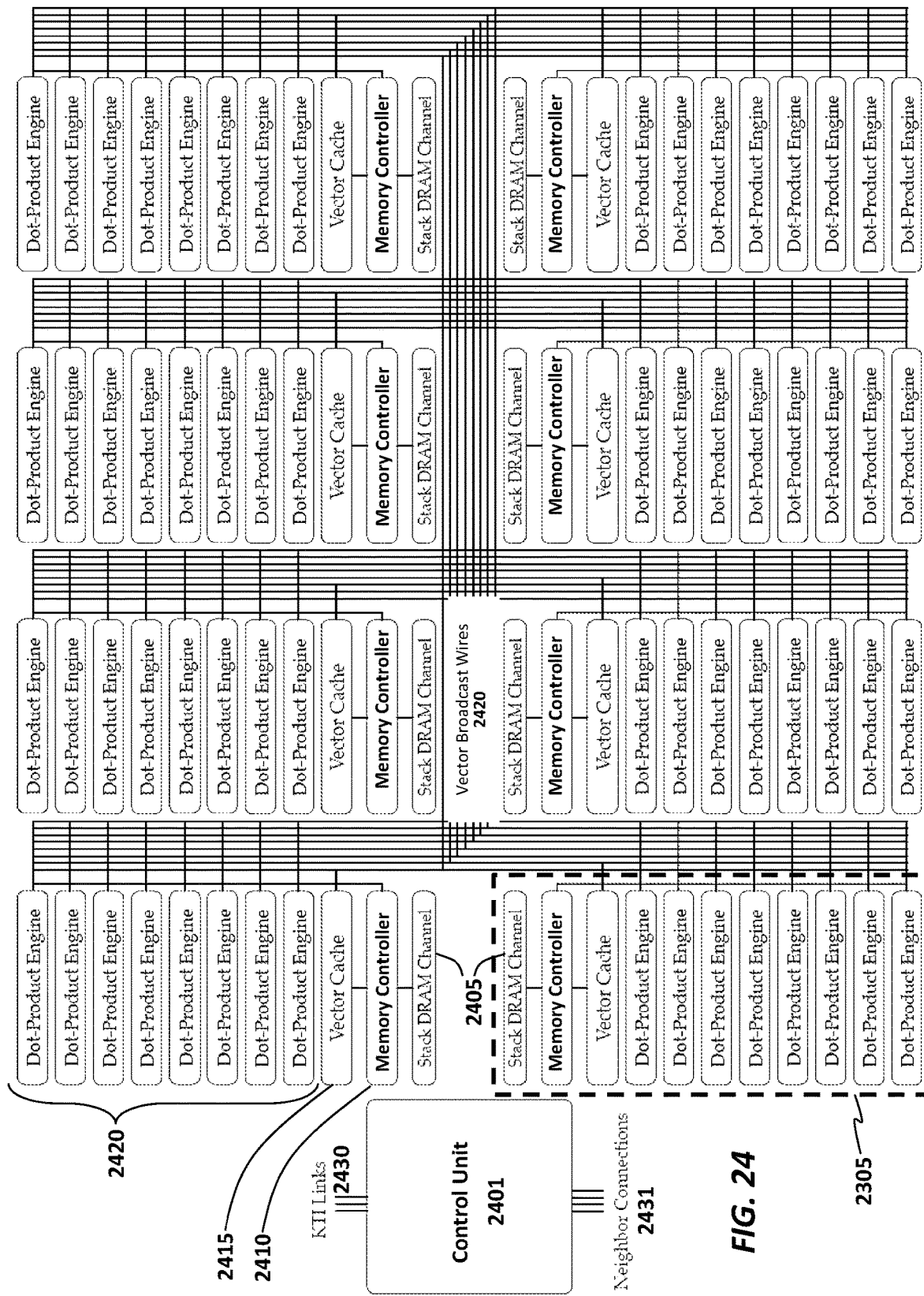
FIG. 24 illustrates one implementation of the accelerator logic chip, oriented from a top perspective through the stack of DRAM die according to some embodiments.

FIG. 24 illustrates one implementation of the accelerator logic chip 2305, oriented from a top perspective through the stack of DRAM die 2301-2304. The stack DRAM channel blocks 2405 towards the center of the diagram represent the through-silicon vias that connect the logic chip 2305 to the DRAMs 2301-2304, while the memory controller blocks 1410 contain the logic that generates the control signals for the DRAM channels. While eight DRAM channels 2405 are shown in the figure, the actual number of channels implemented on an accelerator chip will vary depending on the stacked DRAMs used. Most of the stack DRAM technologies being developed provide either four or eight channels.

Figure 25:
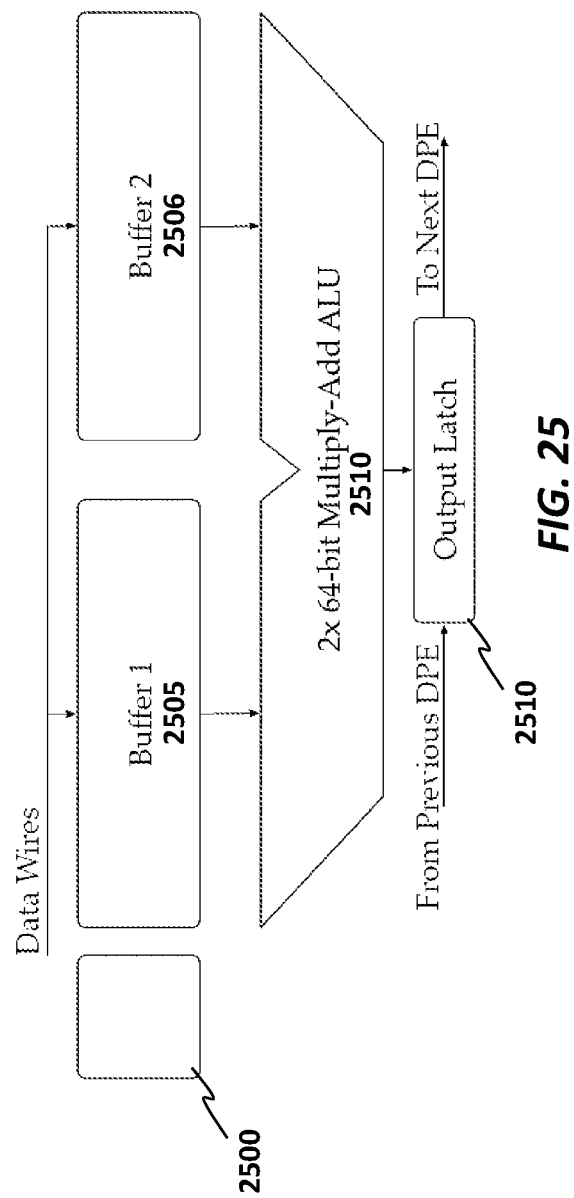
FIG. 25 provides a high-level overview of a dot-product engine (DPE) which contains two buffers, two 64-bit multiply-add arithmetic logic units (ALUs), and control logic according to some embodiments.

The dot-product engines (DPEs) 2420 are the computing elements of the architecture. In the particular implementation shown in FIG. 24, each set of eight DPEs is associated with a vector cache 2415. FIG. 25 provides a high-level overview of a DPE which contains two buffers 2505-2506, two 64-bit multiply-add ALUs 2510, and control logic 2500. During computations, the chip control unit 2500 streams chunks of the data being processed into the buffer memories 2505-2506. Once each buffer is full, the DPE's control logic sequences through the buffers, computing the dot-products of the vectors they contain and writing the results out to the DPE's result latch 2510, which is connected in a daisy-chain with the result latches of the other DPE's to write the result of a computation back to the stack DRAM 2301-2304.

In one implementation, the accelerator logic chip 2405 operates at approximately 1 GHz and 0.65V to minimize power consumption (although the particular operating frequency and voltage may be modified for different applications). Analysis based on 14 nm design studies shows that 32-64 KB buffers meet this frequency spec at that voltage, although strong ECC may be required to prevent soft errors. The multiply-add unit may be operated at half of the base clock rate in order to meet timing with a 0.65V supply voltage and shallow pipeline. Having two ALUs provides a throughput of one double-precision multiply-add/cycle per DPE.

At 273 GB/second and a clock rate of 1.066 MHz, the DRAM stack 2301-2304 delivers 256 bytes of data per logic chip clock cycle. Assuming that array indices and values are at least 32-bit quantities, this translates to 32 sparse-matrix elements per cycle (4 bytes of index+4 bytes of value=8 bytes/element), requiring that the chip perform 32 multiply-adds per cycle to keep up. (This is for matrix-vector multiplication and assumes a high hit rate in the vector cache so that 100% of the stack DRAM bandwidth is used to fetch the matrix.) The 64 DPEs shown in FIG. 24 provide 2-4× the required compute throughput, allowing the chip to process data at the peak stack DRAM bandwidth even if the ALUs 2510 are not used 100% of the time.

In one implementation, the vector caches 2415 cache elements of the vector in a matrix-vector multiplication. This significantly increases the efficiency of the matrix-blocking scheme described below. In one implementation, each vector cache block contains 32-64 KB of cache, for a total capacity of 256-512 KB in an eight-channel architecture.

The chip control unit 2401 manages the flow of a computation and handles communication with the other stacks in an accelerator and with other sockets in the system. To reduce complexity and power consumption, the dot-product engines never request data from memory. Instead, the chip control unit 2401 manages the memory system, initiating transfers that push the appropriate blocks of data to each of the DPEs.

In one implementation, the stacks in a multi-stack accelerator communicate with each other via a network of KTI links 2430 that is implemented using the neighbor connections 2431 shown in the figure. The chip also provides three additional KTI links that are used to communicate with the other socket(s) in a multi-socket system. In a multi-stack accelerator, only one of the stacks' off-package KTI links 2430 will be active. KTI transactions that target memory on the other stacks will be routed to the appropriate stack over the on-package KTI network.

Implementing Sparse-Matrix Operations

In this section, we describe the techniques and hardware required to implement sparse matrix-dense vector and sparse matrix-sparse vector multiplication on one implementation of the accelerator. This design is also extended to support matrix-matrix multiplication, relaxation operations, and other important functions to create an accelerator that supports all of the key sparse-matrix operations.

While sparse-sparse and sparse-dense matrix-vector multiplications execute the same basic algorithm (taking the dot product of each row in the matrix and the vector), there are significant differences in how this algorithm is implemented when the vector is sparse as compared to when it is dense, which are summarized in Table 1 below.

TABLE 1

| | Sparse-Sparse SpMV | Sparse-Dense SpMV |
|---|---|---|
| Size of Vector | Typically Small | Often large (5-10% of matrix size) |
| Location of Vector Elements | Unpredictable | Determined by Index |
| Number of operations per matrix element | Unpredictable | Fixed |

In a sparse matrix-dense vector multiplication, the size of the vector is fixed and equal to the number of columns in the matrix. Since many of the matrices found in scientific computations average approximately 10 non-zero elements per row, it is not uncommon for the vector in a sparse matrix-dense vector multiplication to take up 5-10% as much space as the matrix itself. Sparse vectors, on the other hand, are often fairly short, containing similar numbers of non-zero values to the rows of the matrix, which makes them much easier to cache in on-chip memory.

In a sparse matrix-dense vector multiplication the location of each element in the vector is determined by its index, making it feasible to gather the vector elements that correspond to the non-zero values in a region of the matrix and to pre-compute the set of vector elements that need to be gathered for any dense vector that the matrix will be multiplied by. The location of each element in a sparse vector, however is unpredictable and depends on the distribution of non-zero elements in the vector. This makes it necessary to examine the non-zero elements of the sparse vector and of the matrix to determine which non-zeroes in the matrix correspond to non-zero values in the vector.

It is helpful to compare the indices of the non-zero elements in the matrix and the vector because the number of instructions/operations required to compute a sparse matrix-sparse vector dot-product is unpredictable and depends on the structure of the matrix and vector. For example, consider taking the dot-product of a matrix row with a single non-zero element and a vector with many non-zero elements. If the row's non-zero has a lower index than any of the non-zeroes in the vector, the dot-product only requires one index comparison. If the row's non-zero has a higher index than any of the non-zeroes in the vector, computing the dot-product requires comparing the index of the row's non-zero with every index in the vector. This assumes a linear search through the vector, which is common practice. Other searches, such as binary search, would be faster in the worst case, but would add significant overhead in the common case where the non-zeroes in the row and the vector overlap. In contrast, the number of operations required to perform a sparse matrix-dense vector multiplication is fixed and determined by the number of non-zero values in the matrix, making it easy to predict the amount of time required for the computation.

Figure 26:
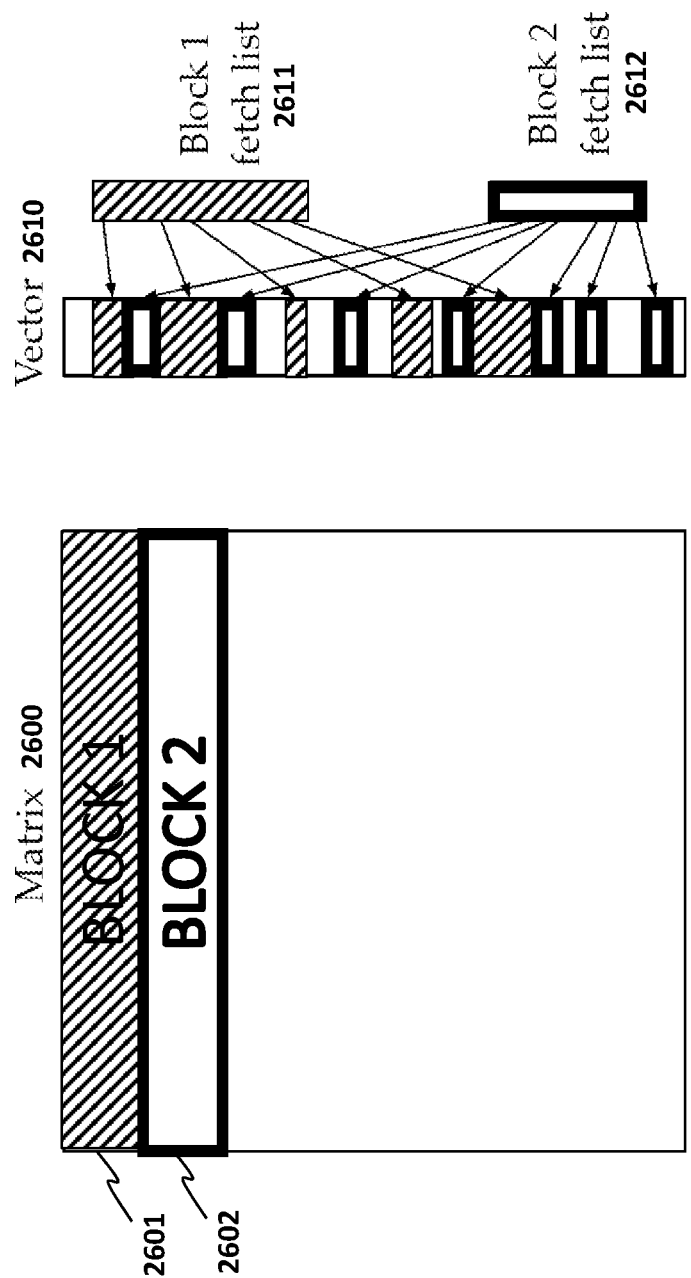
FIG. 26 illustrates a blocking scheme for large sparse-matrix computations according to some embodiments.

Because of these differences, one implementation of the accelerator uses the same high-level algorithm to implement sparse matrix-dense vector and sparse matrix-sparse vector multiplication, with differences in how the vector is distributed across the dot-product engines and how the dot-product is computed. Because the accelerator is intended for large sparse-matrix computations, it cannot be assumed that either the matrix or the vector will fit in on-chip memory. Instead, one implementation uses the blocking scheme outlined in FIG. 26.

In particular, in this implementation, the accelerator will divide matrices into fixed-size blocks of data 2601-2602, sized to fit in the on-chip memory, and will multiply the rows in the block by the vector to generate a chunk of the output vector before proceeding to the next block. This approach poses two challenges. First, the number of non-zeroes in each row of a sparse matrix varies widely between datasets, from as low as one to as high as 46,000 in the datasets studied. This makes it impractical to assign one or even a fixed number of rows to each dot-product engine. Therefore, one implementation assigns fixed-size chunks of matrix data to each dot product engine and handles the case where a chunk contains multiple matrix rows and the case where a single row is split across multiple chunks.

The second challenge is that fetching the entire vector from stack DRAM for each block of the matrix has the potential to waste significant amounts of bandwidth (i.e., fetching vector elements for which there is no corresponding non-zero in the block). This is particularly an issue for sparse matrix-dense vector multiplication, where the vector can be a significant fraction of the size of the sparse matrix. To address this, one implementation constructs a fetch list 2611-2612 for each block 2601-2602 in the matrix, which lists the set of vector 2610 elements that correspond to non-zero values in the block, and only fetch those elements when processing the block. While the fetch lists must also be fetched from stack DRAM, it has been determined that the fetch list for most blocks will be a small fraction of the size of the block. Techniques such as run-length encodings may also be used to reduce the size of the fetch list.

Thus, a matrix-vector multiplication on Accelerator will involve the following sequence of operations:

1. Fetch a block of matrix data from the DRAM stack and distribute it across the dot-product engines;

2. Generate fetch list based on non-zero elements in the matrix data;

3. Fetch each vector element in the fetch list from stack DRAM and distribute it to the dot-product engines;

4. Compute the dot-product of the rows in the block with the vector and write the results out to stack DRAM; and 5. In parallel with the computation, fetch the next block of matrix data and repeat until the entire matrix has been processed.

When an accelerator contains multiple stacks, "partitions" of the matrix may be statically assigned to the different stacks and then the blocking algorithm may be executed in parallel on each partition. This blocking and broadcast scheme has the advantage that all of the memory references originate from a central control unit, which greatly simplifies the design of the on-chip network, since the network does not have to route unpredictable requests and replies between the dot product engines and the memory controllers. It also saves energy by only issuing one memory request for each vector element that a given block needs, as opposed to having individual dot product engines issue memory requests for the vector elements that they require to perform their portion of the computation. Finally, fetching vector elements out of an organized list of indices makes it easy to schedule the memory requests that those fetches require in a way that maximizes page hits in the stacked DRAM and thus bandwidth usage.

Implementing Sparse Matrix-Dense Vector Multiplication

One challenge in implementing sparse matrix-dense vector multiplication on the accelerator implementations described herein is matching the vector elements being streamed from memory to the indices of the matrix elements in each dot-product engine's buffers. In one implementation, 256 bytes (32-64 elements) of the vector arrive at the dot-product engine per cycle, and each vector element could correspond to any of the non-zeroes in the dot-product engine's matrix buffer since fixed-size blocks of matrix data were fetched into each dot-product engine's matrix buffer.

Performing that many comparisons each cycle would be prohibitively expensive in area and power. Instead, one implementation takes advantage of the fact that many sparse-matrix applications repeatedly multiply the same matrix by either the same or different vectors and precompute the elements of the fetch list that each dot-product engine will need to process its chunk of the matrix, using the format shown in FIG. 27. In the baseline CRS format, a matrix is described by an array of indices 2702 that define the position of each non-zero value within its row, an array containing the values of each non-zero 2703, and an array 2701 that indicates where each row starts in the index and values arrays. To that, one implementation adds an array of block descriptors 2705 that identify which bursts of vector data each dot-product engine needs to capture in order to perform its fraction of the overall computation.

Figure 27:
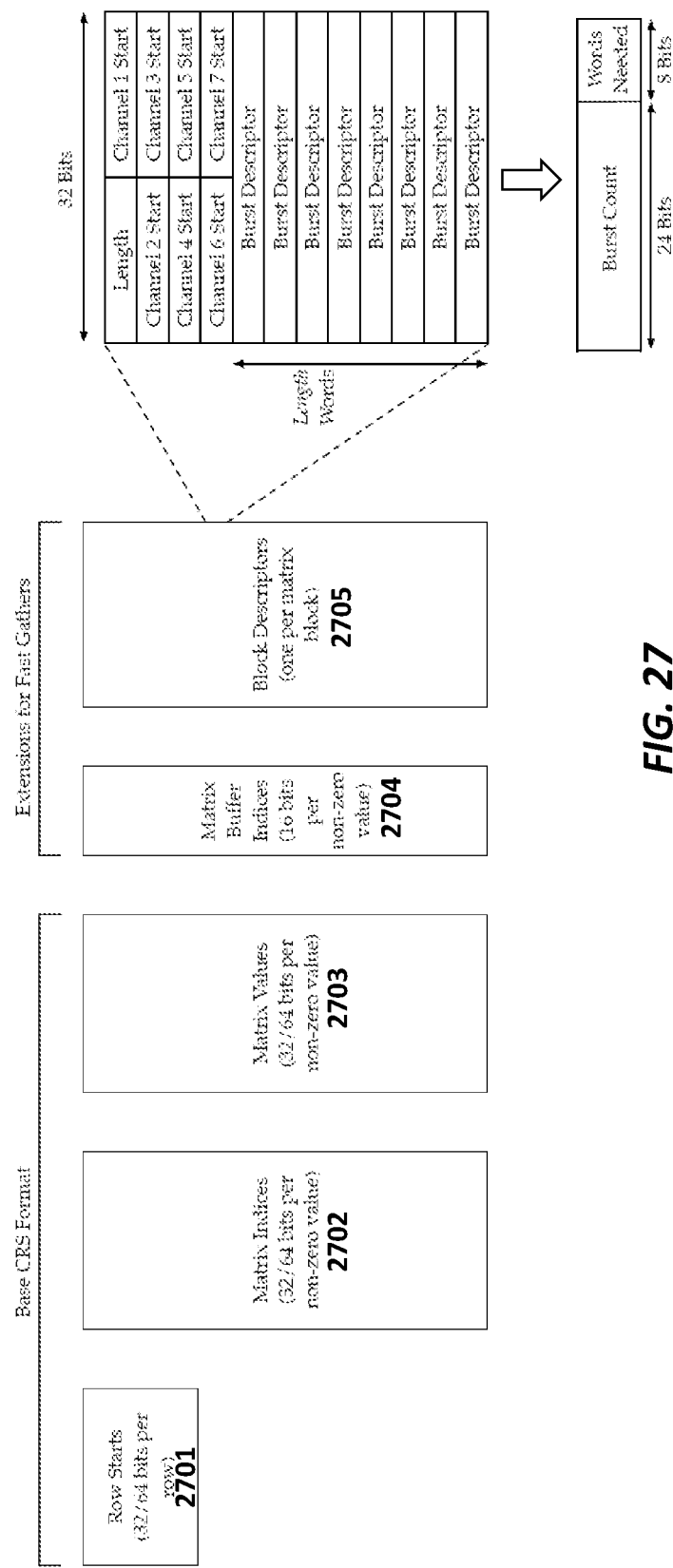
FIG. 27 illustrates a format of block descriptors according to some embodiments.

As shown in FIG. 27, each block descriptor consists of eight 16-bit values and a list of burst descriptors. The first 16-bit value tells the hardware how many burst descriptors are in the block descriptor, while the remaining seven identify the start points within the burst descriptor list for all of the stack DRAM data channels except the first. The number of these values will change depending on the number of data channels the stacked DRAM provides. Each burst descriptor contains a 24-bit burst count that tells the hardware which burst of data it needs to pay attention to and a "Words Needed" bit-vector that identifies the words within the burst that contain values the dot-processing engine needs.

The other data structure included in one implementation is an array of matrix buffer indices (MBIs) 2704, one MBI per non-zero in the matrix. Each MBI gives the position at which the dense vector element that corresponds to the non-zero will be stored in the relevant dot-product engine's vector value buffer (see, e.g., FIG. 29). When performing a sparse matrix-dense vector multiplication, the matrix buffer indices, rather than the original matrix indices, are loaded into the dot-product engine's matrix index buffer 2704, and serve as the address used to look up the corresponding vector value when computing the dot product.

Figure 28:
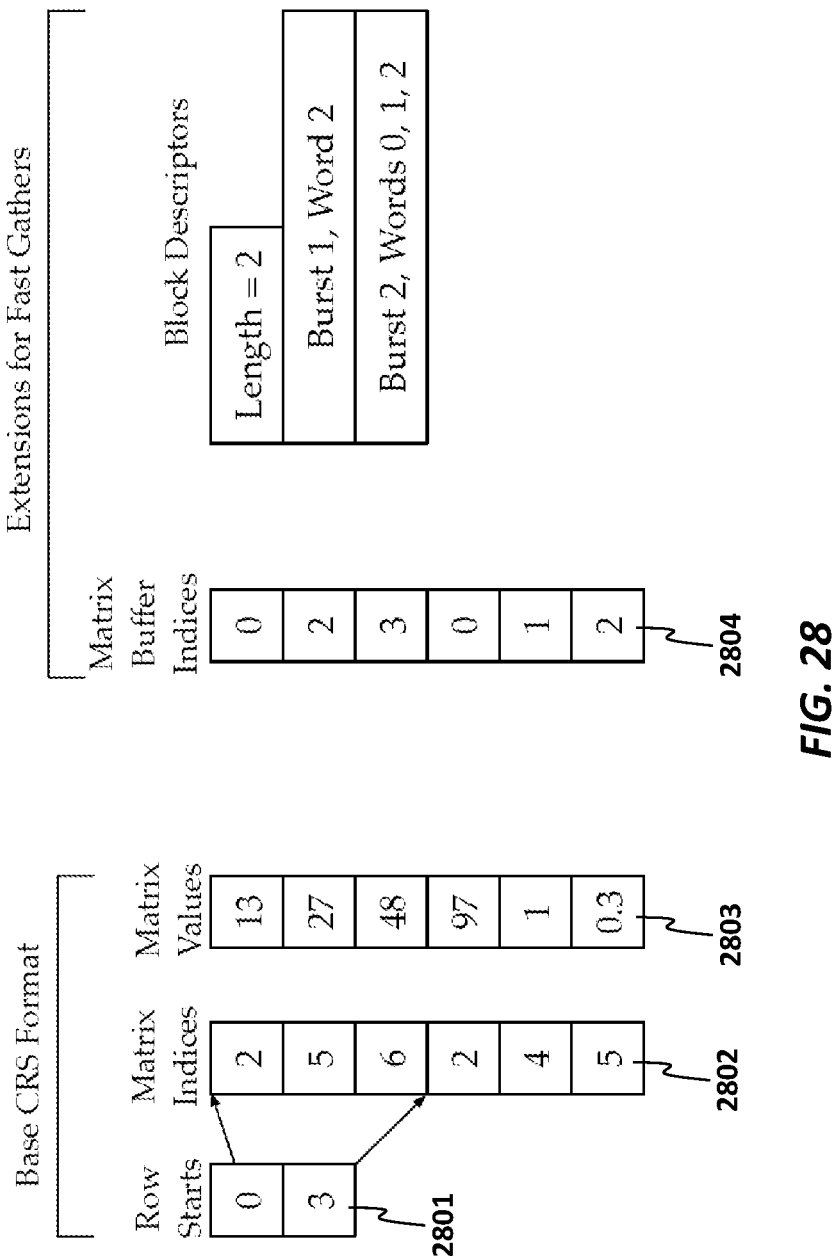
FIG. 28 illustrates the use of block descriptors for a two-row matrix that fits within the buffers of a single dot-product engine, on a system with only one stacked dynamic random access memory (DRAM) data channel and four-word data bursts, according to some embodiments.

FIG. 28 illustrates how this works for a two-row matrix that fits within the buffers of a single dot-product engine, on a system with only one stacked DRAM data channel and four-word data bursts. The original CRS representation including row start values 2801, matrix indices 2802 and matrix values 2803 are shown on the left of the figure. Since the two rows have non-zero elements in columns {2, 5, 6} and {2, 4, 5}, elements 2, 4, 5, and 6 of the vector are required to compute the dot-products. The block descriptors reflect this, indicating that word 2 of the first four-word burst (element 2 of the vector) and words 0, 1, and 2 of the second four-word burst (elements 4-6 of the vector) are required. Since element 2 of the vector is the first word of the vector that the dot-product engine needs, it will go in location 0 in the vector value buffer. Element 4 of the vector will go in location 1, and so on.

The matrix buffer index array data 2804 holds the location within the vector value buffer where the hardware will find the value that corresponds to the non-zero in the matrix. Since the first entry in the matrix indices array has value "2", the first entry in the matrix buffer indices array gets the value "0", corresponding to the location where element 2 of the vector will be stored in the vector value buffer. Similarly, wherever a "4" appears in the matrix indices array, a "1" will appear in the matrix buffer indices, each "5" in the matrix indices array will have a corresponding "2" in the matrix buffer indices, and each "6" in the matrix indices array will correspond to a "3" in the matrix buffer indices.

One implementation of the invention performs the pre-computations required to support fast gathers out of dense vectors when a matrix is loaded onto the accelerator, taking advantage of the fact that the total bandwidth of a multi-stack accelerator is much greater than the bandwidth of the KTI links used to transfer data from the CPU to the accelerator. This pre-computed information increases the amount of memory required to hold a matrix by up to 75%, depending on how often multiple copies of the same matrix index occur within the chunk of the matrix mapped onto a dot-product engine. However, because the 16-bit matrix buffer indices array is fetched instead of the matrix indices array when a matrix-vector multiplication is performed, the amount of data fetched out of the stack DRAMs will often be less than in the original CRS representation, particularly for matrices that use 64-bit indices.

Figure 29:
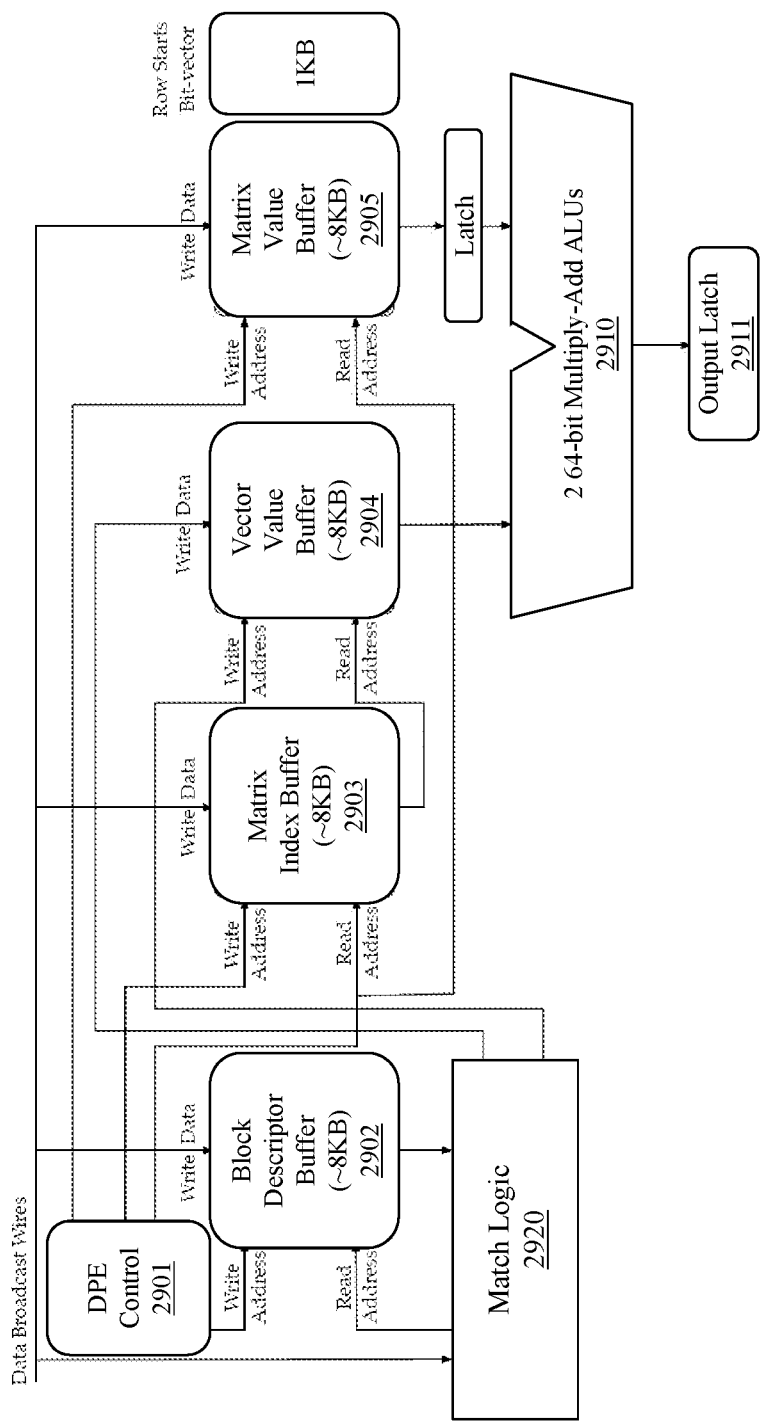
FIG. 29 illustrates one implementation of the hardware in a dot-product engine according to some embodiments.

FIG. 29 illustrates one implementation of the hardware in a dot-product engine that uses this format. To perform a matrix-vector multiplication, the chunks of the matrix that make up a block are copied into the matrix index buffer 3003 and matrix value buffer 3005 (copying the matrix buffer indices instead of the original matrix indices), and the relevant block descriptor is copied into the block descriptor buffer 3002. Then, the fetch list is used to load the required elements from the dense vector and broadcast them to the dot-product engines. Each dot-product engine counts the number of bursts of vector data that go by on each data channel. When the count on a given data channel matches the value specified in a burst descriptor, the match logic 3020 captures the specified words and stores them in its vector value buffer 3004.

Figure 30:
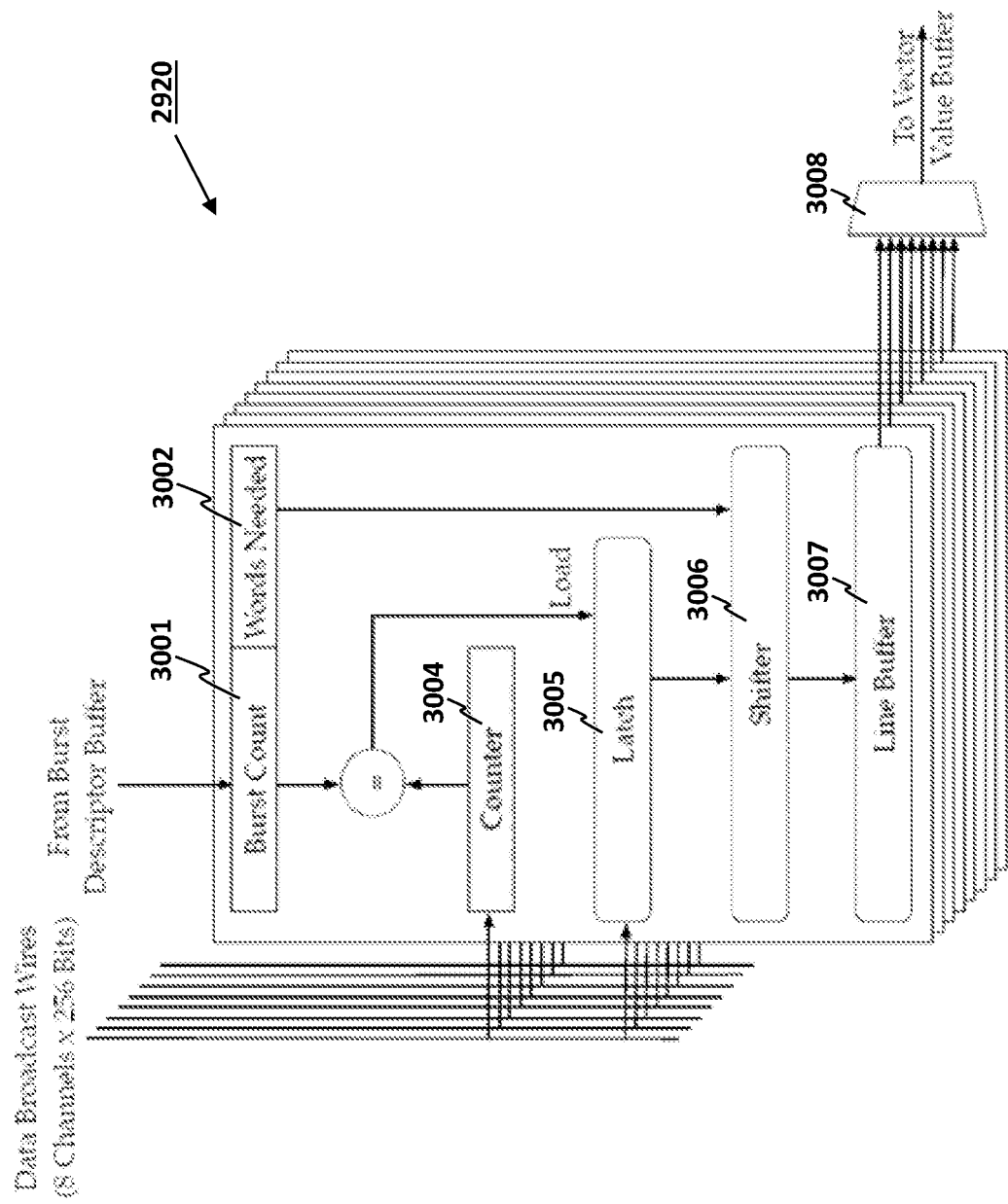
FIG. 30 illustrates the contents of the match logic unit that does capturing according to some embodiments.

FIG. 30 shows the contents of the match logic 3020 unit that does this capturing. A latch 3105 captures the value on the data channel's wires when the counter matches the value in the burst descriptor. A shifter 3106 extracts the required words 3102 out of the burst 3101 and routes them to the right location in a line buffer 3107 whose size matches the rows in the vector value buffer. A load signal is generated when the burst count 3101 is equal to an internal counter 3104. When the line buffer fills up, it is stored in the vector value buffer 3004 (through mux 3108). Assembling the words from multiple bursts into lines in this way reduces the number of writes/cycle that the vector value buffer needs to support, reducing its size.

Once all of the required elements of the vector have been captured in the vector value buffer, the dot-product engine computes the required dot-product(s) using the ALUs 3010. The control logic 3001 steps through the matrix index buffer 3003 and matrix value buffer 3004 in sequence, one element per cycle. The output of the matrix index buffer 3003 is used as the read address for the vector value buffer 3004 on the next cycle, while the output of the matrix value buffer 3004 is latched so that it reaches the ALUs 3010 at the same time as the corresponding value from the vector value buffer 3004. For example, using the matrix from FIG. 28, on the first cycle of the dot-product computation, the hardware would read the matrix buffer index "0" out of the matrix index buffer 3003 along with the value "13" from the matrix value buffer 3005. On the second cycle, the value "0" from the matrix index buffer 3003 acts as the address for the vector value buffer 3004, fetching the value of vector element "2", which is then multiplied by "13" on cycle 3.

The values in the row starts bit-vector 2901 tell the hardware when a row of the matrix ends and a new one begins. When the hardware reaches the end of the row, it places the accumulated dot-product for the row in its output latch 3011 and begins accumulating the dot-product for the next row. The dot-product latches of each dot-product engine are connected in a daisy chain that assembles the output vector for writeback.

Implementing Sparse Matrix-Sparse Vector Multiplication

In sparse matrix-sparse vector multiplication, the vector tends to take up much less memory than in sparse matrix-dense vector multiplication, but, because it is sparse, it is not possible to directly fetch the vector element that corresponds to a given index. Instead, the vector must be searched, making it impractical to route only the elements that each dot-product engine needs to the dot-product engine and making the amount of time required to compute the dot-products of the matrix data assigned to each dot-product engine unpredictable. Because of this, the fetch list for a sparse matrix-sparse vector multiplication merely specifies the index of the lowest and highest non-zero elements in the matrix block and all of the non-zero elements of the vector between those points must be broadcast to the dot-product engines.

Figure 31:
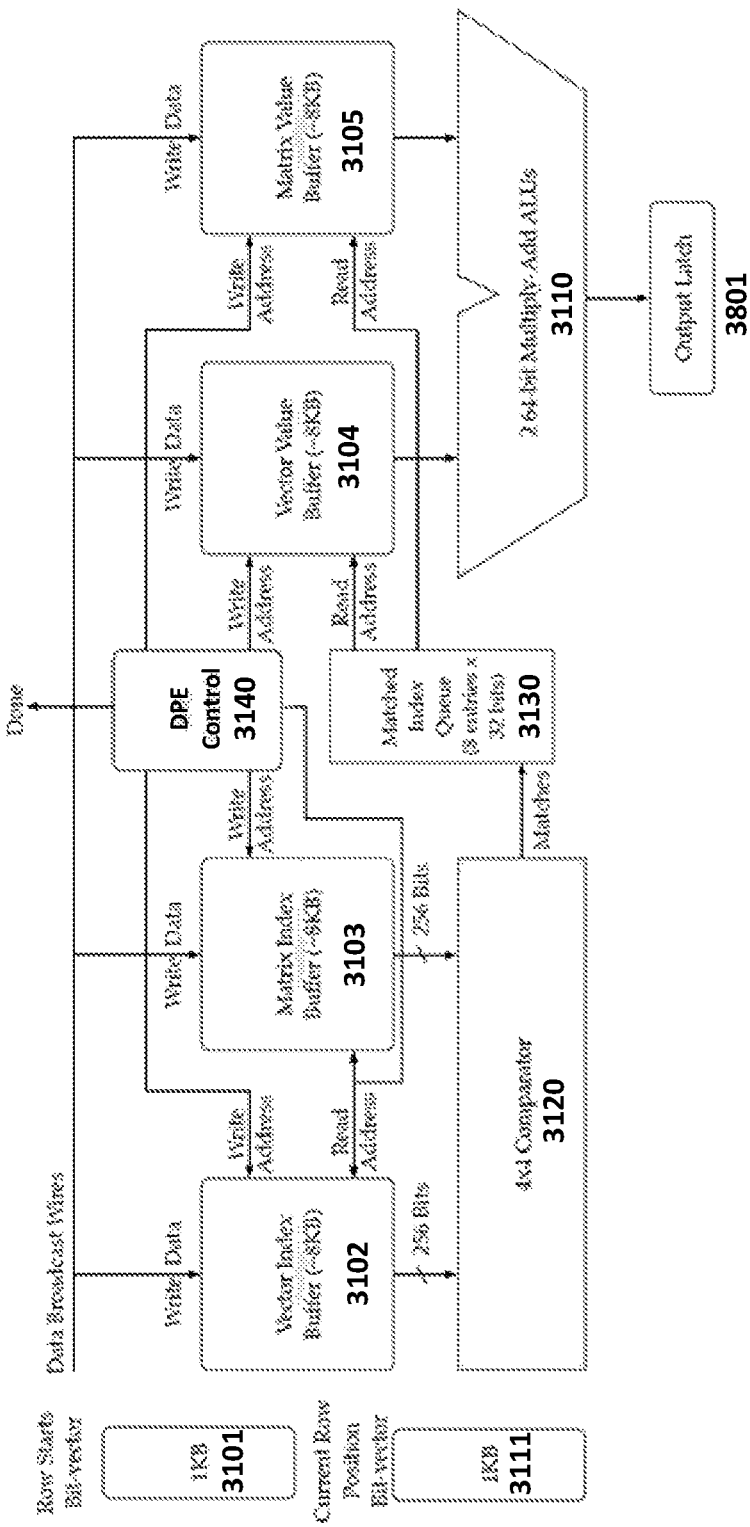
FIG. 31 shows the details of a dot-product engine design to support sparse matrix-sparse vector multiplication according to some embodiments.

FIG. 31 shows the details of a dot-product engine design to support sparse matrix-sparse vector multiplication. To process a block of matrix data, the indices (not the matrix buffer indices used in a sparse-dense multiplication) and values of the dot-product engine's chunk of the matrix are written into the matrix index and value buffers, as are the indices and values of the region of the vector required to process the block. The dot-product engine control logic 3140 then sequences through the index buffers 3102-3103, which output blocks of four indices to the 4×4 comparator 3120. The 4×4 comparator 3120 compares each of the indices from the vector 3102 to each of the indices from the matrix 3103, and outputs the buffer addresses of any matches into the matched index queue 3130. The outputs of the matched index queue 3130 drive the read address inputs of the matrix value buffer 3105 and vector value buffer 3104, which output the values corresponding to the matches into the multiply-add ALU 3110. This hardware allows the dot-product engine to consume at least four and as many as eight indices per cycle as long as the matched index queue 3130 has empty space, reducing the amount of time required to process a block of data when index matches are rare.

As with the sparse matrix-dense vector dot-product engine, a bit-vector of row starts 3101 identifies entries in the matrix buffers 3192-3103 that start a new row of the matrix. When such an entry is encountered, the control logic 3140 resets to the beginning of the vector index buffer ATA3202 and starts examining vector indices from their lowest value, comparing them to the outputs of the matrix index buffer 3103. Similarly, if the end of the vector is reached, the control logic 3140 advances to the beginning of the next row in the matrix index buffer 3103 and resets to the beginning of the vector index buffer 3102. A "done" output informs the chip control unit when the dot-product engine has finished processing a block of data or a region of the vector and is ready to proceed to the next one. To simplify one implementation of the accelerator, the control logic 3140 will not proceed to the next block/region until all of the dot-product engines have finished processing.

In many cases, the vector buffers will be large enough to hold all of the sparse vector that is required to process the block. In one implementation, buffer space for 1,024 or 2,048 vector elements is provided, depending on whether 32- or 64-bit values are used.

When the required elements of the vector do not fit in the vector buffers, a multipass approach may be used. The control logic 3140 will broadcast a full buffer of the vector into each dot-product engine, which will begin iterating through the rows in its matrix buffers. When the dot-product engine reaches the end of the vector buffer before reaching the end of the row, it will set a bit in the current row position bit-vector 3111 to indicate where it should resume processing the row when the next region of the vector arrives, will save the partial dot-product it has accumulated in the location of the matrix values buffer 3105 corresponding to the start of the row unless the start of the row has a higher index value than any of the vector indices that have been processed so far, and will advance to the next row. After all of the rows in the matrix buffer have been processed, the dot-product engine will assert its done signal to request the next region of the vector, and will repeat the process until the entire vector has been read.

Figure 32:
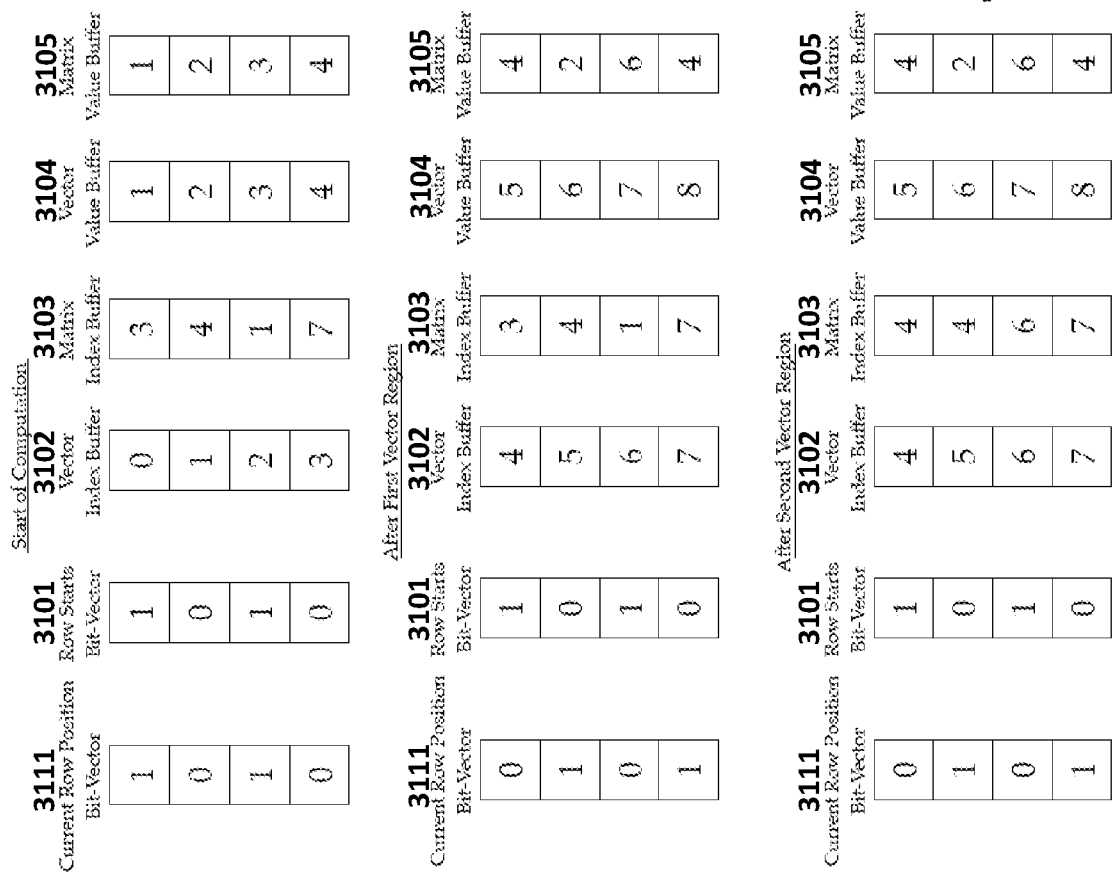
FIG. 32 illustrates an example multi-pass approach using specific values according to some embodiments.

FIG. 32 illustrates an example using specific values. At the start of the computation 3201, a four-element chunk of the matrix has been written into the matrix buffers 3103, 3105, and a four-element region of the vector has been written into the vector buffers 3102, 3104. The row starts 3101 and current row position bit-vectors 3111 both have the value "1010," indicating that the dot-product engine's chunk of the matrix contains two rows, one of which starts at the first element in the matrix buffer, and one of which starts at the third.

When the first region is processed, the first row in the chunk sees an index match at index 3, computes the product of the corresponding elements of the matrix and vector buffers (4×1=4) and writes that value into the location of the matrix value buffer 3105 that corresponds to the start of the row. The second row sees one index match at index 1, computes the product of the corresponding elements of the vector and matrix, and writes the result (6) into the matrix value buffer 3105 at the position corresponding to its start. The state of the current row position bit-vector changes to "0101," indicating that the first element of each row has been processed and the computation should resume with the second elements. The dot-product engine then asserts its done line to signal that it is ready for another region of the vector.

When the dot-product engine processes the second region of the vector, it sees that row 1 has an index match at index 4, computes the product of the corresponding values of the matrix and vector (5×2=10), adds that value to the partial dot-product that was saved after the first vector region was processed, and outputs the result (14). The second row finds a match at index 7, and outputs the result 38, as shown in the figure. Saving the partial dot-products and state of the computation in this way avoids redundant work processing elements of the matrix that cannot possibly match indices in later regions of the vector (because the vector is sorted with indices in ascending order), without requiring significant amounts of extra storage for partial products.

Unified Dot-Product Engine Design

Figure 33:
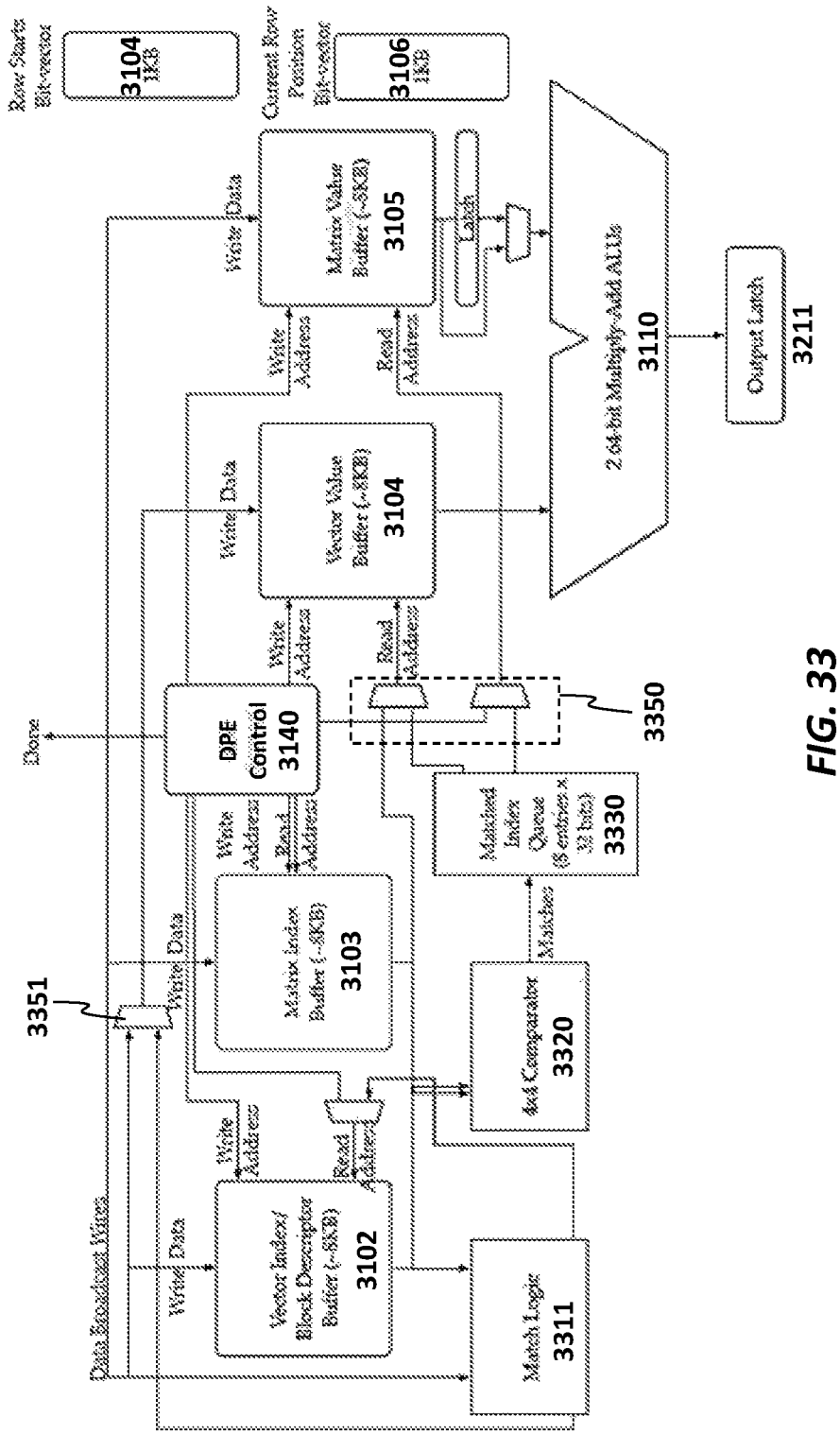
FIG. 33 shows how the sparse-dense and sparse-sparse dot-product engines described above can be combined according to some embodiments.

FIG. 33 shows how the sparse-dense and sparse-sparse dot-product engines described above are combined to yield a dot-product engine that can handle both types of computations. Given the similarity between the two designs, the only required changes are to instantiate both the sparse-dense dot-product engine's match logic 3311 and the sparse-sparse dot-product engine's comparator 3320 and matched index queue 3330, along with a set of multiplexors 3350 that determine which modules drive the read address and write data inputs of the buffers 3104-3105 and a multiplexor 3351 that selects whether the output of the matrix value buffer or the latched output of the matrix value buffer is sent to the multiply-add ALUs 3110. In one implementation, these multiplexors are controlled by a configuration bit in the control unit 3140 that is set at the beginning of a matrix-vector multiplication and remain in the same configuration throughout the operation.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Register Architecture

Figure 34:
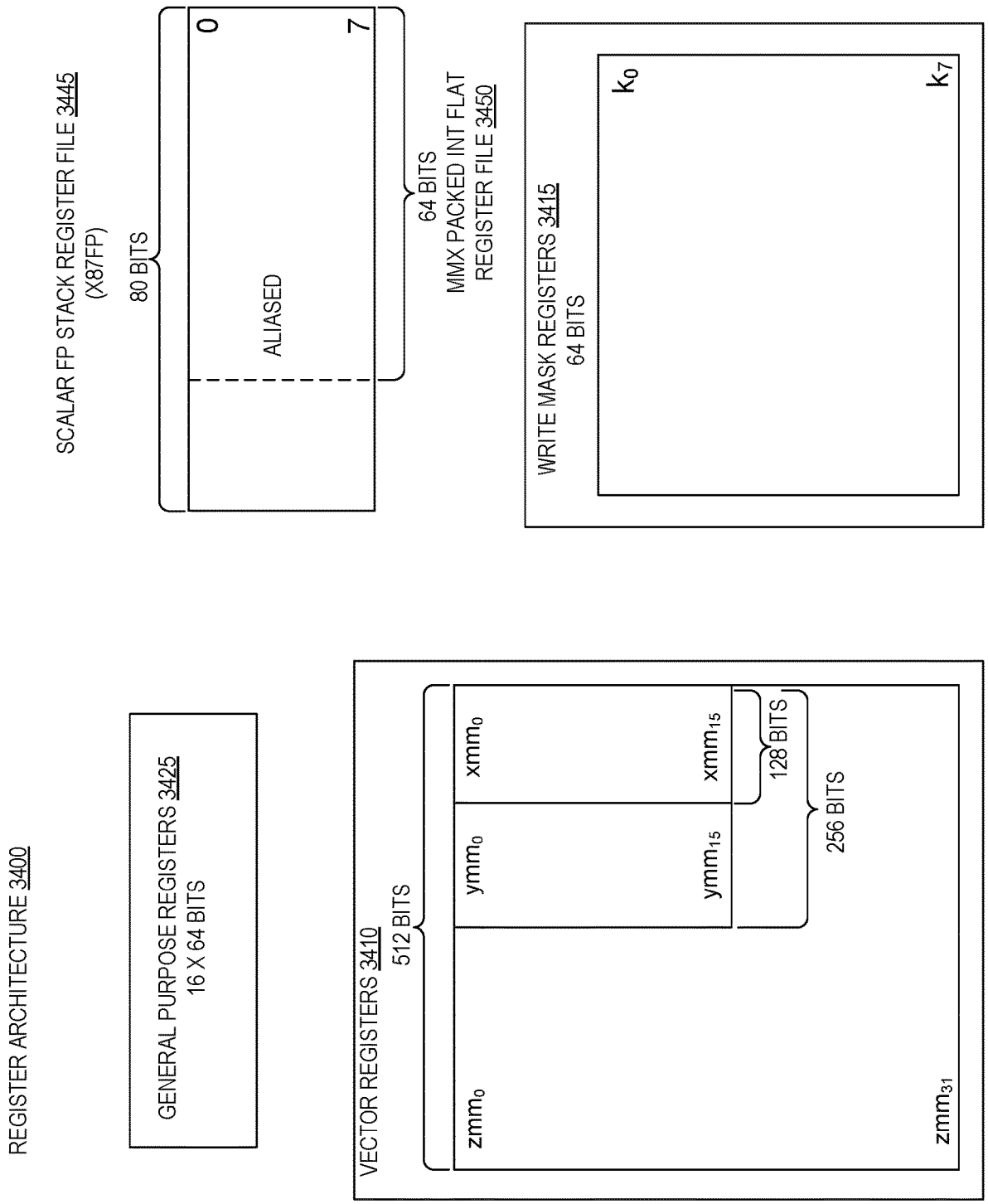
FIG. 34 is a block diagram of a register architecture according to one embodiment of the invention.

FIG. 34 is a block diagram of a register architecture 3400 according to one embodiment of the invention. In the embodiment illustrated, there are 32 vector registers 3410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 3415—in the embodiment illustrated, there are 8 write mask registers (k0 through k7), each 64 bits in size. In an alternate embodiment, the write mask registers 3415 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 3425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 3445, on which is aliased the MMX packed integer flat register file 3450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-Of-Order Core Block Diagram

FIG. 35A is a block diagram illustrating both an exemplary in-order pipeline and an exemplary register renaming, out-of-order issue/execution pipeline according to embodiments of the invention. FIG. 35B is a block diagram illustrating both an exemplary embodiment of an in-order architecture core and an exemplary register renaming, out-of-order issue/execution architecture core to be included in a processor according to embodiments of the invention. The solid lined boxes in FIGS. 35A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 35A, a processor pipeline 3500 includes a fetch stage 3502, a length decode stage 3504, a decode stage 3506, an allocation stage 3508, a renaming stage 3510, a scheduling (also known as a dispatch or issue) stage 3512, a register read/memory read stage 3514, an execute stage 3516, a write back/memory write stage 3518, an exception handling stage 3522, and a commit stage 3524.

FIG. 35B shows processor core 3590 including a front end unit 3530 coupled to an execution engine unit 3550, and both are coupled to a memory unit 3570. The core 3590 may be a reduced instruction set computing (RISC) core, a complex instruction set computing (CISC) core, a very long instruction word (VLIW) core, or a hybrid or alternative core type. As yet another option, the core 3590 may be a special-purpose core, such as, for example, a network or communication core, compression engine, coprocessor core, general purpose computing graphics processing unit (GPGPU) core, graphics core, or the like.

The front end unit 3530 includes a branch prediction unit 3532 coupled to an instruction cache unit 3534, which is coupled to an instruction translation lookaside buffer (TLB) 3536, which is coupled to an instruction fetch unit 3538, which is coupled to a decode unit 3540. The decode unit 3540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 3540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 3590 includes a microcode ROM or other medium that stores microcode for certain macroinstructions (e.g., in decode unit 3540 or otherwise within the front end unit 3530). The decode unit 3540 is coupled to a rename/allocator unit 3552 in the execution engine unit 3550.

The execution engine unit 3550 includes the rename/allocator unit 3552 coupled to a retirement unit 3554 and a set of one or more scheduler unit(s) 3556. The scheduler unit(s) 3556 represents any number of different schedulers, including reservations stations, central instruction window, etc. The scheduler unit(s) 3556 is coupled to the physical register file(s) unit(s) 3558. Each of the physical register file(s) units 3558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 3558 comprises a vector registers unit, a write mask registers unit, and a scalar registers unit. These register units may provide architectural vector registers, vector mask registers, and general purpose registers. The physical register file(s) unit(s) 3558 is overlapped by the retirement unit 3554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 3554 and the physical register file(s) unit(s) 3558 are coupled to the execution cluster(s) 3560. The execution cluster(s) 3560 includes a set of one or more execution units 3562 and a set of one or more memory access units 3564. The execution units 3562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 3556, physical register file(s) unit(s) 3558, and execution cluster(s) 3560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 3564). It should also be understood that where separate pipelines are used, one or more of these pipelines may be out-of-order issue/execution and the rest in-order.

The set of memory access units 3564 is coupled to the memory unit 3570, which includes a data TLB unit 3572 coupled to a data cache unit 3574 coupled to a level 2 (L2) cache unit 3576. In one exemplary embodiment, the memory access units 3564 may include a load unit, a store address unit, and a store data unit, each of which is coupled to the data TLB unit 3572 in the memory unit 3570. The instruction cache unit 3534 is further coupled to a level 2 (L2) cache unit 3576 in the memory unit 3570. The L2 cache unit 3576 is coupled to one or more other levels of cache and eventually to a main memory.

By way of example, the exemplary register renaming, out-of-order issue/execution core architecture may implement the pipeline 3500 as follows: 1) the instruction fetch 3538 performs the fetch and length decoding stages 3502 and 3504; 2) the decode unit 3540 performs the decode stage 3506; 3) the rename/allocator unit 3552 performs the allocation stage 3508 and renaming stage 3510; 4) the scheduler unit(s) 3556 performs the schedule stage 3512; 5) the physical register file(s) unit(s) 3558 and the memory unit 3570 perform the register read/memory read stage 3514; the execution cluster 3560 perform the execute stage 3516; 6) the memory unit 3570 and the physical register file(s) unit(s) 3558 perform the write back/memory write stage 3518; 7) various units may be involved in the exception handling stage 3522; and 8) the retirement unit 3554 and the physical register file(s) unit(s) 3558 perform the commit stage 3524.

The core 3590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 3590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 3534/3574 and a shared L2 cache unit 3576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 36A:
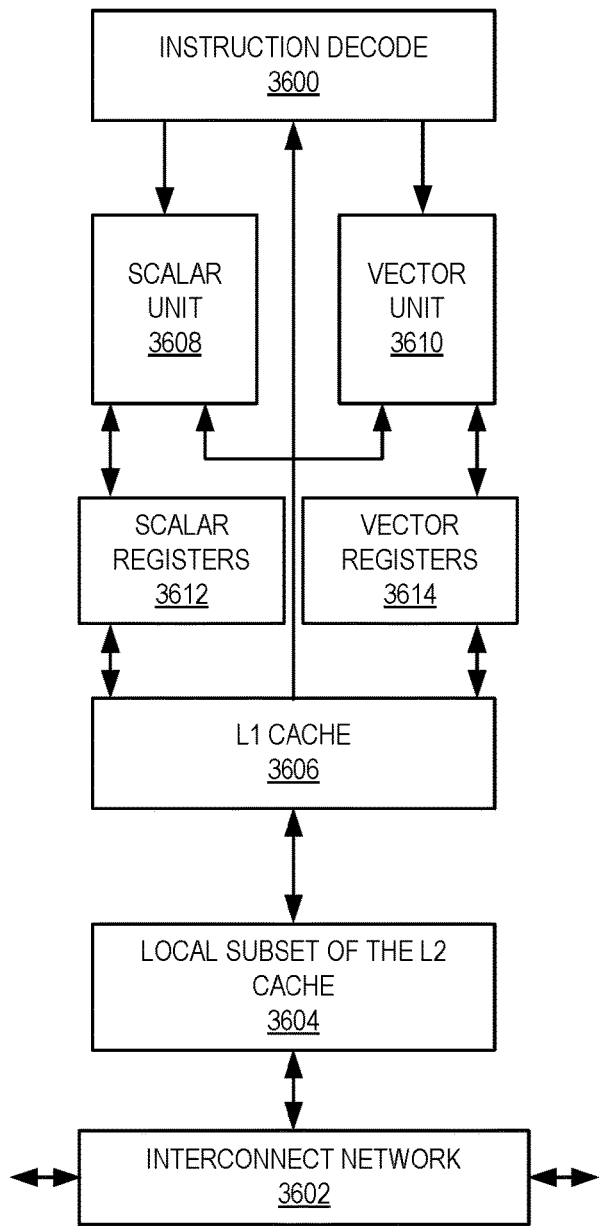
FIGS. 36A-B illustrate a block diagram of a more specific exemplary in-order core architecture, which core would be one of several logic blocks (including other cores of the same type and/or different types) in a chip.
Figure 36B:
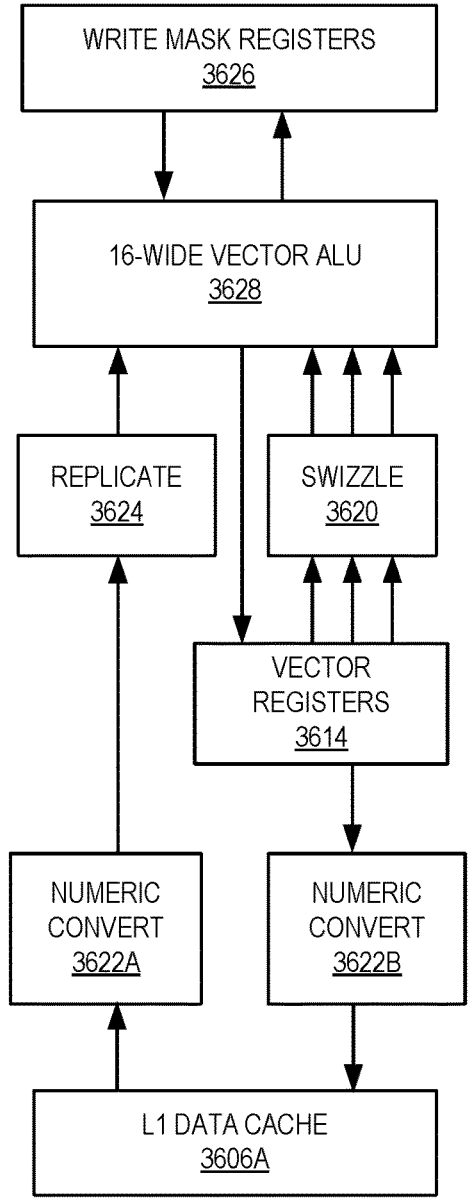

FIGS. 36A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 36A is a block diagram of a single processor core, along with its connection to the on-die interconnect network 3602 and with its local subset of the Level 2 (L2) cache 3604, according to embodiments of the invention. In one embodiment, an instruction decoder 3600 supports the x86 instruction set with a packed data instruction set extension. An L1 cache 3606 allows low-latency accesses to cache memory into the scalar and vector units. While in one embodiment (to simplify the design), a scalar unit 3608 and a vector unit 3610 use separate register sets (respectively, scalar registers 3612 and vector registers 3614) and data transferred between them is written to memory and then read back in from a level 1 (L1) cache 3606, alternative embodiments of the invention may use a different approach (e.g., use a single register set or include a communication path that allow data to be transferred between the two register files without being written and read back).

The local subset of the L2 cache 3604 is part of a global L2 cache that is divided into separate local subsets, one per processor core. Each processor core has a direct access path to its own local subset of the L2 cache 3604. Data read by a processor core is stored in its L2 cache subset 3604 and can be accessed quickly, in parallel with other processor cores accessing their own local L2 cache subsets. Data written by a processor core is stored in its own L2 cache subset 3604 and is flushed from other subsets, if necessary. The ring network ensures coherency for shared data. The ring network is bi-directional to allow agents such as processor cores, L2 caches and other logic blocks to communicate with each other within the chip. Each ring datapath is 1012-bits wide per direction.

FIG. 36B is an expanded view of part of the processor core in FIG. 36A according to embodiments of the invention. FIG. 36B includes an L1 data cache 3606A part of the L1 cache 3604, as well as more detail regarding the vector unit 3610 and the vector registers 3614. Specifically, the vector unit 3610 is a 16-wide vector processing unit (VPU) (see the 16-wide ALU 3628), which executes one or more of integer, single-precision float, and double-precision float instructions. The VPU supports swizzling the register inputs with swizzle unit 3620, numeric conversion with numeric convert units 3622A-B, and replication with replication unit 3624 on the memory input. Write mask registers 3626 allow predicating resulting vector writes.

Figure 37:
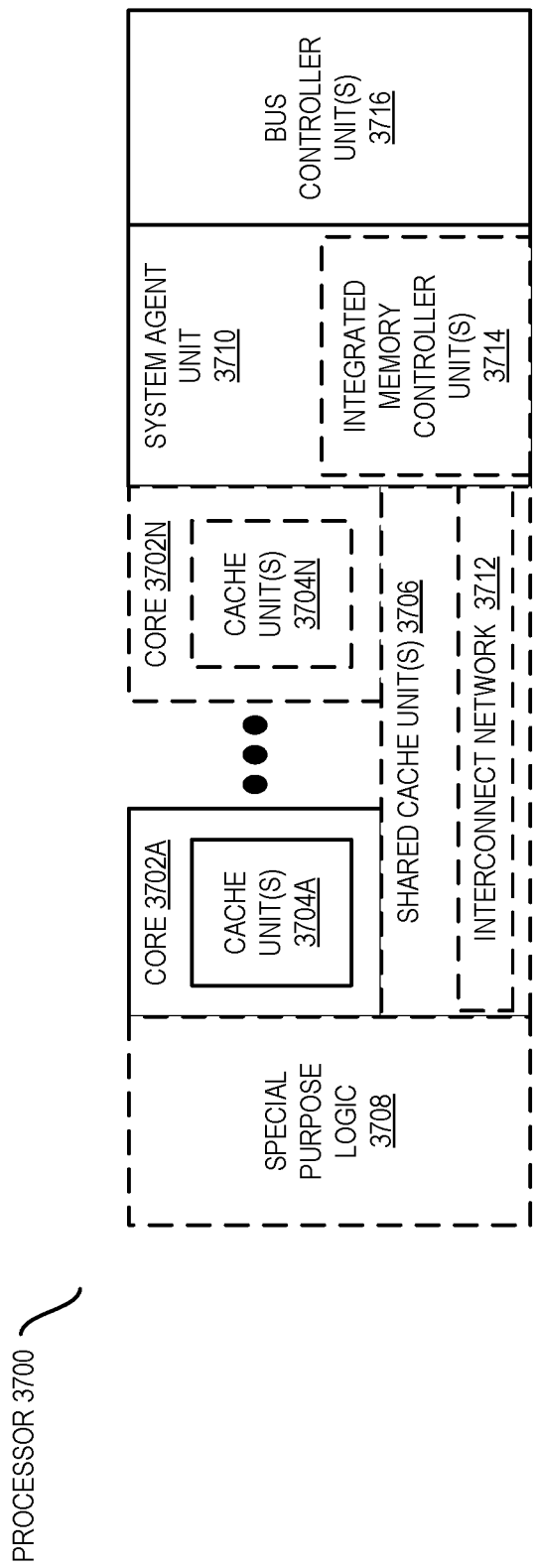
FIG. 37 is a block diagram of a processor that may have more than one core, may have an integrated memory controller, and may have integrated graphics according to embodiments of the invention.

FIG. 37 is a block diagram of a processor 3700 that may have more than one core, may have an integrated memory controller, and may have integrated graphics according to embodiments of the invention. The solid lined boxes in FIG. 37 illustrate a processor 3700 with a single core 3702A, a system agent 3710, a set of one or more bus controller units 3716, while the optional addition of the dashed lined boxes illustrates an alternative processor 3700 with multiple cores 3702A-N, a set of one or more integrated memory controller unit(s) 3714 in the system agent unit 3710, and special purpose logic 3708.

Thus, different implementations of the processor 3700 may include: 1) a CPU with the special purpose logic 3708 being integrated graphics and/or scientific (throughput) logic (which may include one or more cores), and the cores 3702A-N being one or more general purpose cores (e.g., general purpose in-order cores, general purpose out-of-order cores, a combination of the two); 2) a coprocessor with the cores 3702A-N being a large number of special purpose cores intended primarily for graphics and/or scientific (throughput); and 3) a coprocessor with the cores 3702A-N being a large number of general purpose in-order cores. Thus, the processor 3700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 3700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 3706, and external memory (not shown) coupled to the set of integrated memory controller units 3714. The set of shared cache units 3706 may include one or more mid-level caches, such as level 2 (L2), level 3 (L3), level 4 (L4), or other levels of cache, a last level cache (LLC), and/or combinations thereof. While in one embodiment a ring based interconnect unit 3712 interconnects the special purpose logic 3708 (e.g., integrated graphics logic), the set of shared cache units 3706, and the system agent unit 3710/integrated memory controller unit(s) 3714, alternative embodiments may use any number of well-known techniques for interconnecting such units. In one embodiment, coherency is maintained between one or more cache units 3706 and cores 3702-A-N.

In some embodiments, one or more of the cores 3702A-N are capable of multithreading. The system agent 3710 includes those components coordinating and operating cores 3702A-N. The system agent unit 3710 may include for example a power control unit (PCU) and a display unit. The PCU may be or include logic and components needed for regulating the power state of the cores 3702A-N and the integrated graphics logic 3708. The display unit is for driving one or more externally connected displays.

The cores 3702A-N may be homogenous or heterogeneous in terms of architecture instruction set; that is, two or more of the cores 3702A-N may be capable of execution the same instruction set, while others may be capable of executing only a subset of that instruction set or a different instruction set.

Exemplary Computer Architectures

FIGS. 38-41 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 38:
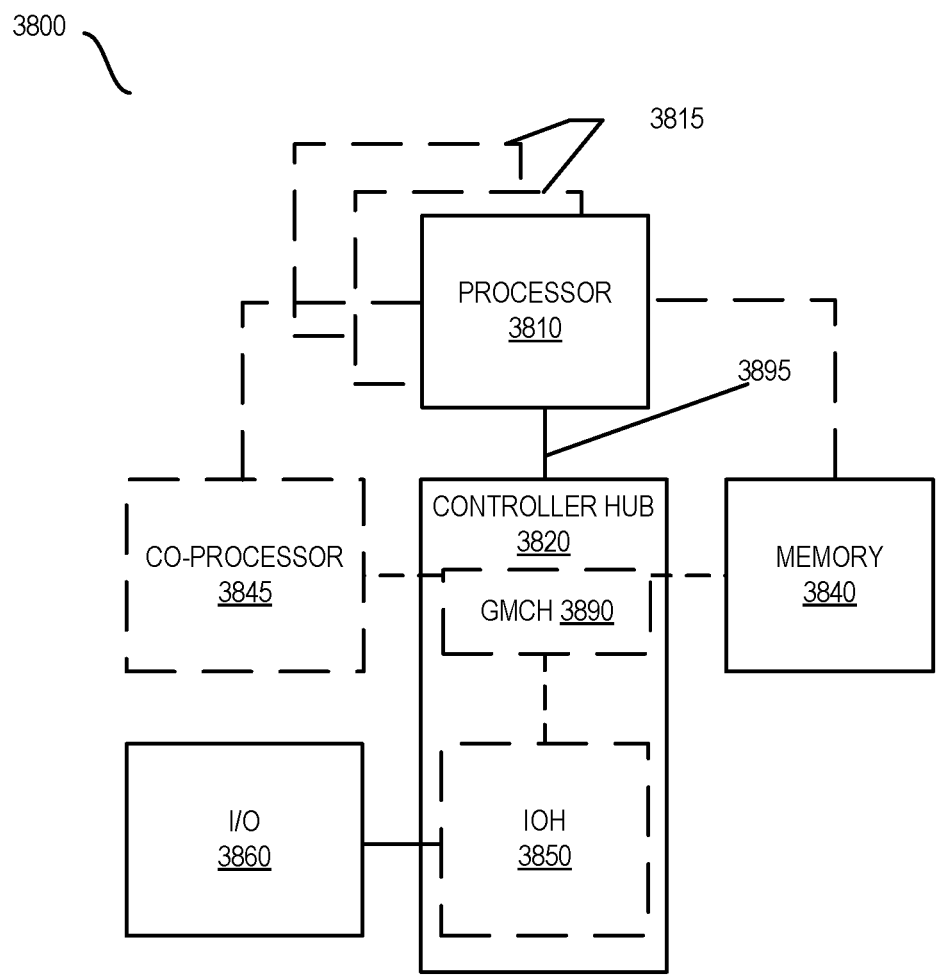
FIGS. 38-41 are block diagrams of exemplary computer architectures.

Referring now to FIG. 38, shown is a block diagram of a system 3800 in accordance with one embodiment of the present invention. The system 3800 may include one or more processors 3810, 3815, which are coupled to a controller hub 3820. In one embodiment, the controller hub 3820 includes a graphics memory controller hub (GMCH) 3890 and an Input/Output Hub (IOH) 3850 (which may be on separate chips); the GMCH 3890 includes memory and graphics controllers to which are coupled memory 3840 and a coprocessor 3845; the IOH 3850 couples input/output (I/O) devices 3860 to the GMCH 3890. Alternatively, one or both of the memory and graphics controllers are integrated within the processor (as described herein), the memory 3840 and the coprocessor 3845 are coupled directly to the processor 3810, and the controller hub 3820 in a single chip with the IOH 3850.

The optional nature of additional processors 3815 is denoted in FIG. 38 with broken lines. Each processor 3810, 3815 may include one or more of the processing cores described herein and may be some version of the processor 3700.

The memory 3840 may be, for example, dynamic random access memory (DRAM), phase change memory (PCM), or a combination of the two. For at least one embodiment, the controller hub 3820 communicates with the processor(s) 3810, 3815 via a multi-drop bus, such as a frontside bus (FSB), point-to-point interface such as QuickPath Interconnect (QPI), or similar connection 3895.

In one embodiment, the coprocessor 3845 is a special-purpose processor, such as, for example, a high-throughput MIC processor, a network or communication processor, compression engine, graphics processor, GPGPU, embedded processor, or the like. In one embodiment, controller hub 3820 may include an integrated graphics accelerator.

There can be a variety of differences between the physical resources 3810, 3815 in terms of a spectrum of metrics of merit including architectural, microarchitectural, thermal, power consumption characteristics, and the like.

In one embodiment, the processor 3810 executes instructions that control data processing operations of a general type. Embedded within the instructions may be coprocessor instructions. The processor 3810 recognizes these coprocessor instructions as being of a type that should be executed by the attached coprocessor 3845. Accordingly, the processor 3810 issues these coprocessor instructions (or control signals representing coprocessor instructions) on a coprocessor bus or other interconnect, to coprocessor 3845. Coprocessor(s) 3845 accept and execute the received coprocessor instructions.

Figure 39:
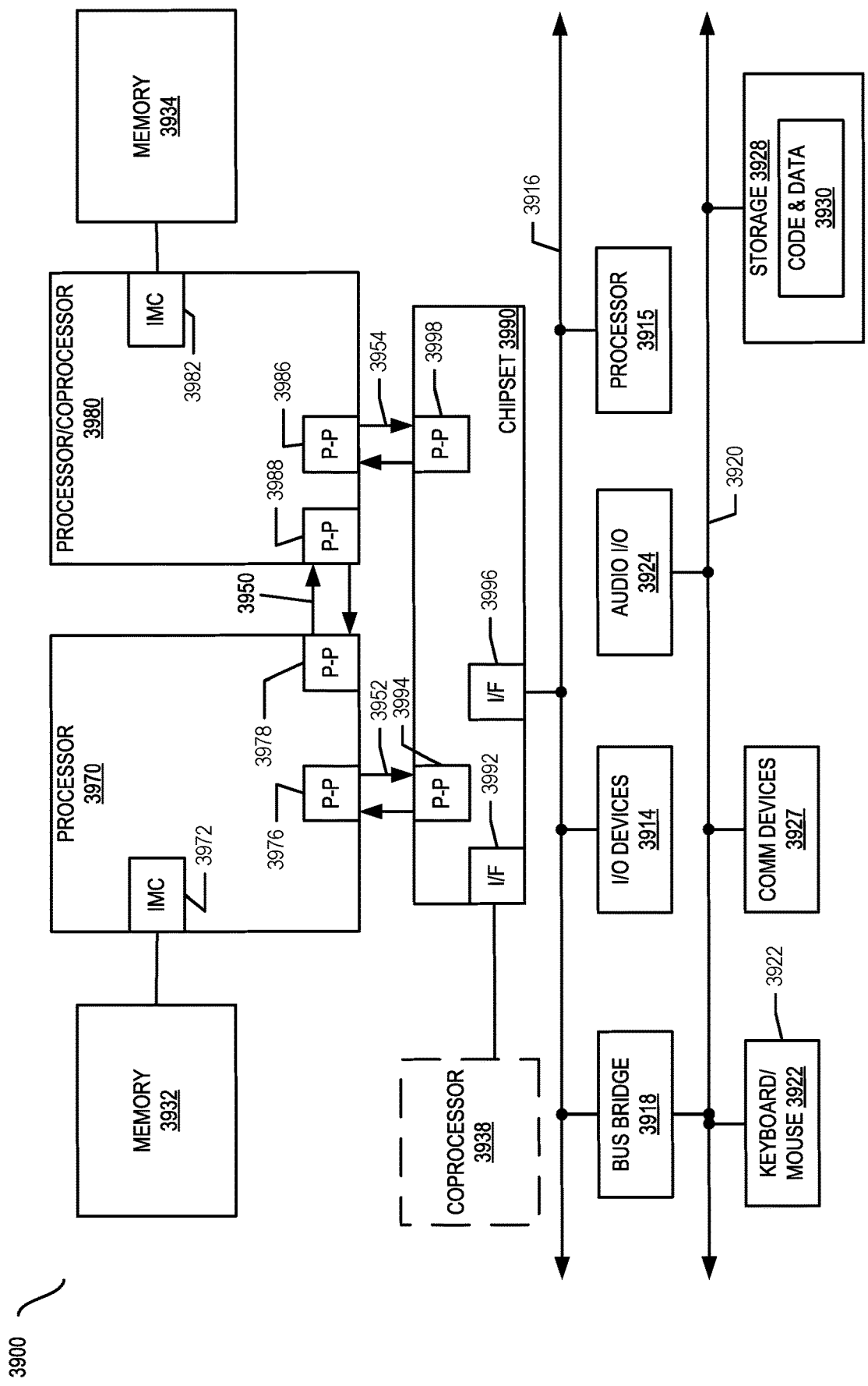

Referring now to FIG. 39, shown is a block diagram of a first more specific exemplary system 3900 in accordance with an embodiment of the present invention. As shown in FIG. 39, multiprocessor system 3900 is a point-to-point interconnect system, and includes a first processor 3970 and a second processor 3980 coupled via a point-to-point interconnect 3950. Each of processors 3970 and 3980 may be some version of the processor 3700. In one embodiment of the invention, processors 3970 and 3980 are respectively processors 3810 and 3815, while coprocessor 3938 is coprocessor 3845. In another embodiment, processors 3970 and 3980 are respectively processor 3810 coprocessor 3845.

Processors 3970 and 3980 are shown including integrated memory controller (IMC) units 3972 and 3982, respectively. Processor 3970 also includes as part of its bus controller units point-to-point (P-P) interfaces 3976 and 3978; similarly, second processor 3980 includes P-P interfaces 3986 and 3988. Processors 3970, 3980 may exchange information via a point-to-point (P-P) interface 3950 using P-P interface circuits 3978, 3988. As shown in FIG. 39, IMCs 3972 and 3982 couple the processors to respective memories, namely a memory 3932 and a memory 3934, which may be portions of main memory locally attached to the respective processors.

Processors 3970, 3980 may each exchange information with a chipset 3990 via individual P-P interfaces 3952, 3954 using point to point interface circuits 3976, 3994, 3986, 3998. Chipset 3990 may optionally exchange information with the coprocessor 3938 via a high-performance interface 3992. In one embodiment, the coprocessor 3938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 3990 may be coupled to a first bus 3916 via an interface 3996. In one embodiment, first bus 3916 may be a Peripheral Component Interconnect (PCI) bus, or a bus such as a PCI Express bus or another third generation I/O interconnect bus, although the scope of the present invention is not so limited.

As shown in FIG. 39, various I/O devices 3914 may be coupled to first bus 3916, along with a bus bridge 3918 which couples first bus 3916 to a second bus 3920. In one embodiment, one or more additional processor(s) 3915, such as coprocessors, high-throughput MIC processors, GPGPU's, accelerators (such as, e.g., graphics accelerators or digital signal processing (DSP) units), field programmable gate arrays, or any other processor, are coupled to first bus 3916. In one embodiment, second bus 3920 may be a low pin count (LPC) bus. Various devices may be coupled to a second bus 3920 including, for example, a keyboard and/or mouse 3922, communication devices 3927 and a storage unit 3928 such as a disk drive or other mass storage device which may include instructions/code and data 3930, in one embodiment. Further, an audio I/O 3924 may be coupled to the second bus 3920. Note that other architectures are possible. For example, instead of the point-to-point architecture of FIG. 39, a system may implement a multi-drop bus or other such architecture.

Figure 40:
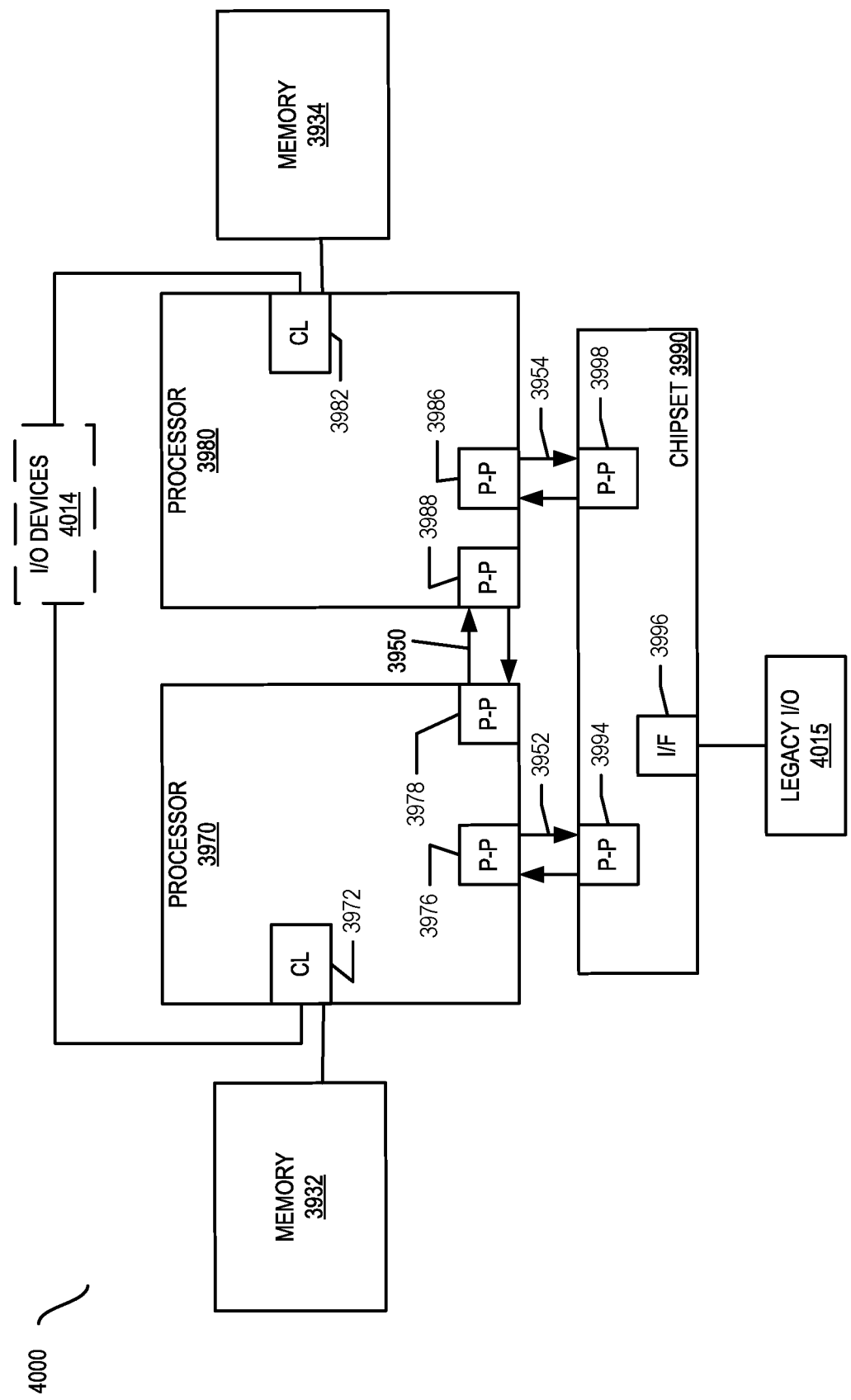

Referring now to FIG. 40, shown is a block diagram of a second more specific exemplary system 4000 in accordance with an embodiment of the present invention. Like elements in FIGS. 39 and 40 bear like reference numerals, and certain aspects of FIG. 39 have been omitted from FIG. 40 in order to avoid obscuring other aspects of FIG. 40.

FIG. 40 illustrates that the processors 3970, 3980 may include integrated memory and I/O control logic ("CL") 3972 and 3982, respectively. Thus, the CL 3972, 3982 include integrated memory controller units and include I/O control logic. FIG. 40 illustrates that not only are the memories 3932, 3934 coupled to the CL 3972, 3982, but also that I/O devices 4014 are also coupled to the control logic 3972, 3982. Legacy I/O devices 4015 are coupled to the chipset 3990.

Figure 41:
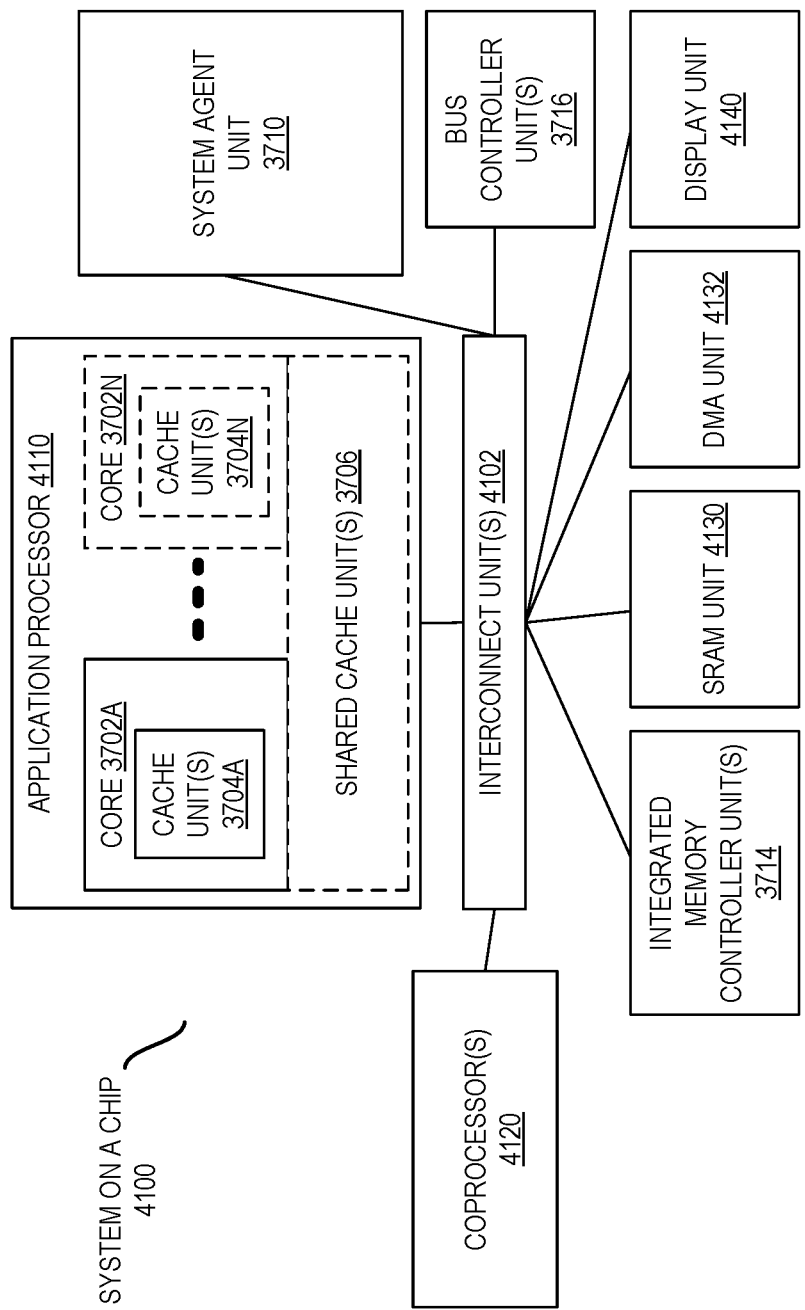

Referring now to FIG. 41, shown is a block diagram of a SoC 4100 in accordance with an embodiment of the present invention. Similar elements in FIG. 37 bear like reference numerals. Also, dashed lined boxes are optional features on more advanced SoCs. In FIG. 41, an interconnect unit(s) 4102 is coupled to: an application processor 4110 which includes a set of one or more cores 3702A-N, which include cache units 3704A-N, and shared cache unit(s) 3706; a system agent unit 3710; a bus controller unit(s) 3716; an integrated memory controller unit(s) 3714; a set or one or more coprocessors 4120 which may include integrated graphics logic, an image processor, an audio processor, and a video processor; an static random access memory (SRAM) unit 4130; a direct memory access (DMA) unit 4132; and a display unit 4140 for coupling to one or more external displays. In one embodiment, the coprocessor(s) 4120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 3930 illustrated in FIG. 39, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 42:
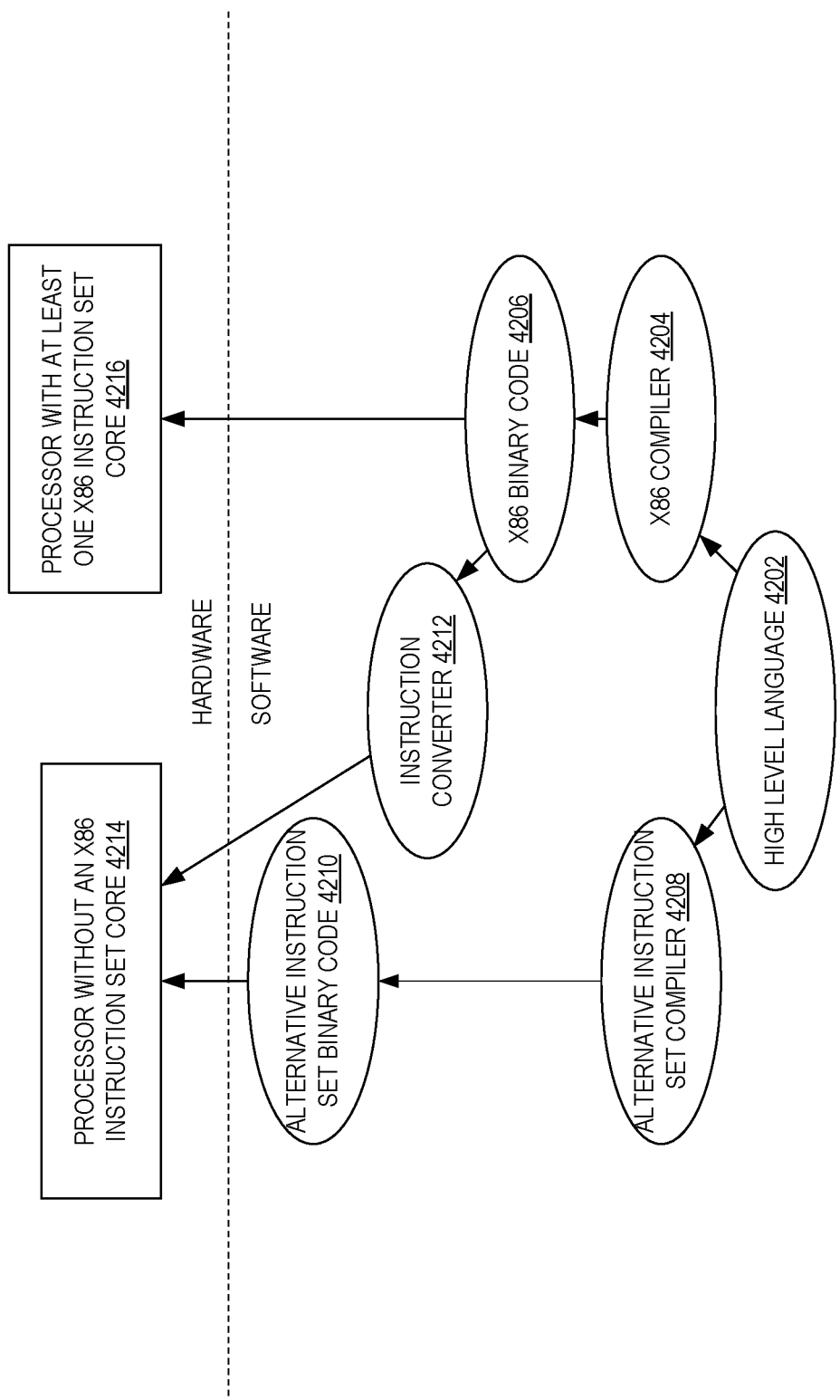
FIG. 42 is a block diagram contrasting the use of a software instruction converter to convert binary instructions in a source instruction set to binary instructions in a target instruction set according to embodiments of the invention.

FIG. 42 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 42 shows a program in a high level language 4202 may be compiled using an x86 compiler 4204 to generate x86 binary code 4206 that may be natively executed by a processor with at least one x86 instruction set core 4216. The processor with at least one x86 instruction set core 4216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 4204 represents a compiler that is operable to generate x86 binary code 4206 (e.g., object code) that can, with or without additional linkage processing, be executed on the processor with at least one x86 instruction set core 4216. Similarly, FIG. 42 shows the program in the high level language 4202 may be compiled using an alternative instruction set compiler 4208 to generate alternative instruction set binary code 4210 that may be natively executed by a processor without at least one x86 instruction set core 4214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 4212 is used to convert the x86 binary code 4206 into code that may be natively executed by the processor without an x86 instruction set core 4214. This converted code is not likely to be the same as the alternative instruction set binary code 4210 because an instruction converter capable of this is difficult to make; however, the converted code will accomplish the general operation and be made up of instructions from the alternative instruction set. Thus, the instruction converter 4212 represents software, firmware, hardware, or a combination thereof that, through emulation, simulation or any other process, allows a processor or other electronic device that does not have an x86 instruction set processor or core to execute the x86 binary code 4206.

Though the flow diagrams in the figures show a particular order of operations performed by certain embodiments, it should be understood that such order is exemplary. Thus, alternative embodiments may perform the operations in a different order, combine certain operations, overlap certain operations, etc.

Additionally, although the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a design framework module implemented by an electronic device for generating an accelerator instance optimized to implement a recurrent neural network (RNN) algorithm comprising:
   obtaining, by the design framework module, a flow graph for the RNN algorithm, the flow graph identifying a plurality of operations to be performed to implement the RNN algorithm and further identifying data dependencies between ones of the plurality of operations, wherein the plurality of operations include one or more matrix operations and one or more vector operations;
   determining, by the design framework module, hardware components of one or more matrix processing units and one or more vector processing units of an accelerator hardware template;
   performing an automatic tuning to determine design parameters to use to customize the accelerator hardware template in order to optimize it for the flow graph;
   mapping, by the design framework module, the plurality of operations of the flow graph to the accelerator hardware template based on the determining of the hardware components and the determining of the design parameters to yield the accelerator instance comprising register transfer language (RTL) code that describes how the one or more matrix processing units and the one or more vector processing units are to be arranged to perform the RNN algorithm, wherein at least one of the one or more matrix processing units, as part of implementing the RNN algorithm, is to provide a value to one of the one or more vector processing units or receive the value from one of the one or more vector processing units; and
   validating performance and functionalities of the generated accelerator instance against one or more performance and functional models derived from hardware design constraints and optimization goals.

2. The method of claim 1, wherein the obtaining comprises:
   computing, by the design framework module, the flow graph based upon a plurality of equations corresponding to the RNN algorithm.

3. The method of claim 1, wherein the determining the hardware components comprises determining a number and type of adders and multipliers, and a number of pipeline stages and lane widths in the adders and the multipliers.

4. The method of claim 1, wherein the mapping is based upon optimization goals indicating properties of the accelerator instance that should be optimized for.

5. The method of claim 1, wherein the mapping is based upon one or more dataset properties identifying properties of input data for the RNN algorithm to be used with the accelerator instance.

6. The method of claim 1, wherein the mapping further yields a compiler that is executable to program an accelerator, generated based upon the accelerator instance, to execute micro-code to implement the RNN algorithm.

7. The method of claim 6, wherein the compiler is to program the accelerator by causing a control unit of the accelerator to execute at least some of the micro-code.

8. The method of claim 1, further comprising at least one of:
   programming a Field Programmable Gate Array (FPGA), using the accelerator instance, to cause the FPGA to become operable to implement the RNN algorithm; or
   providing the RTL code to be used as an input to a logic synthesis tool to yield a circuit design for an Application-Specific Integrated Circuit (ASIC).

9. The method of claim 1, wherein the RNN algorithm is either:
   a gated recurrent unit (GRU) RNN variant; or
   a long short term memory (LSTM) RNN variant.

10. A non-transitory machine readable storage medium having instructions which, when executed by one or more processors of a device, cause the device to implement a design framework module to generate an accelerator instance optimized to implement a recurrent neural network (RNN) algorithm by performing operations comprising:
   obtaining a flow graph for the RNN algorithm, the flow graph identifying a plurality of operations to be performed to implement the RNN algorithm and further identifying data dependencies between ones of the plurality of operations, wherein the plurality of operations include one or more matrix operations and one or more vector operations;
   determining hardware components of one or more matrix processing units and one or more vector processing units of an accelerator hardware template;
   performing an automatic tuning to determine design parameters to use to customize the accelerator hardware template in order to optimize it for the flow graph;
   mapping the plurality of operations of the flow graph to the accelerator hardware template based on the determining of the hardware components and the determining of the design parameters to yield the accelerator instance comprising register transfer language (RTL) code that describes how the one or more matrix processing units and the one or more vector processing units are to be arranged to perform the RNN algorithm, wherein at least one of the one or more matrix processing units, as part of implementing the RNN algorithm, is to provide a value to one of the one or more vector processing units or receive the value from one of the one or more vector processing units; and validating performance and functionalities of the generated accelerator instance against one or more performance and functional models derived from hardware design constraints and optimization goals.

11. The non-transitory machine readable storage medium of claim 10, wherein the obtaining comprises:
computing the flow graph based upon a plurality of equations corresponding to the RNN algorithm.

12. The non-transitory machine readable storage medium of claim 10, wherein the determining the hardware components comprises determining a number and type of adders and multipliers, and a number of pipeline stages and lane widths in the adders and the multipliers.

13. The non-transitory machine readable storage medium of claim 10, wherein the mapping is based upon optimization goals indicating properties of the accelerator instance that should be optimized for.

14. The non-transitory machine readable storage medium of claim 10, wherein the mapping is based upon one or more dataset properties identifying properties of input data for the RNN algorithm to be used with the accelerator instance.

15. The non-transitory machine readable storage medium of claim 10, wherein the mapping further yields a compiler that is executable to program an accelerator, generated based upon the accelerator instance, to execute micro-code to implement the RNN algorithm.

16. The non-transitory machine readable storage medium of claim 15, wherein the compiler is to program the accelerator by causing a control unit of the accelerator to execute at least some of the micro-code.

17. The non-transitory machine readable storage medium of claim 10, wherein the operations further comprise at least one of:
programming a Field Programmable Gate Array (FPGA), using the accelerator instance, to cause the FPGA to become operable to implement the RNN algorithm; or
providing the RTL code to be used as an input to a logic synthesis tool to yield a circuit design for an Application-Specific Integrated Circuit (ASIC).

18. A device comprising:
one or more processors; and
one or more non-transitory machine readable storage media having instructions which, when executed by the one or more processors, cause the device to implement a design framework module that is to generate an accelerator instance optimized to implement a recurrent neural network (RNN) algorithm by performing operations comprising:
obtaining a flow graph for the RNN algorithm, the flow graph identifying a plurality of operations to be performed to implement the RNN algorithm and further identifying data dependencies between ones of the plurality of operations, wherein the plurality of operations include one or more matrix operations and one or more vector operations;
determining hardware components of one or more matrix processing units and one or more vector processing units of an accelerator hardware template;
performing an automatic tuning to determine design parameters to use to customize the accelerator hardware template in order to optimize it for the flow graph;
mapping the plurality of operations of the flow graph to the accelerator hardware template based on the determining of the hardware components and the determining of the design parameters to yield the accelerator instance comprising register transfer language (RTL) code that describes how the one or more matrix processing units and the one or more vector processing units are to be arranged to perform the RNN algorithm, wherein at least one of the one or more matrix processing units, as part of implementing the RNN algorithm, is to provide a value to one of the one or more vector processing units or receive the value from one of the one or more vector processing units; and
validating performance and functionalities of the generated accelerator instance against one or more performance and functional models derived from hardware design constraints and optimization goals.

19. The device of claim 18, wherein the determining the hardware components comprises determining a number and type of adders and multipliers, and a number of pipeline stages and lane widths in the adders and the multipliers.

* * * * *